US008714663B2

(12) United States Patent
Maeda et al.

(10) Patent No.: US 8,714,663 B2
(45) Date of Patent: *May 6, 2014

(54) WHEEL BRAKE/DRIVE FORCE CONTROL DEVICE

(75) Inventors: Yoshinori Maeda, Aichi-gun (JP);
Yasuhiro Oshiumi, Gotenba (JP);
Michitaka Tsuchida, Susono (JP);
Kazuya Okumura, Mishima (JP);
Kensuke Yoshizue, Susono (JP);
Akihiro Hosokawa, Susono (JP); Koji Sugiyama, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1172 days.

This patent is subject to a terminal disclaimer.

(21) Appl. No.: 12/097,629

(22) PCT Filed: Dec. 15, 2006

(86) PCT No.: PCT/JP2006/325573
§ 371 (c)(1),
(2), (4) Date: Jun. 16, 2008

(87) PCT Pub. No.: WO2007/069790
PCT Pub. Date: Jun. 21, 2007

(65) Prior Publication Data
US 2009/0051216 A1 Feb. 26, 2009

(30) Foreign Application Priority Data
Dec. 16, 2005 (JP) ................................. 2005-362887

(51) Int. Cl.
*B60T 8/60* (2006.01)

(52) U.S. Cl.
USPC ........................................................ 303/146

(58) Field of Classification Search
USPC ................. 303/140, 146, 154, 155, 186–190; 701/70
See application file for complete search history.

(56) References Cited

U.S. PATENT DOCUMENTS

| 5,702,165 A | 12/1997 | Koibuchi |
| 5,762,157 A | 6/1998 | Uehara |
| 5,971,089 A | 10/1999 | Sawada |
| 6,059,067 A | 5/2000 | Shibahata et al. |

(Continued)

FOREIGN PATENT DOCUMENTS

| JP | 5 24522 | 2/1993 |
| JP | 8 310366 | 11/1996 |

(Continued)

*Primary Examiner* — Xuan Lan Nguyen
(74) *Attorney, Agent, or Firm* — Oblon, Spivak, McClelland, Maier & Neustadt, L.L.P.

(57) ABSTRACT

A target braking-driving force Fvn and a target yaw moment Mvn of the entire vehicle are calculated, and when the target braking-driving force Fvn and the target yaw moment Mvn cannot be achieved by the braking-driving forces of the front wheels, a target braking-driving force Fvft and a target yaw moment Mvft of the front wheels are adjusted such that the magnitudes of the braking-driving force and yaw moment of the vehicle produced by the braking-driving forces of the front wheels become the maximum at a ratio between Fvn and Mvn. A target braking-driving force Fvrt and a target yaw moment Mvrt of the rear wheels are calculated on the basis of Fvn, Mvn, Fvft, and Mvft, and similar adjustment is performed for them when necessarily.

2 Claims, 27 Drawing Sheets

(56) References Cited

U.S. PATENT DOCUMENTS

| | | | |
|---|---|---|---|
| 6,081,761 A | 6/2000 | Harada et al. | |
| 6,089,680 A | 7/2000 | Yoshioka et al. | |
| 6,442,469 B1 * | 8/2002 | Matsuno | 701/70 |
| 6,473,682 B1 * | 10/2002 | Nakamura | 701/74 |
| 6,584,397 B2 | 6/2003 | Tanaka et al. | |
| 6,598,946 B2 | 7/2003 | Nagae | |
| 6,657,539 B2 | 12/2003 | Yamamoto et al. | |
| 6,659,570 B2 * | 12/2003 | Nakamura | 303/146 |
| 6,702,717 B2 | 3/2004 | Murakami | |
| 6,704,622 B2 | 3/2004 | Tinskey et al. | |
| 7,168,769 B2 | 1/2007 | Nihei et al. | |
| 7,584,042 B2 | 9/2009 | Suzumura et al. | |
| 7,676,314 B2 | 3/2010 | Kato et al. | |
| 7,974,761 B2 | 7/2011 | Maeda et al. | |
| 2001/0005101 A1 | 6/2001 | Matsuno | |
| 2001/0056317 A1 | 12/2001 | Nishizaki et al. | |
| 2002/0014799 A1 | 2/2002 | Nagae | |
| 2002/0075139 A1 | 6/2002 | Yamamoto et al. | |
| 2002/0109402 A1 | 8/2002 | Nakamura | |
| 2002/0153770 A1 | 10/2002 | Matsumo et al. | |
| 2003/0102713 A1 | 6/2003 | Murakami | |
| 2003/0149515 A1 | 8/2003 | Hessmert et al. | |
| 2004/0158377 A1 | 8/2004 | Matsumoto et al. | |
| 2005/0107939 A1 | 5/2005 | Sadano et al. | |
| 2005/0125131 A1 | 6/2005 | Kato et al. | |
| 2006/0149445 A1 | 7/2006 | Suzumura et al. | |

FOREIGN PATENT DOCUMENTS

| | | |
|---|---|---|
| JP | 9 309357 | 12/1997 |
| JP | 2000 190832 | 7/2000 |
| JP | 2002 211378 | 7/2002 |
| JP | 2003 341493 | 12/2003 |
| JP | 2004 25996 | 1/2004 |
| JP | 2005 255107 | 9/2005 |

* cited by examiner

WHEEL BRAKE/DRIVE FORCE CONTROL DEVICE

TECHNICAL FIELD

The present invention relates to a braking-driving-force control apparatus for a vehicle, and more particularly, to a braking-driving-force control apparatus for a vehicle which controls the braking and driving forces of individual wheels.

BACKGROUND ART

As one type of a braking-driving-force control apparatus for a vehicle such as an automobile, there has conventionally known a driving force control apparatus which controls distribution of driving force to left and right wheels so as to impart a predetermined yaw moment to a vehicle, as described in, for example, Japanese Patent Application Laid-Open (kokai) No. H9-309357. Further, there has already been known a braking force control apparatus which controls the braking-driving force and yaw moment of a vehicle, through control of braking forces of individual wheels, so as to secure the traveling stability of the vehicle. When such a braking-driving-force control apparatus is employed, the traveling stability of the vehicle can be improved.

In general, the braking-driving forces and yaw moment of a vehicle can be controlled through control of braking-driving forces of individual wheels. However, since there is a limit on the braking and driving force that each wheel can generate, in some cases, the braking-driving force or yaw moment required for the vehicle exceeds a level which can be attained through control of the braking-driving forces of the individual wheels. In conventional braking-driving-force control apparatuses as described above, such cases are not taken into consideration, and an improvement on that point has been demanded.

For example, there exist a case where a road surface in contact with front wheels or rear wheels has a low friction coefficient and a braking-driving force which can be generated by the wheels is smaller than a braking-driving force that can be generated by a braking-driving-force generation means, and a case where the maximum braking-driving forces that can be generated by the braking-driving-force generation means of the front wheels and the rear wheels differ from each other. In such cases particular, the magnitudes of the braking-driving force and yaw moment which can be attained by means of the braking-driving forces of the front wheels differ from those which can be attained by means of the braking-driving forces of the rear wheels. Therefore, in order to enable the braking-driving force and yaw moment required for the vehicle to be attained to a possible extent even in such a state, the braking-driving forces of the individual wheels must be controlled properly.

DISCLOSURE OF THE INVENTION

In view of the above-described present states of conventional braking-driving-force control apparatuses for a vehicle which are configured to control the braking-driving force and yaw moment of the vehicle through control of braking-driving forces of individual wheels, a major object of the present invention is to control braking-driving forces of front and rear wheels such that the braking-driving force and yaw moment required for the vehicle are attained to a possible extent by means of a braking-driving force and a yaw moment which can be produced by braking-driving forces of the front wheels and a braking-driving force and a yaw moment which cab be produced by braking-driving forces of the rear wheels, whereby the braking-driving force and yaw moment required for the vehicle are attained to a possible extent within the range of braking-driving forces which can be generated by the front and rear wheels.

According to the present invention, there is provided a braking-driving-force control apparatus for a vehicle, characterized by comprising braking-driving force imparting means for imparting braking-driving forces to individual wheels; means for detecting an amount of an occupant's driving operation; means for calculating a target braking-driving force of an entire vehicle and a target yaw moment of the entire vehicle, which must be generated by means of braking-driving forces of the individual wheels, on the basis of at least the amount of the occupant's driving operation; and control means for controlling the braking-driving forces of the individual wheels by controlling the braking-driving force imparting means such that a braking-driving force of the entire vehicle and a yaw moment of the entire vehicle approach the target braking-driving force of the entire vehicle and the target yaw moment of the entire vehicle to a possible extent. One of a wheel group including front wheels and a wheel group including rear wheels is defined as a first wheel group, and the other wheel group is defined as a second wheel group. The control means comprises first adjustment means, operable when the target braking-driving force of the entire vehicle or the target yaw moment of the entire vehicle cannot be achieved by means of a braking-driving force of the first wheel group, for adjusting a target braking-driving force of the vehicle and a target yaw moment of the vehicle which are to be produced by means of the braking-driving force of the first wheel group to values which can be achieved by means of the braking-driving force of the first wheel group; means for calculating a target braking-driving force of the vehicle and a target yaw moment of the vehicle which are to be produced by means of a braking-driving force of the second wheel group, on the basis of the target braking-driving force of the entire vehicle and the target yaw moment of the entire vehicle, and the target braking-driving force of the vehicle and the target yaw moment of the vehicle which are to be produced by means of the braking-driving force of the first wheel group; and second adjustment means, operable when the target braking-driving force of the vehicle and the target yaw moment of the vehicle which are to be produced by means of the braking-driving force of the second wheel group cannot be achieved by means of the braking-driving force of the second wheel group, for adjusting the target braking-driving force of the vehicle and the target yaw moment of the vehicle which are to be produced by means of the braking-driving force of the second wheel group to values which can be achieved by means of the braking-driving force of the second wheel group.

According to this configuration, one of a wheel group including front wheels and a wheel group including rear wheels is defined as a first wheel group, and the other wheel group is defined as a second wheel group, and adjustment is performed as follows. When the target braking-driving force of the entire vehicle or the target yaw moment of the entire vehicle cannot be achieved by means of the braking-driving force of the first wheel group, the target braking-driving force of the vehicle and the target yaw moment of the vehicle which are to be produced by means of the braking-driving force of the first wheel group are adjusted, by means of the first adjustment means, to values which can be achieved by means of the braking-driving force of the first wheel group. The target braking-driving force of the vehicle and the target yaw moment of the vehicle which are to be produced by means of the braking-driving force of the second wheel group are calculated on the basis of the target braking-driving force of the entire vehicle and the target yaw moment of the entire vehicle, and the target braking-driving force of the vehicle and the target yaw moment of the vehicle which are to be produced by means of the braking-driving force of the first wheel group. When the target braking-driving force of the vehicle and the target yaw moment of the vehicle which are to be produced by means of the braking-driving force of the second wheel group cannot be achieved by means of the braking-driving force of the second wheel group, the target braking-driving force of the vehicle and the target yaw moment of the vehicle which are to be produced by means of the braking-driving force of the second wheel group are adjusted, by means of the second adjustment means, to values which can be achieved by means of the braking-driving force of the second wheel group. Therefore, even in a case where a braking-driving force and a yaw moment required for the vehicle cannot be achieved by means of the braking-driving forces that can be generated by the individual wheels, the braking-driving force and yaw moment of the vehicle, which are produced by means of the braking-driving forces of the left and right front wheels or the left and right rear wheels, can be adjusted such that the braking-driving force and the yaw moment required for the vehicle can be achieved to a possible extent within a range of the braking-driving forces which can be generated by the left and right front wheels and the left and right rear wheels.

Further, the above-described configuration reliably avoids the possibility that the target braking-driving forces of the wheels of the first and second wheel groups are calculated to assume values which cannot actually be generated by the wheels, or values smaller than the values which can actually be generated by the wheels. Thus, the above-described configuration enables the target braking-driving force and target yaw moment of the entire vehicle to be achieved to a possible extent through maximum utilization of the braking-driving forces of the individual wheels, and enables easy calculation of the target braking-driving forces of the individual wheels without requiring complex calculation such as convergence calculation, as will be described later in detail.

In the above-described configuration, the first wheel group and the second wheel group may be the group of the front wheels and the group of the rear wheels, respectively.

According to this configuration, since the first wheel group and the second wheel group are the group of the front wheels and the group of the rear wheels, respectively, in a case where the magnitudes of the target braking-driving force and target yaw moment of the entire vehicle are small, the target braking-driving force and target yaw moment of the entire vehicle can be achieved mainly by means of the braking-driving forces of the left and right front wheels, and thus, satisfactory travel stability of the vehicle can be secured, as compared with a case where the target braking-driving force and target yaw moment of the entire vehicle can be achieved mainly by means of the braking-driving forces of the left and right rear wheels.

The above-described configuration may be such that when restriction is imposed on the braking-driving force of at least one of the wheels of the first wheel group, the means for calculating the target braking-driving force of the vehicle and the target yaw moment of the vehicle which are to be produced by means of the braking-driving force of the second wheel group calculates a shortage of the braking-driving force of the vehicle produced by means of the braking-driving force of the first wheel group, the shortage occurring due to the restriction imposed on the braking-driving force, and calculates the target braking-driving force of the vehicle and the target yaw moment of the vehicle which are to be produced by means of the braking-driving force of the second wheel group, on the basis of the target braking-driving force of the entire vehicle and the target yaw moment of the entire vehicle, the target braking-driving force of the vehicle and the target yaw moment of the vehicle which are to be produced by means of the braking-driving force of the first wheel group, and the shortage of the braking-driving force of the vehicle produced by means of the braking-driving force of the first wheel group.

According to this configuration, when restriction is imposed on the braking-driving force of at least one of the wheels of the first wheel group, the shortage of the braking-driving force of the vehicle produced by means of the braking-driving force of the first wheel group, the shortage occurring due to the restriction imposed on the braking-driving force is calculated, and the target braking-driving force of the vehicle and the target yaw moment of the vehicle which are to be produced by means of the braking-driving force of the second wheel group is calculated on the basis of the target braking-driving force of the entire vehicle and the target yaw moment of the entire vehicle, the target braking-driving force of the vehicle and the target yaw moment of the vehicle which are to be produced by means of the braking-driving force of the first wheel group, and the shortage of the braking-driving force of the vehicle produced by means of the braking-driving force of the first wheel group. Therefore, even in a case where at least one of the wheels of the first wheel group undergoes antiskid control or traction control, the above-described configuration can reliably reduce the possibility that the target braking-driving force of the entire vehicle cannot be achieved due to the shortage of the braking-driving force.

The above-described configuration may be such that when restriction is imposed on the braking-driving force of at least one of the wheels of the first wheel group, the means for calculating the target braking-driving force of the vehicle and the target yaw moment of the vehicle which are to be produced by means of the braking-driving force of the second wheel group calculates shortages of the braking-driving force of the vehicle and the yaw moment of the vehicle produced by means of the braking-driving force of the first wheel group, the shortages occurring due to the restriction imposed on the braking-driving force, and calculates the target braking-driving force of the vehicle and the target yaw moment of the vehicle which are to be produced by means of the braking-driving force of the second wheel group, on the basis of the target braking-driving force of the entire vehicle and the target yaw moment of the entire vehicle, the target braking-driving force of the vehicle and the target yaw moment of the vehicle which are to be produced by means of the braking-driving force of the first wheel group, and the shortages of the braking-driving force of the vehicle and the yaw moment of the vehicle produced by means of the braking-driving force of the first wheel group.

According to this configuration, when restriction is imposed on the braking-driving force of at least one of the wheels of the first wheel group, the shortages of the braking-driving force of the vehicle and the yaw moment of the vehicle produced by means of the braking-driving force of the first wheel group, the shortages occurring due to the restriction imposed on the braking-driving force is calculated, and the target braking-driving force of the vehicle and the target yaw moment of the vehicle which are to be produced by means of the braking-driving force of the second wheel group is calculated on the basis of the target braking-driving force of the entire vehicle and the target yaw moment of the entire vehicle, the target braking-driving force of the vehicle and the target yaw moment of the vehicle which are to be produced by means of the braking-driving force of the first wheel group, and the shortages of the braking-driving force of the vehicle and the yaw moment of the vehicle produced by means of the braking-driving force of the first wheel group. Therefore, even in a case where the front wheels undergoes antiskid control or traction control, the above-described configuration can reliably reduce the possibility that the target braking-driving force of the entire vehicle cannot be achieved due to the shortage of the braking-driving force and the possibility that the target yaw moment of the entire vehicle cannot be achieved due to the shortage of the yaw moment.

In the above-described configuration, there may be provided target-braking-driving-force correction means, operable when the target braking-driving force of the vehicle and the target yaw moment of the vehicle which are to be produced by means of the braking-driving force of the second wheel group can be achieved by means of the braking-driving force of the second wheel group in a state where restriction is imposed on the braking-driving force of one of the wheels of the first wheel group, for calculating a shortage of the target braking-driving force of the vehicle which is to be produced by means of the braking-driving force of the first wheel group, the shortage occurring due to the restriction imposed on the braking-driving force, and increasing, on the basis of the shortage, the target braking-driving force of a wheel of the second wheel group located on the same side, with respect to the lateral direction of the vehicle, as the wheel whose braking-driving force is restricted.

According to this configuration, when the target braking-driving force of the vehicle and the target yaw moment of the vehicle which are to be produced by means of the braking-driving force of the second wheel group can be achieved by means of the braking-driving force of the second wheel group in a state where restriction is imposed on the braking-driving force of one of the wheels of the first wheel group, a shortage of the target braking-driving force of the vehicle which is to be produced by means of the braking-driving force of the first wheel group, the shortage occurring due to the restriction imposed on the braking-driving force is calculated, and the target braking-driving force of a wheel of the second wheel group located on the same side, with respect to the lateral direction of the vehicle, as the wheel whose braking-driving force is restricted, is increased on the basis of the shortage. Therefore, even in a case where one wheel of the first wheel group undergoes antiskid control or traction control, the above-described configuration can effectively reduce the possibility that the target braking-driving force of the entire vehicle cannot be achieved due to the shortage of the braking-driving force and the possibility that the target yaw moment of the entire vehicle cannot be achieved due to the shortage of the yaw moment.

In the above-described configuration, at least one of the first and second adjustment means may be configured to perform the adjustment such that the magnitudes of the braking-driving force and yaw moment of the vehicle produced by means of the braking-driving forces of the wheels become the maximum within a range in which a ratio between the braking-driving force and yaw moment of the vehicle produced by means of the braking-driving forces of the wheels substantially coincides with a ratio between the target braking-driving force and the target yaw moment.

According to this configuration, at least one of the first and second adjustment means performs the adjustment such that the magnitudes of the braking-driving force and yaw moment of the vehicle produced by means of the braking-driving forces of the wheels become the maximum within a range in which the ratio between the braking-driving force and yaw moment of the vehicle produced by means of the braking-driving forces of the wheels substantially coincides with the ratio between a ratio between the target braking-driving force and the target yaw moment. Therefore, the above-described configuration can adjust the target braking-driving force and the target yaw moment which are to be produced by means of the braking-driving forces of the wheels of the first or second wheel group such that the braking-driving force and the yaw moment required for the vehicle can be achieved to a possible extent within a range of the braking-driving forces which the wheels of the first and second wheel groups can generate, and the ratio between the braking-driving force and yaw moment of the vehicle substantially coincides with the ratio between the target braking-driving force and the target yaw moment.

In the above-described configuration, at least one of the first and second adjustment means may be configured to determine, as a corrected target braking-driving force and a corrected target yaw moment, a braking-driving force and a yaw moment which fall within the ranges of the braking-driving force and yaw moment of the vehicle which can be achieved by means of the braking-driving forces of the wheels, such that the determined yaw moment assumes a value substantially equal to a value closest to the target yaw moment; and perform adjustment such that the braking-driving force and yaw moment of the vehicle produced by means of the braking-driving forces of the wheels become equal to the corrected target braking-driving force and the corrected target yaw moment, respectively.

According to this configuration, at least one of the first and second adjustment means determines, as a corrected target braking-driving force and a corrected target yaw moment, a braking-driving force and a yaw moment which fall within the ranges of the braking-driving force and yaw moment of the vehicle which can be achieved by means of the braking-driving forces of the wheels, such that the determined yaw moment assumes a value substantially equal to a value closest to the target yaw moment; and performs adjustment such that the braking-driving force and yaw moment of the vehicle produced by means of the braking-driving forces of the wheels become equal to the corrected target braking-driving force and the corrected target yaw moment, respectively. Accordingly, the target braking-driving force and the target yaw moment which are to be produced by the wheels of the first or second wheel group can be adjusted such that the braking-driving forces of the wheels of the first or second wheel group are controlled such that the target yaw moment of the vehicle is achieved to a possible extent, whereby the yaw moment required for the vehicle can be achieved to a possible extent within a range of the braking-driving forces which the wheels of the first or second wheel groups can generate.

In the above-described configuration, at least one of the first and second adjustment means may be configured to determine, as a corrected target braking-driving force and a corrected target yaw moment, a braking-driving force and a yaw moment which fall within the ranges of the braking-driving force and yaw moment of the vehicle which can be achieved by means of the braking-driving forces of the wheels, such that the determined braking-driving force assumes a value substantially equal to a value closest to the target braking-driving force; and perform adjustment such that the braking-driving force and yaw moment of the vehicle produced by means of the braking-driving forces of the wheels become equal to the corrected target braking-driving force and the corrected target yaw moment, respectively.

According to this configuration, at least one of the first and second adjustment means determines, as a corrected target braking-driving force and a corrected target yaw moment, a braking-driving force and a yaw moment which fall within the ranges of the braking-driving force and yaw moment of the vehicle which can be achieved by means of the braking-driving forces of the wheels, such that the determined braking-driving force assumes a value substantially equal to a value closest to the target braking-driving force; and performs adjustment such that the braking-driving force and yaw moment of the vehicle produced by means of the braking-driving forces of the wheels become equal to the corrected target braking-driving force and the corrected target yaw moment, respectively. Accordingly, the target braking-driving force and the target yaw moment which are to be produced by the wheels of the first or second wheel group can be adjusted such that the braking-driving forces of the wheels of the first or second wheel group are controlled such that the target braking-driving force of the vehicle is achieved to a possible extent, whereby the braking-driving force required for the vehicle can be achieved to a possible extent within a range of the braking-driving forces which the wheels of the first or second wheel groups can generate.

In the above-described configuration, at least one of the first and second adjustment means may be configured to determine a ratio of correction to the target braking-driving force and the target yaw moment on the basis of a driver's driving operation; increase or decrease the target braking-driving force or the target yaw moment on the basis of the ratio of correction such that the corrected target braking-driving force and the corrected target yaw moment assume values which can be achieved by means of the braking-driving forces of the individual wheels; and perform adjustment such that the braking-driving force and yaw moment of the vehicle, which can be achieved by means of the braking-driving forces of the individual wheels become equal to the corrected target braking-driving force and the corrected target yaw moment, respectively.

According to this configuration, at least one of the first and second adjustment means determines a ratio of correction to the target braking-driving force and the target yaw moment on the basis of a driver's driving operation; increases or decreases the target braking-driving force or the target yaw moment on the basis of the ratio of correction such that the corrected target braking-driving force and the corrected target yaw moment assume values which can be achieved by means of the braking-driving forces of the individual wheels; and performs adjustment such that the braking-driving force and yaw moment of the vehicle, which can be achieved by means of the braking-driving forces of the individual wheels become equal to the corrected target braking-driving force and the corrected target yaw moment, respectively. Accordingly, the target braking-driving force and the target yaw moment which are to be produced by the wheels of the first or second wheel group can be adjusted such that a braking-driving force and a yaw moment which are close to the braking-driving force and yaw moment required for the vehicle to a possible extent and which are suitable for the driver's driving operation can be achieved within the range of the braking-driving forces which the wheels of the first or second wheel group can generate.

In the above-described configuration, the braking-driving-force imparting means may configured to impart braking forces to the individual wheels independently of one another and impart a driving force to left and right wheels by use of drive means shared by the left and right wheels while changing the distribution of the driving force between the left and right wheel; and at least one of the first and second adjustment means may be configured to determine, as a reference yaw moment, the maximum value of the magnitude of the yaw moment of the vehicle which can be achieved by means of the braking-driving forces of the individual wheels when the magnitude of the braking-driving force of the vehicle is the maximum value which can be achieved by means of the braking-driving forces of the individual wheels; correct the magnitude of the target braking-driving force to the maximum value when the magnitude of the target yaw moment is equal to or less than the reference yaw moment and the magnitude of the target braking-driving force is greater than the maximum value; correct the magnitude of the target yaw moment to a value which can be achieved by means of the braking-driving forces of the individual wheels, when the magnitude of the target braking-driving force is equal to less than the maximum value and the magnitude of the target yaw moment is greater than the value which can be achieved by means of the braking-driving forces of the individual wheels; and correct the magnitude of the target braking-driving force to the maximum value and the magnitude of the target yaw moment to the reference yaw moment when the magnitude of the target braking-driving force is greater than the maximum value and the magnitude of the target yaw moment is greater than the reference yaw moment.

According to this configuration, at least one of the first and second adjustment means determines, as a reference yaw moment, the maximum value of the magnitude of the yaw moment of the vehicle which can be achieved by means of the braking-driving forces of the individual wheels when the magnitude of the braking-driving force of the vehicle is the maximum value which can be achieved by means of the braking-driving forces of the individual wheels; corrects the magnitude of the target braking-driving force to the maximum value when the magnitude of the target yaw moment is equal to or less than the reference yaw moment and the magnitude of the target braking-driving force is greater than the maximum value; corrects the magnitude of the target yaw moment to a value which can be achieved by means of the braking-driving forces of the individual wheels, when the magnitude of the target braking-driving force is equal to less than the maximum value and the magnitude of the target yaw moment is greater than the value which can be achieved by means of the braking-driving forces of the individual wheels; and corrects the magnitude of the target braking-driving force to the maximum value and the magnitude of the target yaw moment to the reference yaw moment when the magnitude of the target braking-driving force is greater than the maximum value and the magnitude of the target yaw moment is greater than the reference yaw moment. Therefore, in a vehicle in which a driving force is imparted to left and right wheels by use of drive means shared by the left and right wheels while the distribution of the driving force between the left and right wheel is changed, when the braking-driving force or the yaw moment required for the vehicle exceeds a value which can be achieved through control of the braking-driving forces of the individual wheels, the braking-driving forces of the wheels of the first or second wheel group are controlled on the basis of the relation of the braking-driving force or the yaw moment required for the vehicle in relation to the range of braking-driving force and yaw moment of the vehicle which can be achieved through control of the braking-driving forces of the wheels of the first or second wheel group, whereby the target braking-driving force and the target yaw moment which are to be produced by the wheels of the first or second wheel group can be adjusted such that the braking-driving force or the yaw moment required for the vehicle can be achieved to a possible extent within the range of braking-driving force which the wheels of the first or second wheel group can generate.

In the above-described configuration, at least one of the first and second adjustment means may be configured to correct the target braking-driving force or the target yaw moment such that the corrected target braking-driving force and the corrected target yaw moment assume values which can be achieved by means of the braking-driving forces of the individual wheels; and suppress a change in the corrected target yaw moment attributable at least to a change in the target braking-driving force in a state where the target braking-driving force or the target yaw moment cannot be achieved by means of the braking-driving forces of the wheels.

According to this configuration, at least one of the first and second adjustment means corrects the target braking-driving force or the target yaw moment such that the corrected target braking-driving force and the corrected target yaw moment assume values which can be achieved by means of the braking-driving forces of the individual wheels; and suppresses a change in the corrected target yaw moment attributable at least to a change in the target braking-driving force in a state where the target braking-driving force or the target yaw moment cannot be achieved by means of the braking-driving forces of the wheels. Therefore, even in a case where the target braking-driving force or the target yaw moment cannot be achieved by means of the braking-driving forces of the wheels of the first or second wheel group, a braking-driving force and a yaw moment close to the target braking-driving force and the target yaw moment can be achieved. In addition, even when the target braking-driving force changes abruptly, the yaw moment of the vehicle is prevented from changing abruptly, whereby the possibility that the travel stability of the vehicle lowers or an occupant of the vehicle feels an unnatural sensation can be effectively reduced.

In the above-described configuration, at least one of the first and second adjustment means may be configured to correct the target braking-driving force or the target yaw moment such that the corrected target braking-driving force and the corrected target yaw moment assume values which can be achieved by means of the braking-driving forces of the individual wheels; and suppress a change in the corrected target braking-driving force attributable at least to a change in the target yaw moment in a state where the target braking-driving force or the target yaw moment cannot be achieved by means of the braking-driving forces of the wheels.

According to this configuration, at least one of the first and second adjustment means corrects the target braking-driving force or the target yaw moment such that the corrected target braking-driving force and the corrected target yaw moment assume values which can be achieved by means of the braking-driving forces of the individual wheels; and suppresses a change in the corrected target braking-driving force attributable at least to a change in the target yaw moment in a state where the target braking-driving force or the target yaw moment cannot be achieved by means of the braking-driving forces of the wheels. Therefore, even in a case where the target braking-driving force or the target yaw moment cannot be achieved by means of the braking-driving forces of the wheels of the first or second wheel group, a braking-driving force and a yaw moment close to the target braking-driving force and the target yaw moment can be achieved. In addition, even when the target yaw moment changes abruptly, the braking-driving force of the vehicle is prevented from changing abruptly, whereby the possibility that the travel stability of the vehicle lowers or an occupant of the vehicle feels an unnatural sensation can be effectively reduced.

In the above-described configuration, at least one of the first and second adjustment means may be configured to correct the target braking-driving force or the target yaw moment to a value within an ellipse defined in an orthogonal coordinate system whose two axes correspond to the braking-driving force and yaw moment of the vehicle, the ellipse being located within ranges of the braking-driving force and yaw moment of the vehicle, which can be achieved by means of the braking-driving forces of the wheels, and having a center on the axis corresponding to the braking-driving force, and the directions of the major and minor radius of the ellipse coinciding with the axes of the orthogonal coordinate system.

According to this configuration, at least one of the first and second adjustment means corrects the target braking-driving force or the target yaw moment to a value within an ellipse defined in an orthogonal coordinate system whose two axes correspond to the braking-driving force and yaw moment of the vehicle, the ellipse being located within ranges of the braking-driving force and yaw moment of the vehicle, which can be achieved by means of the braking-driving forces of the wheels, and having a center on the axis corresponding to the braking-driving force, and the directions of the major and minor radius of the ellipse coinciding with the axes of the orthogonal coordinate system. Therefore, even in a case where the target braking-driving force or the target yaw moment cannot be achieved by means of the braking-driving forces of the wheels of the first or second wheel group, a braking-driving force and a yaw moment close to the target braking-driving force and the target yaw moment can be achieved. In addition, even when the target braking-driving force and the target yaw moment change abruptly, the yaw moment and braking-driving force of the vehicle are prevented from changing abruptly, whereby the possibility that the travel stability of the vehicle lowers or an occupant of the vehicle feels an unnatural sensation can be effectively reduced.

In the above-described configuration, the means for calculating the target braking-driving force of the vehicle and the target yaw moment of the vehicle which are to be produced by means of the braking-driving force of the second wheel group may be configured to calculate, as the target braking-driving force of the vehicle, which is to be produced by means of the braking-driving force of the second wheel group, a value obtained by subtracting, from the target braking-driving force of the entire vehicle, the target braking-driving force of the vehicle which are to be produced by means of the braking-driving force of the first wheel group, and calculate, as the target yaw moment of the vehicle, which is to be produced by means of the braking-driving force of the second wheel group, a value obtained by subtracting, from the target yaw moment of the entire vehicle, the target yaw moment of the vehicle which are to be produced by means of the braking-driving force of the first wheel group.

In the above-described configuration, the first adjustment means may be configured such that when the target braking-driving force of the entire vehicle and the target yaw moment of the entire vehicle can be achieved by means of the braking-driving force of the first wheel group, the first adjustment means set the target braking-driving force of the vehicle and the target yaw moment of the vehicle which are to be produced by means of the braking-driving force of the first wheel group to the target braking-driving force of the entire vehicle and the target yaw moment of the entire vehicle, respectively.

In the above-described configuration, the second adjustment means may be configured such that when the target braking-driving force of the vehicle and the target yaw moment of the vehicle, which are to produced by means of the braking-driving force of the second wheel group, can be achieved by means of the braking-driving force of the second wheel group, the second adjustment means does not perform the adjustment of the target braking-driving force of the vehicle and the target yaw moment of the vehicle, which are to produced by means of the braking-driving force of the second wheel group.

In the above-described configuration, the restriction imposed on the braking-driving force may be traction control or antiskid control.

In the above-described configuration, the means for calculating the target braking-driving force of the vehicle and the target yaw moment of the vehicle which are to be produced by means of the braking-driving force of the second wheel group may be configured to estimate the actual braking-driving force of a wheel whose braking-driving force is restricted, and calculate a deviation between the target braking-driving force and the actual braking-driving force of the wheel whose braking-driving force is restricted, as the shortage of the braking-driving force of the vehicle produced by means of the braking-driving force of the first wheel group.

In the above-described configuration, the means for calculating the target braking-driving force of the vehicle and the target yaw moment of the vehicle which are to be produced by means of the braking-driving force of the second wheel group may be configured to estimate the actual braking-driving force of a wheel whose braking-driving force is restricted, and calculate a deviation between a yaw moment of the vehicle produced by means of the target braking-driving force of the wheel whose braking-driving force is restricted and a yaw moment of the vehicle produced by the actual braking-driving force of the wheel whose braking-driving force is restricted, as the shortage of the yaw moment of the vehicle which is produced by means of the braking-driving force of the first wheel group.

In the above-described configuration, the means for detecting the amount of an occupant's driving operation may be configured to detect the amount of an occupant's acceleration/deceleration operation and the amount of an occupant's steering operation.

In the above-described configuration, the braking-driving-force imparting means may include means for imparting driving forces to the individual wheels independently of one another; and means for imparting braking forces to the individual wheels independently of one another.

In the above-described configuration, the braking-driving-force imparting means may include driving-force imparting means shared by the left and right front wheels; means for controlling the distribution of driving force between the left and right front wheels; and means for imparting braking forces to the individual wheels independently of one another.

In the above-described configuration, the driving-force imparting means may include driving-force imparting means shared by the left and right front wheels, and driving-force imparting means shared by the left and right rear wheels.

In the above-described configuration, the driving-force imparting means may include driving-force imparting means shared by the left and right front wheels and the left and right rear wheels; means for controlling the distribution of driving force between the front and rear wheels; means for controlling the distribution of driving force between the left and right front wheels; and means for controlling the distribution of driving force between the left and right rear wheels.

In the above-described configuration, the driving-force imparting means may include an electric motor.

In the above-described configuration, the electric motor may perform regenerative braking during braking operation.

In the above-described configuration, the means for calculating the target braking-driving force and target yaw moment of the vehicle may be configured to calculate a target longitudinal acceleration and a target yaw rate of the vehicle for causing the vehicle to travel stably on the basis of at least the amount of the occupant's driving operation, and calculate the target braking-driving force and target yaw moment of the vehicle on the basis of the target longitudinal acceleration and target yaw rate of the vehicle.

BRIEF DESCRIPTION OF THE DRAWINGS

FIG. 3 is a pair of graphs relating to the first embodiment and each showing a range of braking-driving force and yaw moment of the vehicle which can be produced through control of braking-driving forces of left and right front wheels and left and right rear wheels, wherein

BEST MODE FOR CARRYING OUT THE INVENTION

Several preferred embodiments of the present invention will now be described in detail with reference to the accompanying drawings.

First Embodiment

Figure 1:
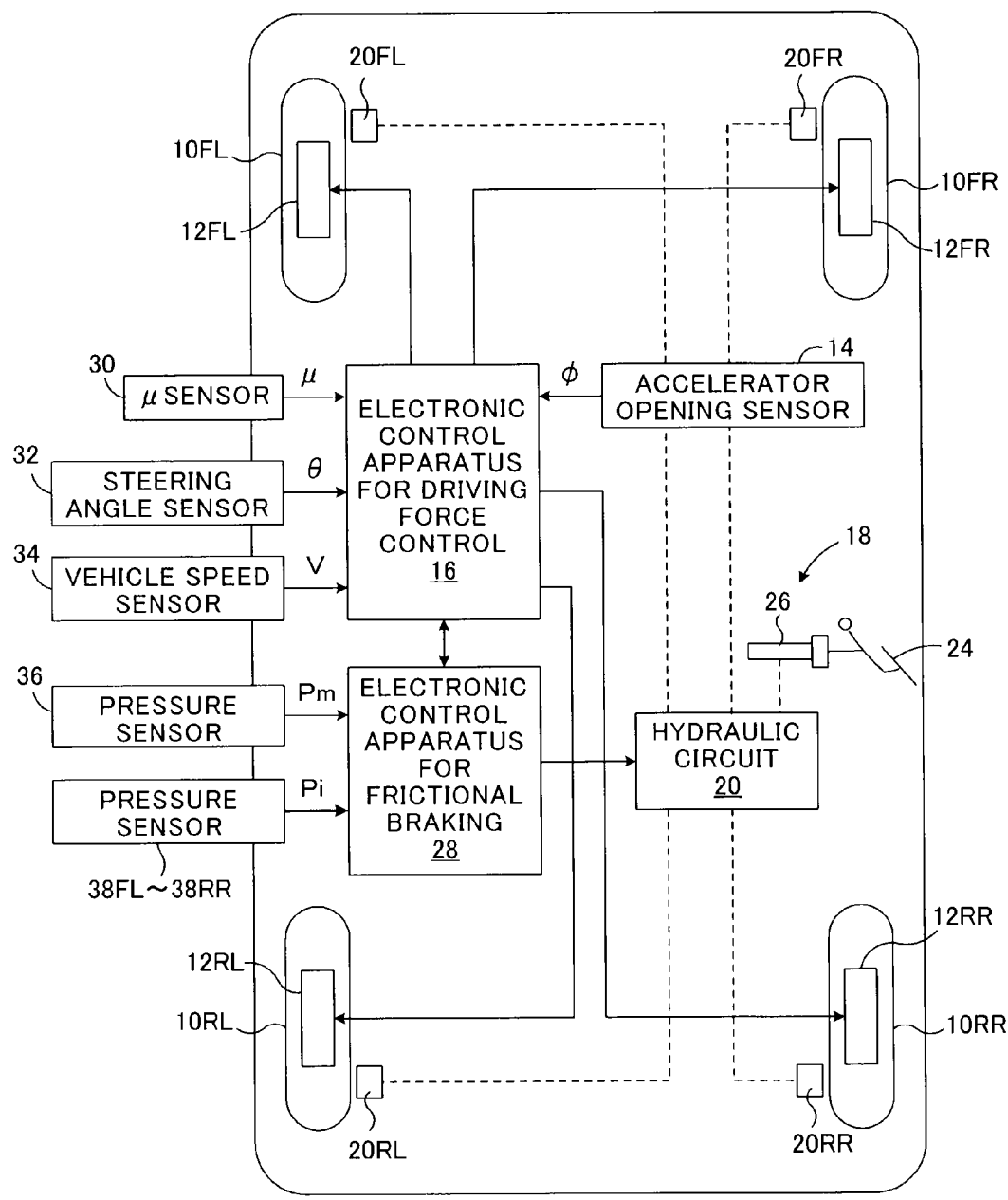
FIG. 1 is a schematic configurational view showing a first embodiment of a braking-driving-force control apparatus according to the present invention applied to a wheel-in-motor-type four-wheel-drive vehicle.

FIG. 1 is a schematic configurational view showing a first embodiment of a braking-driving-force control apparatus for a vehicle according to the present invention which is applied to a wheel-in-motor-type four-wheel-drive vehicle.

In FIG. 1, references numerals 10FL and 10FR respectively denote left and right front wheels, which are steerable wheels; and 10RL and 10RR respectively denote left and right rear wheels, which are non-steerable wheels. Motor generators 12FL and 12FR, each serving as an in-wheel motor, are built into the left and right front wheels 10FL and 10FR, and the left and right front wheels 10FL and 10FR are driven by the motor generators 12FL and 12FR. During braking, the motor generators 12FL and 12FR function as regenerative generators for the left and right front wheels, and generate regenerative braking forces.

Similarly, motor generators 12RL and 12RR, each serving as an in-wheel motor, are built into the left and right rear wheels 10RL and 10RR, and the left and right rear wheels 10RL and 10RR are driven by the motor generators 12RL and 12RR. During braking, the motor generators 12RL and 12RR function as regenerative generators for the left and right rear wheels, and generate regenerative braking forces.

The driving forces of the motor generators 12FL to 12RR are controlled by an electronic control apparatus for driving force control 16 on the basis of an accelerator opening ϕ, which represents the depression amount of an accelerator pedal (not shown in FIG. 1) detected by an accelerator opening sensor 14. The regenerative braking forces of the motor generators 12FL to 12RR are also controlled by the electronic control apparatus for driving force control 16.

Although not shown in detail in FIG. 1, the electronic control apparatus for driving force control 16 is composed of a micro computer and a drive circuit. The microcomputer may have an ordinary configuration in which a CPU, ROM, RAM, and an input/output port unit are connected with one another via a bidirectional common bus. During ordinary travel, electrical power charged into a battery (not shown in FIG. 1) is supplied to the motor generators 12FL to 12RR via the drive circuit. During deceleration/braking of the vehicle, electrical power generated by the motor generators 12FL to 12RR through regenerative braking is charged into the battery via the drive circuit.

Frictional braking forces of the left and right front wheels 10FL and 10FR and the left and right rear wheels 10RL and 10RR are controlled through control of braking pressures of corresponding wheel cylinders 20FL, 20FR, 20RL, and 20RR performed by a hydraulic circuit 20 of a friction baking apparatus 18. Although not illustrated, the hydraulic circuit 20 includes a reservoir, an oil pump, various valve devices, etc. In an ordinary state, the braking pressure of each wheel cylinder is controlled in accordance with an amount by which a brake pedal 24 is depressed by a driver, and pressure of a master cylinder 26 driven in accordance with the depression of the brake pedal 24. Further, if necessary, an electronic control apparatus for frictional braking force control 28 controls the braking pressure of each wheel cylinder by controlling the oil pump and the various valve devices irrespective of the amount of depression of the brake pedal 24 by the driver.

Although not shown in detail in FIG. 1, the electronic control apparatus for braking force control 28 is also composed of a micro computer and a drive circuit. The microcomputer may have an ordinary configuration in which a CPU, ROM, RAM, and an input/output port unit are connected with one another via a bidirectional common bus.

In addition to a signal indicating the accelerator opening ϕ from the accelerator opening sensor 14, the electronic control apparatus for driving force control 16 receives a signal indicating friction coefficient μ of road surface from a μ sensor 30, a signal indicating steering angle θ from a steering angle sensor 32, and a signal indicating vehicle speed V from a vehicle speed sensor 34. The electronic control apparatus for braking force control 28 receives a signal indicating master cylinder pressure Pm from a pressure sensor 36, and braking pressures of the wheels (wheel cylinder pressures) Pbi (i=fl, fr, rl, rr) from corresponding pressure sensors 38FL to 38RR. When necessary, the electronic control apparatus for driving force control 16 and the electronic control apparatus for braking force control 28 exchange signals. Notably, the steering angle sensor 32 detects the steering angle θ such that the steering angle θ assumes a positive value when the vehicle turns leftward.

The electronic control apparatus for driving force control 16 calculates a target longitudinal acceleration Gxt of the vehicle from the accelerator opening ϕ and the master cylinder pressure Pm, which are amounts of driver's acceleration/deceleration operation. Further, the electronic control apparatus for driving force control 16 calculates a target yaw rate γt of the vehicle from the vehicle speed V and the steering angle θ, which is an amount of driver's steering operation, in a manner known in the art. The electronic control apparatus for driving force control 16 then calculates a target braking-driving force Fvn, which the vehicle must attain, from the target longitudinal acceleration Gxt of the vehicle, and calculates a target total yaw moment Mvnt of the entire vehicle, which the vehicle must attain, from the target yaw rate γt of the vehicle.

Also, the electronic control apparatus for driving force control 16 calculates a slip angle β of the vehicle in a manner known in the art; calculates a slip angle α of the left and right front wheels from the slip angle β of the vehicle and the steering angle θ; and then calculates a turning yaw moment Ms of the vehicle stemming from lateral forces of the individual wheels, from the slip angle α. Subsequently, the electronic control apparatus for driving force control 16 calculates, as a target yaw moment Mvn of the entire vehicle, which the vehicle must attain through control of the braking-driving forces of the individual wheels, a value obtained by subtracting the turning yaw moment Ms from the target total yaw moment Mvnt of the vehicle.

Further, the electronic control apparatus for driving force control 16 calculates, from the friction coefficient μ of the road surface, the maximum driving force Fvdfmax of the vehicle and the maximum braking force Fvbfmax of the vehicle, which are generated by means of the braking-driving forces of the left and right front wheels; and calculates, from the friction coefficient μ of the road surface, the maximum yaw moment Mvlfmax of the vehicle in the left turn direction and the maximum yaw moment Mvrfmax of the vehicle in the right turn direction, which moments are generated by means of the braking-driving forces of the left and right front wheels. Moreover, the electronic control apparatus for driving force control 16 calculates, from the friction coefficient μ of the road surface, the maximum driving force Fvdrmax of the vehicle and the maximum braking force Fvbrmax of the vehicle, which are generated by means of the braking-driving forces of the left and right rear wheels; and calculates, from the friction coefficient μ of the road surface, the maximum yaw moment Mvlrmax of the vehicle in the left turn direction and the maximum yaw moment Mvrrmax of the vehicle in the right turn direction, which moments are generated by means of the braking-driving forces of the left and right rear wheels.

Figure 2A:
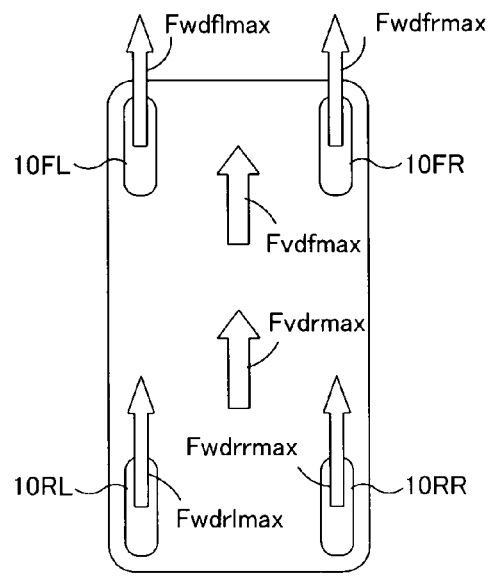
FIG. 2 is a set of illustrations relating to the first embodiment and showing the relation between braking-driving forces of individual wheels and braking-driving force and yaw moment of the vehicle for various cases.

Here, the individual wheels are assumed to be the same in ground contact load and friction coefficient against the road surface, and the individual wheels are assumed to have the same friction circle. As shown in FIG. 2A, in a state where a yaw moment stemming from the braking-driving forces of the wheels does not act on the vehicle, the maximum driving force Fvdfmax of the vehicle, which is generated by means of the braking-driving forces of the left and right front wheels, is achieved when the braking-driving forces Fwxfl and Fwxfr of the left and right front wheels 10FL and 10FR are the maximum driving forces Fwdflmax and Fwdformax; and the maximum driving force Fvdrmax of the vehicle, which is generated by means of the braking-driving forces of the left and right rear wheels, is achieved when the braking-driving forces Fwxrl and Fwxrr of the left and right rear wheels 10RL and 10RR are the maximum driving forces Fwdrlmax and Fwdrrmax.

Figure 2B:
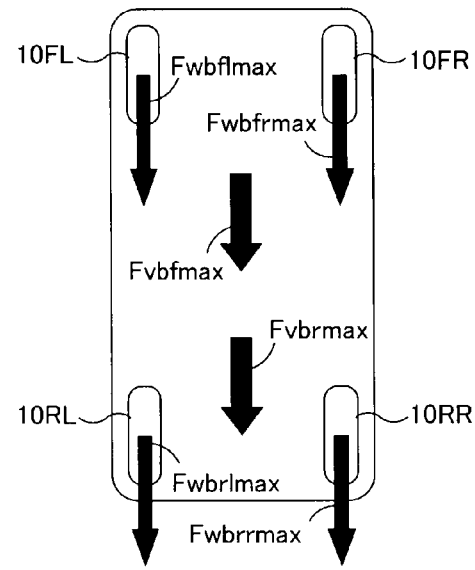

Similarly, as shown in FIG. 2B, in a state where a yaw moment stemming from the braking-driving forces of the wheels does not act on the vehicle, the maximum braking force Fvbfmax of the vehicle, which is generated by means of the braking-driving forces of the left and right front wheels, is achieved when the braking-driving forces Fwxfl and Fwxfr of the left and right front wheels 10FL and 10FR are the maximum braking forces Fwbflmax and Fwbformax; and the maximum braking force Fvbrmax of the vehicle, which is generated by means of the braking-driving forces of the left and right rear wheels, is achieved when the braking-driving forces Fwxrl and Fwxrr of the left and right rear wheels 10RL and 10RR are the maximum braking forces Fwbrlmax and Fwbrrmax.

Figure 2C:
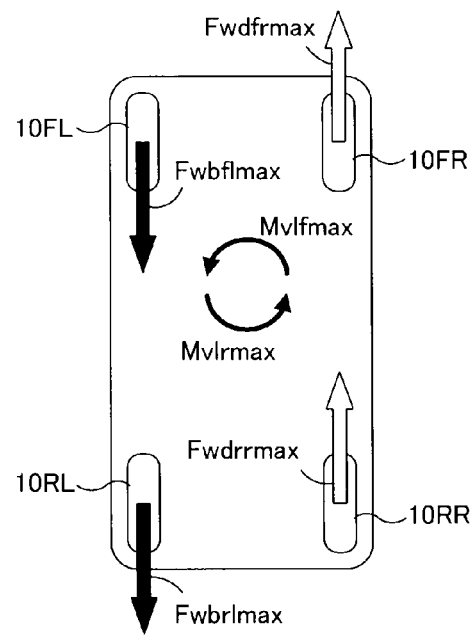

Further, as shown in FIG. 2C, in a state where a longitudinal force stemming from the braking-driving forces of the wheels does not act on the vehicle, the maximum yaw moment Mvlfmax of the vehicle in the left turn direction, which is generated by means of the braking-driving forces of the left and right front wheels, is achieved when the braking-driving force Fwxfl of the left front wheel 10FL is the maximum braking force Fwbflmax, and the braking-driving force Fwxfr of the right front wheel 10FR is the maximum driving force Fwdformax; and the maximum yaw moment Mvlrmax of the vehicle in the left turn direction, which is generated by means of the braking-driving forces of the left and right rear wheels, is achieved when the braking-driving force Fwxrl of the left rear wheel 10RL is the maximum braking force Fwbrlmax, and the braking-driving force Fwxrr of the right rear wheel 10RR is the maximum driving force Fwdrrmax.

Figure 2D:
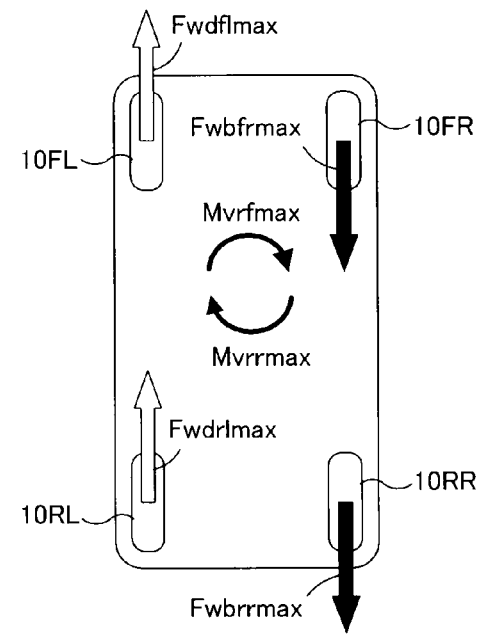

Similarly, as shown in FIG. 2D, in a state where the yaw moment of the vehicle in the left turn direction is the maximum yaw moment Mvlmax, the maximum yaw moment Mvrfmax of the vehicle in the right turn direction, which is generated by means of the braking-driving forces of the left and right front wheels, is achieved when the braking-driving force Fwxfl of the left front wheel 10FL is the maximum driving force Fwdflmax, and the braking-driving force Fwxfr of the right front wheel 10FR is the maximum braking force Fwbformax; and the maximum yaw moment Mvrrmax of the vehicle in the right turn direction, which is generated by means of the braking-driving forces of the left and right rear wheels, is achieved when the braking-driving force Fwxrl of the left rear wheel 10RL is the maximum driving force Fwdrlmax, and the braking-driving force Fwxrr of the right rear wheel 10RR is the maximum braking force Fwbrrmax.

Notably, when the output torques of the motor generators 12FL to 12RR are sufficiently large, the maximum driving forces and maximum braking forces of the individual wheels are determined by the friction coefficient μ of the road surface. Therefore, the relation between the maximum driving force and the maximum braking force of each wheel, the relation between the maximum driving force of the vehicle and the maximum braking force of the vehicle, and the relation between the maximum yaw moment of the vehicle in the left turn direction and the maximum yaw moment of the vehicle in the right turn direction can be represented as follows, where the direction of acceleration of the vehicle is considered to be a positive direction for braking-driving force, and the direction of left turn of the vehicle is considered to be a positive direction for yaw moment.

Fwdflmax=Fwdfrmax=−Fwbflmax=−Fwbfor max
Fwdrlmax=Fwdrrmax=−Fwbrlmax=−Fwbrr max
Fvdfmax=−Fvbf max
Mvlfmax=−Mvrf max
Fvdrfmax=−Fvbrmax
Mvlrmax=−Mvrrmax Further, the maximum driving force Fwdimax and maximum braking force Fwbimax (i=fl, fr, ri, rr) of each wheel is determined by the friction coefficient μ of the road surface. Therefore, the maximum driving forces Fvdfmax and Fvdrmax of the vehicle, the maximum braking forces Fvbfmax and Fvbrmax of the vehicle, and the maximum yaw moments Mvlfmax and Mvlrmax of the vehicle in the left turn direction, and the maximum yaw moments Mvrfmax and Mvrrmax of the vehicle in the right turn direction are also determined by the friction coefficient μ of the road surface. Accordingly, if the friction coefficient μ of the road surface is found, the maximum driving force Fwdimax of each wheel, etc. can be estimated.

Figure 3A:
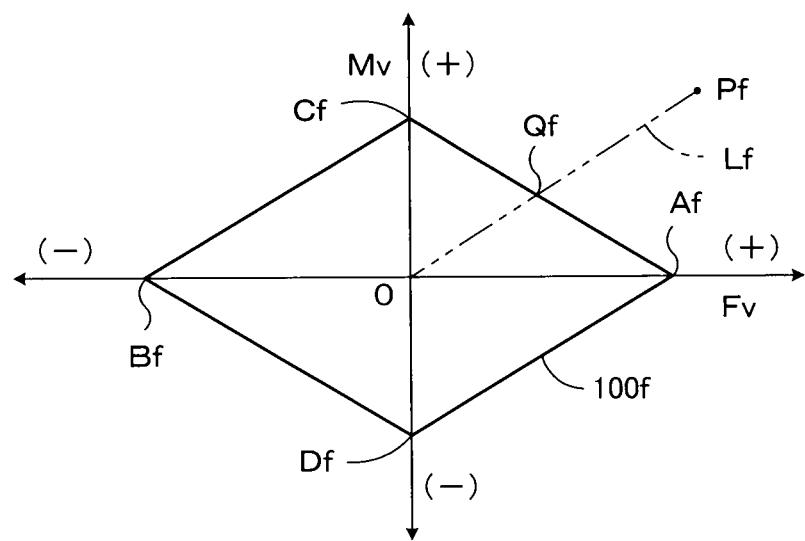
FIG. 3A is an illustration showing a method of calculating a target braking-driving force Fvft of the vehicle and a target yaw moment Mvft of the vehicle to be produced by means of braking-driving forces of the left and right front wheels in the first embodiment.
Figure 3B:
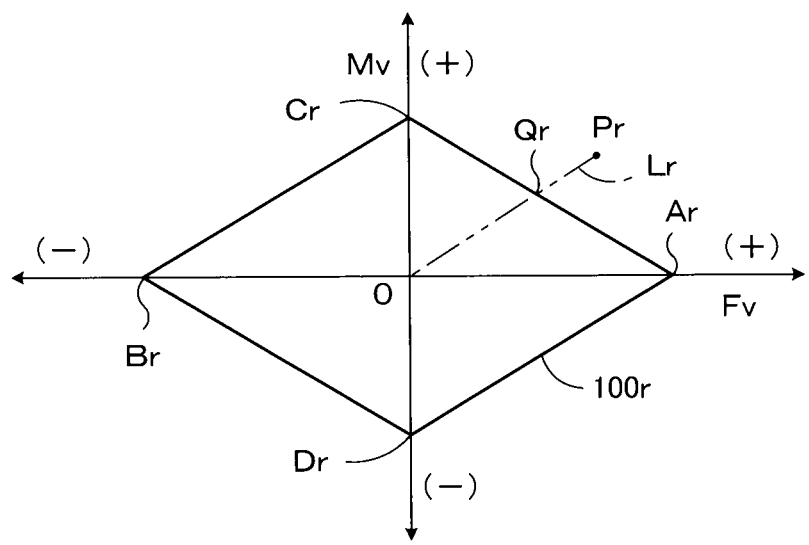
FIG. 3B is an illustration showing a method of calculating a corrected target braking-driving force Fvrt of the vehicle and a corrected target yaw moment Mvrt of the vehicle to be produced by means of braking-driving forces of the left and right rear wheels in the first embodiment.

Further, as shown in FIG. 3A, which shows an orthogonal coordinate system in which the horizontal axis represents braking-driving force Fvx of the vehicle and the vertical axis represents yaw moment Mv of the vehicle, a braking-driving force Fvxf of the vehicle and a yaw moment Mvf of the vehicle, which can be generated through control of the braking-driving forces of the left and right front wheels, assume values within a rhomboid quadrilateral 100f defined by the maximum driving force Fvdfmax of the vehicle, the maximum braking force Fvbfmax of the vehicle, the maximum yaw moment Mvlfmax of the vehicle in the left turn direction, and the maximum yaw moment Mvrfmax of the vehicle in the right turn direction, which are generated by means of the braking-driving forces of the left and right front wheels. Similarly, as shown in FIG. 3B, a braking-driving force Fvxr of the vehicle and a yaw moment Mvr of the vehicle, which can be generated through control of the braking-driving forces of the left and right rear wheels, assume values within a rhomboid quadrilateral 100r defined by the maximum driving force Fvdrmax of the vehicle, the maximum braking force Fvbrmax of the vehicle, the maximum yaw moment Mvlrmax of the vehicle in the left turn direction, and the maximum yaw moment Mvrrmax of the vehicle in the right turn direction, which are generated by means of the braking-driving forces of the left and right rear wheels.

In FIG. 3, points Af to Df and points Ar to Dr are points corresponding to A to D of FIG. 2. The coordinates of the points Af to Df are (Fvdfmax, 0), (Fvbfmax, 0), (0, Mvlfmax), and (0, Mvrfmax), respectively. The coordinates of the points Ar to Dr are (Fvdrmax, 0), (Fvbrmax, 0), (0, Mvlrmax), and (0, Mvrrmax), respectively. The lower the friction coefficient μ of the road surface, the smaller the areas of the quadrilaterals $100f$ and $100r$. Further, when the steering angle θ increases, the lateral forces of the left and right front wheels, which are steerable wheels, increase and the margin of the longitudinal force decreases. Therefore, the greater the steering angle θ, the smaller the area of the quadrilateral $100f$.

When the tread of the vehicle is represented by Tr, the following equations 1 and 2 stand. Accordingly, when the target braking-driving force Fvn of the entire vehicle and the target yaw moment Mvn of the entire vehicle assume values within the range of the above-described quadrilateral $100f$, the electronic control apparatus for driving force control 16 sets the target braking-driving force Fvft of the vehicle and the target yaw moment Mvft of the vehicle, which are to be produced through control of the braking-driving forces of the left and right front wheels to the target braking-driving force Fvn and the target yaw moment Mvn of the vehicle, respectively. Subsequently, the electronic control apparatus for driving force control 16 calculates, as the target braking-driving forces Fwxtfl and Fwxtfr of the left and right front wheels, values which satisfy the following equations 1 and 2, and sets the target braking-driving forces Fwxtrl and Fwxtrr of the left and right rear wheels to zero.

$$Fwxtfl+Fwxtfr=Fvft \quad (1)$$

$$(Fwxtfr-Fwxtfl)Tr/2=Mvft \quad (2)$$

When the target braking-driving force Fvn of the entire vehicle and the target yaw moment Mvn of the entire vehicle assume values outside the range of the above-described quadrilateral $100f$, the electronic control apparatus for driving force control 16 calculates the target braking-driving force Fvft of the vehicle and the target yaw moment Mvft of the vehicle, which are to be produced by means of the braking-driving forces of the left and right front wheels, such that the magnitudes of the braking-driving force Fvf of the vehicle and the yaw moment Mvf of the vehicle, which are to be produced by means of the braking-driving forces of the left and right front wheels, becomes the maximum within a range in which the ratio between the target braking-driving force Fvft and target yaw moment Mvft of the vehicle, which are to be produced by means of the braking-driving forces of the left and right front wheels coincides with the ratio between the target braking-driving force Fvn and target yaw moment Mvn of the entire vehicle. Subsequently, the electronic control apparatus for driving force control 16 calculates, as the target braking-driving forces Fwxtfl and Fwxtfr of the left and right front wheels, values which satisfy the following equations 1 and 2.

Subsequently, in accordance with the following equation 3, the electronic control apparatus for driving force control 16 calculates, as the target braking-driving force Fvrt of the vehicle, which is to be produced by means of the braking-driving forces of the left and right rear wheels, a value obtained by subtracting the target braking-driving force Fvft of the vehicle, which is to be produced by means of the braking-driving forces of the left and right front wheels, from the target braking-driving force Fvn of the entire vehicle.

Further, in accordance with the following equation 4, the electronic control apparatus for driving force control 16 calculates, as the target yaw moment Mvrt of the vehicle, which is to be produced by means of the braking-driving forces of the left and right rear wheels, a value obtained by subtracting the target yaw moment Mvft, which is to be produced by means of the braking-driving forces of the left and right front wheels, from the target yaw moment Mvn of the entire vehicle.

$$Fvrt=Fvn-Fvft \quad (3)$$

$$Mvrt=Mvn-Mvft \quad (4)$$

Further, when the target braking-driving force Fvrt and the target yaw moment Mvrt of the vehicle, which are to be produced by means of the braking-driving forces of the left and right rear wheels, assume values within the range of the above-described quadrilateral $100r$, on the basis of the target braking-driving force Fvrt of the vehicle and the target yaw moment Mvrt of the vehicle, which are to be produced through control of the braking-driving forces of the left and right rear wheels, the electronic control apparatus for driving force control 16 calculates, as the target braking-driving forces Fwxtrl and Fwxtrr of the left and right rear wheels, values which satisfy the following equations 5 and 6.

$$Fwxtrl+Fwxtrr=Fvrt \quad (5)$$

$$(Fwxtrr-Fwxtrl)Tr/2=Mvrt \quad (6)$$

In contrast, when the target braking-driving force Fvrt and the target yaw moment Mvrt of the vehicle, which are to be produced by means of the braking-driving forces of the left and right rear wheels, assume values outside the range of the above-described quadrilateral $100r$, the electronic control apparatus for driving force control 16 calculates the corrected target braking-driving force Fvrt and target yaw moment Mvrt of the vehicle, which are to be produced by means of the braking-driving forces of the left and right rear wheels, such that the magnitudes of the braking-driving force Fvr and yaw moment Mvr of the vehicle, which are to be produced by means of the braking-driving forces of the left and right rear wheels, becomes the maximum within a range in which the ratio between the corrected target braking-driving force Fvrt and target yaw moment Mvrt of the vehicle, which are to be produced by means of the braking-driving forces of the left and right rear wheels, coincides with the ratio between the target braking-driving force Fvrt and target yaw moment Mvrt of the vehicle before correction, which are to be produced by means of the braking-driving forces of the left and right rear wheels (coincides with the ratio between the target braking-driving force Fvn and target yaw moment Mvn of the entire vehicle). Subsequently, the electronic control apparatus for driving force control 16 calculates, as the target braking-driving forces Fwxtrl and Fwxtrr of the left and right rear wheels, values which satisfy the above-described equations 5 and 6.

When the target braking-driving forces Fwxti of the individual wheels each assume a positive value and are driving forces, the electronic control apparatus for driving force control 16 sets target frictional braking forces Fwbti and target regenerative braking forces Fwrti (i=fl, fr, rl, rr) of the individual wheels to zero, and outputs signals representing the target frictional braking forces Fwbti to the electronic control apparatus for braking force control 28. Further, the electronic control apparatus for driving force control 16 sets target driving forces Fwdti (i=fl, fr, rl, rr) of the individual wheels to the target braking-driving forces Fwxti. Subsequently, on the basis of the target driving forces Fwdti and with reference to an unillustrated map or a function, the electronic control apparatus for driving force control 16 calculates target drive currents Iti (i=fl, fr, rl, rr) for the motor generators 12FL to 12RR, and controls the drive currents supplied to the motor generators 12FL to 12RR on the basis of the target drive currents Iti to thereby control the driving forces of the individual wheels such that the braking-driving forces Fwxi of the individual wheels coincide with the target braking-driving forces Fwxti.

In contrast, when the target braking-driving forces Fwxti of the individual wheels each assume a negative value and are braking forces, and the target braking-driving forces Fwxti are not greater than the maximum regenerative braking forces of the individual wheels, the electronic control apparatus for driving force control 16 sets the target driving forces Fwdti and the target frictional braking forces Fwbti of the individual wheels to zero, sets the target regenerative braking forces Fwrti to the target braking-driving forces Fwxi, and controls the motor generators 12FL to 12RR such that the regenerative braking forces coincide with the target regenerative braking forces Fwrti.

When the target braking-driving forces Fwxti of the individual wheels each assume a negative value and are braking forces, and the target braking-driving forces Fwxti are greater than the maximum regenerative braking forces of the individual wheels, the electronic control apparatus for driving force control 16 sets the target driving forces Fwdti of the individual wheels to zero, sets the target regenerative braking forces Fwrti of the individual wheels to the maximum regenerative braking forces Fwxrimax (i=fl, fr, rl, rr), and controls the motor generators 12FL to 12RR such that the regenerative braking forces coincide with the maximum regenerative braking forces Fwxrimax, to thereby control the regenerative braking forces. Further, the electronic control apparatus for driving force control 16 calculates, as the target frictional braking forces Fwbti (i=fl, fr, rl, rr) of the individual wheels, braking forces corresponding to the differences between the target braking-driving forces Fwxti and the maximum regenerative braking forces Fwxrimax, and outputs signals representing the target frictional braking forces Fwbti of the individual wheels to the electronic control apparatus for braking force control 28.

The electronic control apparatus for braking force control 28 calculates target braking pressures Pbti (i=fl, fr, rl, rr) of the individual wheels from the target frictional braking forces Fwbti of the individual wheels received from the electronic control apparatus for driving force control 16, and controls the hydraulic circuit 20 such that braking pressures Pbi of the individual wheels coincide with the target braking pressures Pbti, to thereby control the frictional braking forces Fwbi (i=fl, fr, rl, rr) of the individual wheels such that they coincide with the target frictional braking forces Fwbti.

Figure 4:
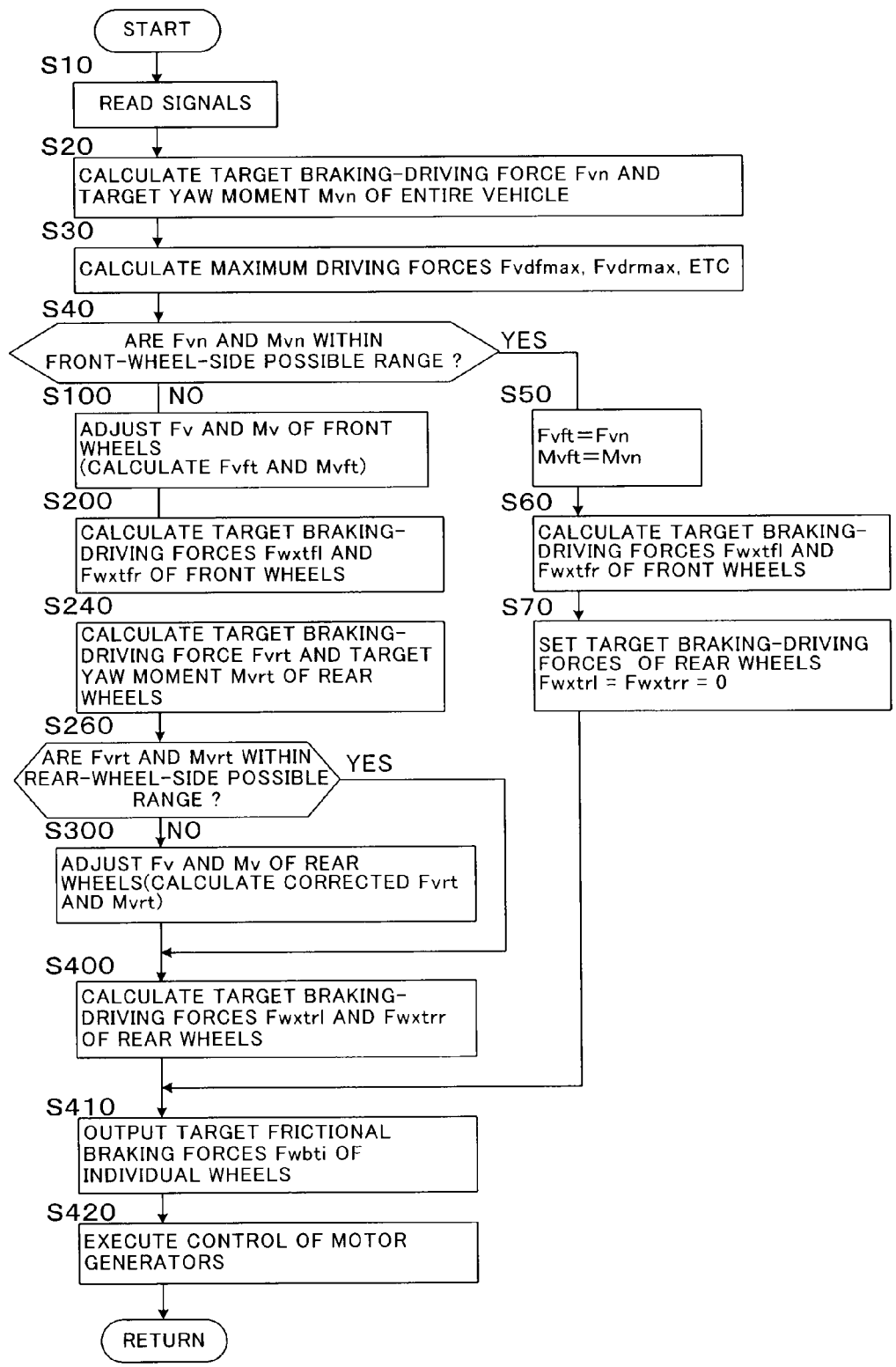
FIG. 4 is a flowchart showing a braking-driving-force control routine performed by an electronic control apparatus for driving force control in the first embodiment.

Next, the braking-driving-force control which is performed by the electronic control apparatus for driving force control 16 in the illustrated first embodiment will be described with reference to the flowchart shown in FIG. 4. Notably, the control represented by the flowchart of FIG. 4 is started when the electronic control apparatus for driving force control 16 is started, and is repeatedly executed at predetermined intervals until an unillustrated ignition switch is turned off.

First, in step 10, signals, including the signal indicating the accelerator opening φ detected by means of the accelerator opening sensor 14, are read; and in step 20, the target braking-driving force Fvn of the entire vehicle and the target yaw moment Mvn of the entire vehicle, which the vehicle must attain through control of the braking-driving forces of the individual wheels, are calculated on the basis of the accelerator opening φ in the above-described manner.

In step 30, on the basis of the friction coefficient μ of the road surface and by use of an unillustrated map or function, the maximum driving force Fvdfmax of the vehicle, the maximum braking force Fvbfmax of the vehicle, the maximum yaw moment Mvlfmax of the vehicle in the left turn direction, and the maximum yaw moment Mvrfmax of the vehicle in the right turn direction, which are generated by means of the braking-driving forces of the left and right front wheels, are calculated, and the maximum driving force Fvdrmax of the vehicle, the maximum braking force Fvbrmax of the vehicle, the maximum yaw moment Mvlrmax of the vehicle in the left turn direction, and the maximum yaw moment Mvrrmax of the vehicle in the right turn direction, which are generated by means of the braking-driving forces of the left and right rear wheels, are calculated. That is, the points Af to Df and the points Ar to Dr shown in FIG. 4 are specified.

In step 40, a determination is made as to whether or not the absolute value of the target braking-driving force Fvn of the entire vehicle is not greater than the maximum driving force Fvdfmax of the vehicle, which is generated by means of the braking-driving forces of the left and right front wheels, and the absolute value of the target yaw moment Mvn of the entire vehicle is not greater than the maximum yaw moment Mvlfmax of the vehicle in the left turn direction, which is generated by means of the braking-driving forces of the left and right front wheels. That is, a determination is made as to whether or not the target braking-driving force Fvn of the entire vehicle and the target yaw moment Mvn of the entire vehicle fall within the range of the above-described quadrilateral 100f, and the target braking-driving force Fvn and the target yaw moment Mvn can be achieved through control of the braking-driving forces of the left and right front wheels. When a negative determination is made, the control processing proceeds to step 100, and when an affirmative determination is made, the control processing proceeds to step 50.

In step 50, the target braking-driving force Fvft of the vehicle and the target yaw moment Mvft of the vehicle, which are to be produced by means of the braking-driving forces of the left and right front wheels, are set to the target braking-driving force Fvn and the target yaw moment Mvn, respectively. In step 60, the target braking-driving forces Fwxtfl and Fwxtfr of the left and right front wheels are calculated from the target braking-driving force Fvft of the vehicle and the target yaw moment Mvft of the vehicle in accordance with the above-described equations 1 and 2. In step 70, the target braking-driving forces Fwxtrl and Fwxtrr of the left and right rear wheels are set to zero. After that, the control processing proceeds to step 410.

In step 100, adjustment of the target braking-driving force and target yaw moment of the front wheels is performed. Thus, the target braking-driving force Fvft of the vehicle and the target yaw moment Mvft of the vehicle, which are to be produced by means of the braking-driving forces of the left and right front wheels, are calculated such that the target braking-driving force Fvn and target yaw moment Mvn of the entire vehicle are attained to a possible extent by means of the braking-driving forces of the left and right front wheels.

For example, as shown in FIG. 3A, an intersection Qf between the outline of the quadrilateral 100f and a line Lf connecting the origin O and a point Pf representing the target braking-driving force Fvn of the entire vehicle and the target yaw moment Mvn of the entire vehicle is obtained as a target point. When the coordinates of the target point Qf are represented by (Fvqf, Mvqf, the target braking-driving force Fvft of the vehicle and the target yaw moment Mvft of the vehicle, which are to be produced by means of the braking-driving forces of the left and right front wheels, are set to Fvqf and Mvqf, respectively.

In step 200, as in the case of step 60, the target braking-driving forces Fwxtfl and Fwxtfr of the left and right front wheels are calculated from the target braking-driving force Fvft of the vehicle and the target yaw moment Mvft of the vehicle in accordance with the above-described equations 1 and 2. After that, the control processing proceeds to step 240.

In step 240, in accordance with the above-described equation 3, the target braking-driving force Fvrt of the vehicle, which is to be produced by means of the braking-driving forces of the left and right rear wheels, is calculated by subtracting the target braking-driving force Fvft of the vehicle, which is to be produced by means of the braking-driving forces of the left and right front wheels, from the target braking-driving force Fvn of the entire vehicle. Further, in accordance with the above-described equation 4, the target yaw moment Mvrt of the vehicle, which is to be produced by means of the braking-driving forces of the left and right rear wheels, is calculated by subtracting the target yaw moment Mvft, which is to be produced by means of the braking-driving forces of the left and right front wheels, from the target yaw moment Mvn of the entire vehicle.

In step 260, a determination is made as to whether or not the absolute value of the target braking-driving force Fvrt of the vehicle, which is to be produced by means of the braking-driving forces of the left and right rear wheels, is not greater than the maximum driving force Fvdrmax of the vehicle, which is generated by means of the braking-driving forces of the left and right rear wheels, and the absolute value of the target yaw moment Mvrt of the vehicle, which is to be produced by means of the braking-driving forces of the left and right rear wheels, is not greater than the maximum yaw moment Mvlrmax of the vehicle in the left turn direction, which is generated by means of the braking-driving forces of the left and right rear wheels. That is, a determination is made as to whether or not the target braking-driving force Fvrt of the vehicle and the target yaw moment Mvrt of the vehicle, which are to be produced by means of the braking-driving forces of the left and right rear wheels, fall within the range of the above-described quadrilateral 100r, and the target braking-driving force Fvrt of the vehicle and the target yaw moment Mvrt of the vehicle can be achieved through control of the braking-driving forces of the left and right rear wheels. When a negative determination is made, the control processing proceeds to step 300, and when an affirmative determination is made, the control processing proceeds to step 400.

In step 300, adjustment of the target braking-driving force and target yaw moment of the rear wheels is performed. Thus, the corrected target braking-driving force Fvrt of the vehicle and the corrected target yaw moment Mvrt of the vehicle, which are to be produced by means of the braking-driving forces of the left and right rear wheels, are calculated such that the target braking-driving force Fvrt of the vehicle and the target yaw moment Mvrt of the vehicle are attained to a possible extent by means of the braking-driving forces of the left and right rear wheels.

For example, as shown in FIG. 3B, an intersection Qr between the outline of the quadrilateral 100r and a line Lr connecting the origin O and a point Pr representing the target braking-driving force Fvrt of the vehicle and the target yaw moment Mvrt of the vehicle, which are to be produced by means of the braking-driving forces of the left and right rear wheels, is obtained as a target point. When the coordinates of the target point Qr are represented by (Fvqr, Mvqr), the target braking-driving force Fvrt of the vehicle and the target yaw moment Mvrt of the vehicle, which are to be produced by means of the braking-driving forces of the left and right rear wheels, are set to Fvqr and Mvqr, respectively.

In step 400, the target braking-driving forces Fwxtrl and Fwxtrr of the left and right rear wheels are calculated from the corrected target braking-driving force Fvrt of the vehicle and the corrected target yaw moment Mvrt of the vehicle in accordance with the above-described equations 5 and 6. After that, the control processing proceeds to step 410.

In step 410, the target frictional braking forces Fwbti are calculated in the above-described manner, and signals representing the target frictional braking forces Fwbti are output to the electronic control apparatus for braking force control 28. Thus, the electronic control apparatus for braking force control 28 controls the frictional braking forces Fwbi of the individual wheels such that they coincide with the target frictional braking forces Fwbti. In step 420, the motor generators 12FL to 12RR are controlled such that the driving forces Fwdi or regenerative braking forces Fwri of the individual wheels coincide with the target driving forces Fwdti or the target regenerative braking forces Fwrti.

According to the illustrated first embodiment, in a state where the target braking-driving force Fvn and the target yaw moment Mvn cannot be achieved through control of the braking-driving forces of the left and right front wheels, the target braking-driving force Fvft of the vehicle and the target yaw moment Mvft of the vehicle, which are to be produced by means of the braking-driving forces of the left and right front wheels, are calculated such that the magnitudes of the braking-driving force Fv and yaw moment Mv of the vehicle, which are to be produced by means of the braking-driving forces of the left and right front wheels, becomes the maximum within a range in which the ratio between the target braking-driving force Fvft and target yaw moment Mvft of the vehicle, which are to be produced by means of the braking-driving forces of the left and right front wheels, coincides with the ratio between the target braking-driving force Fvn and target yaw moment Mvn of the entire vehicle.

Further, in a state where the target braking-driving force Fvrt and target yaw moment Mvrt of the vehicle cannot be achieved through control of the braking-driving forces of the left and right rear wheels, the corrected target braking-driving force Fvrt and target yaw moment Mvrt of the vehicle, which are to be produced by means of the braking-driving forces of the left and right rear wheels, are calculated such that the magnitudes of the braking-driving force Fv and yaw moment Mv of the vehicle, which are to be produced by means of the braking-driving forces of the left and right rear wheels, becomes the maximum within a range in which the ratio between the corrected target braking-driving force Fvrt and target yaw moment Mvrt of the vehicle coincides with the ratio between the target braking-driving force Fvrt and target yaw moment Mvrt of the vehicle before correction, which are to be produced by means of the braking-driving forces of the left and right rear wheels (coincides with the ratio between the target braking-driving force Fvn and target yaw moment Mvn of the entire vehicle).

Accordingly, according to the illustrated first embodiment, even in a case where the braking-driving force and yaw moment required for the vehicle cannot be produced by means of the braking-driving forces that can be generated by the individual wheels, the braking-driving force and yaw moment required for the vehicle can be attained to a possible extent within the range of the braking-driving forces which can be generated by the left and right front wheels and the left and right rear wheels. Further, the adjustment of the target braking-driving force and target yaw moment of the vehicle which are produced by means of the left and right front wheels or the left and right rear wheels can be performed such that the ratio between the target braking-driving force and target yaw moment of the vehicle coincides with the ratio between the target braking-driving force and target yaw moment of the entire vehicle without fail.

In Japanese Patent Application No. 2005-26758, which was filed by the applicant of the present application, when the target braking-driving force or target yaw moment of the entire vehicle cannot be achieved by means of the braking-driving forces of the individual wheels, adjustment is performed such that the magnitudes of the braking-driving force and yaw moment of the vehicle, which are produced by means of the braking-driving forces of the individual wheels, assume the maximum values within the range in which the ratio between the braking-driving force and yaw moment of the vehicle which are produced by means of the braking-driving forces of the individual wheels substantially coincides with the ratio between the target braking-driving force and target yaw moment of the entire vehicle, whereby the corrected target braking-driving force and target yaw moment are calculated. Subsequently, the target braking-driving forces of the individual wheels are calculated on the basis of the corrected target braking-driving force and target yaw moment. In such a case, depending on the distribution ratio of the braking-driving force between the front and rear wheels, the target braking-driving forces of the front wheels or the rear wheels may be calculated to assume values which in actuality cannot be generated by the front wheels or the rear wheels, or values smaller than those which in actuality can be generated by the front wheels or the rear wheels.

Further, in the above-described, previously proposed braking-driving-force control apparatus, the target braking-driving forces of the individual wheels must be calculated, through complicated calculation (e.g., convergence calculation) on the basis of the target braking-driving force and target yaw moment of the vehicle, and the distribution ratio of braking-driving forces between the front and rear wheels.

Notably, the problems described above in relation to the previously proposed braking-driving-force control apparatus still exist in the braking-driving-force control apparatus which are proposed in Japanese Patent Application Nos. 2005-26770, 2005-56490, 2005-26492, 2005-26499, and 2005-56503 (filed by the applicant of the present application) and which employ other adjustment methods.

In contrast, according to the illustrated first embodiment, the target braking-driving forces of the front wheels and the rear wheels is reliably prevented from being calculated to assume values which in actuality cannot be generated by the front wheels or the rear wheels, or values smaller than those which in actuality can be generated by the front wheels and the rear wheels. Thus, it is possible to achieve the target braking-driving force and target yaw moment of the entire vehicle to a possible extent through maximum use of the braking-driving forces of the individual wheels. In addition, it is possible to readily calculate the target braking-driving forces of the individual wheels without requiring complicated calculation such as convergence calculation. Notably, this action and effect can be similarly obtained in other embodiments, which will be described later.

Further, according to the illustrated first embodiment, the braking-driving forces of the left and right front wheels are controlled such that the target braking-driving force Fvn and target yaw moment Mvn of the entire vehicle are achieved to a possible extent by means of the braking-driving forces of the left and right front wheels, and the braking-driving forces of the left and right rear wheels are controlled such that the target braking-driving force and target yaw moment of the vehicle which cannot be achieved by means of the braking-driving forces of the left and right front wheels are achieved to a possible extent by means of the braking-driving forces of the left and right rear wheels. Therefore, in a case where the magnitudes of the target braking-driving force Fvn and target yaw moment Mvn of the entire vehicle are small, the target braking-driving force Fvn and target yaw moment Mvn of the entire vehicle can be achieved mainly by means of the braking-driving forces of the left and right front wheels, whereby a better travel stability of the vehicle can be secured, as compared with a case where the target braking-driving force Fvn and target yaw moment Mvn of the entire vehicle are achieved mainly by means of the braking-driving forces of the left and right rear wheels. Notably, this action and effect can also be similarly obtained in other embodiments, which will be described later.

Further, according to the illustrated first embodiment, the drive sources of the individual wheels are the motor generators 12FL to 12RR provided in the individual wheels, and when the target braking-driving forces Fwxti of the individual wheels assume negative values and are braking forces, regenerative braking forces of the motor generators 12FL to 12RR are utilized. Therefore, it is possible to effectively collect, as electric energy, the kinetic energy of the vehicle when the vehicle is braked and decelerated, while achieving the braking-driving force and yaw moment required for the vehicle to a possible extent within the range of the braking-driving forces that can be generated by the individual wheels. Notably, this action and effect can also be similarly obtained in other embodiments, which will be described later.

Notably, in the illustrated first embodiment, the motor generators 12FL to 12RR are in-wheel motors; however, the motor generators may be provided on the vehicle body side. The motors serving as the drive sources of the individual wheels may be those which do not perform regenerative braking, and the drive sources may be drive sources of any type other than motors, so long as the selected drive sources can increase and decrease the driving forces of the individual wheels independently of one another. This also applies in other embodiments, which will be described later.

Second Embodiment

Figure 5:
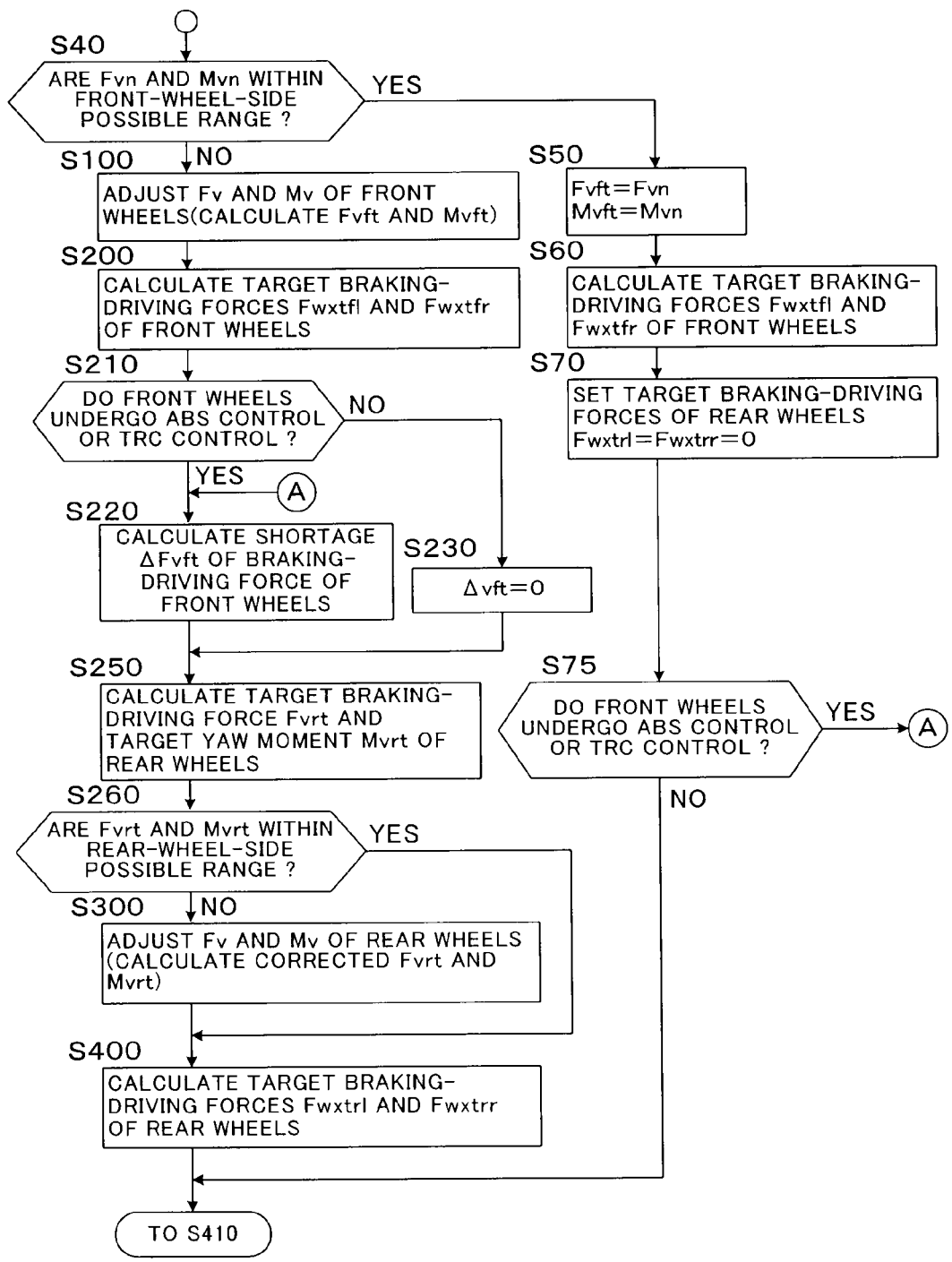
FIG. 5 is a flowchart showing a braking-driving-force control routine performed by the electronic control apparatus for driving force control in a second embodiment.

FIG. 5 is a flowchart showing a main portion of a braking-driving-force control routine in a second embodiment of the braking-driving-force control apparatus for a vehicle according to the present invention which is applied to a wheel-in-motor-type four-wheel-drive vehicle. In FIG. 5, steps identical to those shown in FIG. 4 are denoted by the same step numbers.

Although not shown in the drawings, in the second embodiment, the electronic control apparatus for driving force control 16 calculates a vehicle body speed Vb and acceleration slip amounts SAi (i=fl, fr, rl, rr) of the individual wheels from the wheel speeds Vwi of the individual wheels in a manner known in the art. When one of the acceleration slip amounts SAi becomes greater than a reference value for start of traction control (TRC control) and a condition for starting the traction control is satisfied, the electronic control apparatus for driving force control 16 performs the traction control by controlling the braking pressure Pi of the corresponding wheel such that the acceleration slip amount of the wheel falls within a predetermined range, until a condition for ending the traction control is satisfied.

Further, the electronic control apparatus for braking force control 28 calculates a vehicle body speed Vb and braking slip amounts SBi (i=fl, fr, rl, rr) of the individual wheels from the wheel speeds Vwi of the individual wheels in a manner known in the art. When one of the braking slip amounts SBi becomes greater than a reference value for start of antiskid control (ABS control) and a condition for starting the antiskid control is satisfied, the electronic control apparatus for braking force control 28 performs the antiskid control by controlling the braking pressure Pi of the corresponding wheel such that the braking slip amount of the wheel falls within a predetermined range, until a condition for ending the antiskid control is satisfied.

In the second embodiment, steps 10 to 200, steps 260 to 400, and steps 410 and 420 are executed in the same manner as in the first embodiment. After completion of step 200, in step 210, a determination is made as to whether or not the braking-driving force of at least one of the left and right front wheels is restricted because that wheel undergoes the antiskid control or traction control. When a negative determination is made, the control processing proceeds to step 230, and when an affirmative determination is made, the control processing proceeds to step 220.

In step 220, the braking-driving force of a wheel whose braking-driving force is restricted is estimated. Further, when the left front wheel is restricted in braking-driving force, a deviation $\Delta Fwxfl$ between the target braking-driving force Fwxtfl and the actual braking-driving force Fwxfl is calculated as a shortage $\Delta Fvft$ of the braking-driving force of the front wheels. When the right front wheel is restricted in braking-driving force, a deviation $\Delta Fwxfr$ between the target braking-driving force Fwxtfr and the actual braking-driving force Fwxfr is calculated as the shortage $\Delta Fvft$ of the braking-driving force of the front wheels. When the left and right front wheels are restricted in braking-driving force, the sum of the deviation $\Delta Fwxfl$ and the deviation $\Delta Fwxfr$ is calculated as the shortage $\Delta Fvft$ of the braking-driving force of the front wheels. In step 230, the shortage $\Delta Fvft$ of the braking-driving force of the front wheels is set to zero. After completion of step 220 or 230, the control processing proceeds to step 250.

In step 250, the target yaw moment Mvrt of the vehicle, which is to be produced by means of the braking-driving forces of the left and right rear wheels, is calculated in accordance with the above-described equation 4; i.e., by subtracting the target yaw moment Mvft, which is to be produced by means of the braking-driving forces of the left and right front wheels, from the target yaw moment Mvn of the entire vehicle. However, the target braking-driving force Fvrt of the vehicle, which is to be produced by means of the braking-driving forces of the left and right rear wheels, is calculated in accordance with the following equation 7; i.e., by adding the shortage $\Delta Fvft$ of the braking-driving force of the front wheels to the value obtained by subtracting the target braking-driving force Fvft of the vehicle, which is to be produced by means of the braking-driving forces of the left and right front wheels, from the target braking-driving force Fvn of the entire vehicle.

$$Fvrt=Fvn-Fvft+\Delta Fvft \quad (7)$$

After completion of step 70, in step 75, a determination similar to that in the above-described step 210 is performed. That is, a determination is made as to whether or not the braking-driving force of at least one of the left and right front wheels is restricted because that wheel undergoes the antiskid control or traction control. When a negative determination is made, the control processing proceeds to step 410, and when an affirmative determination is made, the control processing proceeds to step 220.

Thus, according to the illustrated second embodiment, addition to the action and effects of the above-described first embodiment, the following action and effects can be attained. That is, even in a case where the front wheels undergo the antiskid control or traction control and the target braking-driving force Fvft of the left and right front wheels cannot be achieved, the shortage $\Delta Fvft$ of the braking-driving force is added to the target braking-driving force Fvrt of the rear wheels, whereby the target braking-driving force Fvrt and target yaw moment Mvrt of the vehicle, which are to be produced by means of the braking-driving forces of the left and right rear wheels, are adjusted. Therefore, even in a case where at least one of the left and right front wheels undergoes the antiskid control or traction control, it is possible to reliably reduce the possible of failing to achieve the target braking-driving force Fvn of the entire vehicle due to the shortage $\Delta Fvft$ of the braking-driving force.

Figure 6A:
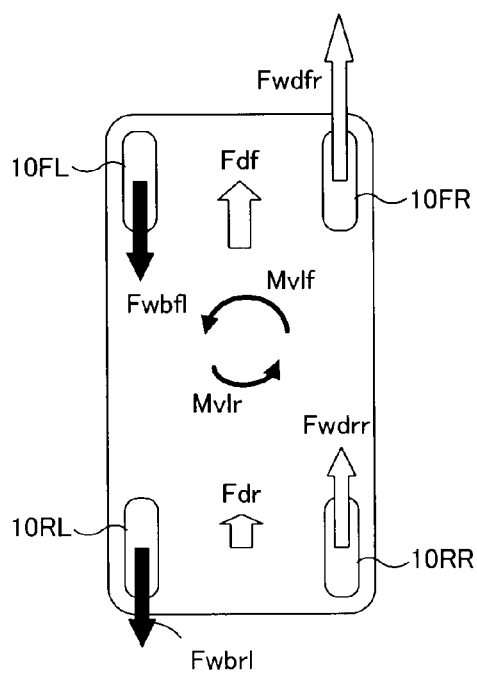
FIG. 6 is a set of illustrations showing example adjustment of a target braking-driving force of the vehicle and a target yaw moment of the vehicle in a case where the right front wheel undergoes traction control in the second embodiment.
Figure 6B:
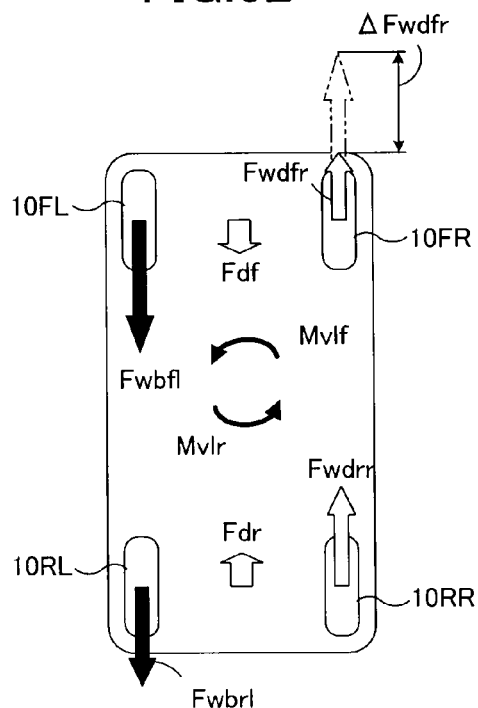

FIG. 6A shows the target braking-driving forces Fwxti of the individual wheels under the assumption that neither the left front wheel nor the right front wheel undergoes the antiskid control or the traction control. Here, it is assumed that the driving force of the right front wheel is insufficient by the amount of $\Delta Fwdfr$ because the right front wheel undergoes the traction control. In the case of the above-described first embodiment, as shown in FIG. 6B, the braking-driving force of the left and right front wheels becomes insufficient by the amount of $\Delta Fwdfr$, and the yaw moment Mvlf, which is produced by means of the braking-driving force of the left and right front wheels, also becomes short. As a result, the braking-driving force and yaw moment of the entire vehicle become insufficient.

Figure 6C:
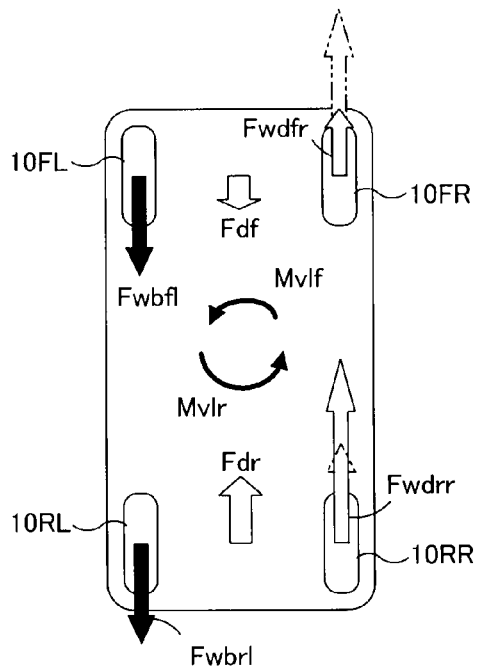

In contrast, according to the illustrated second embodiment, as shown in FIG. 6C, the shortage $\Delta Fwdfr$ of the braking-driving force of the left and right front wheels is supplemented by the braking-driving force of the left and right rear wheels. Therefore, even in a case where the front wheels undergo the antiskid control or the traction control, it is possible to achieve the target braking-driving force Fvn of the entire vehicle to a possible extent, while achieving the target yaw moment Mvrt of the vehicle, which is to be produced by means of the braking-driving forces of the left and right rear wheels. Thus, the travel performance of the vehicle at the time when the front wheels undergo the antiskid control or the traction control can be improved, as compared with the case of the above-described first embodiment.

Further, in a case where the antiskid control or the traction control is performed for one of the left and right front wheels as in a ninth embodiment, which will be described later, a braking-driving force corresponding to the shortage $\Delta Fwdfr$ of the braking-driving force of the front wheel may be added, for correction, to the target braking-driving force of a rear wheel which is located on the same side as that front wheel with respect to the lateral direction of the vehicle. However, in such a case, due to addition correction of the braking-driving force, the target braking-driving force of that rear wheel may become excessively large in some cases. In contrast, according to the illustrated second embodiment, the adjustment of the target braking-driving force Fvrt and target yaw moment Mvrt of the vehicle, which are to be produced by means of the braking-driving forces of the left and right rear wheels, is performed by adding the shortage $\Delta Fvft$ of the braking-driving force to the target braking-driving force Fvrt of the rear wheels. Therefore, it is possible to reliably prevent the target braking-driving force of the rear wheels from becoming excessively large.

Third Embodiment

Figure 7:
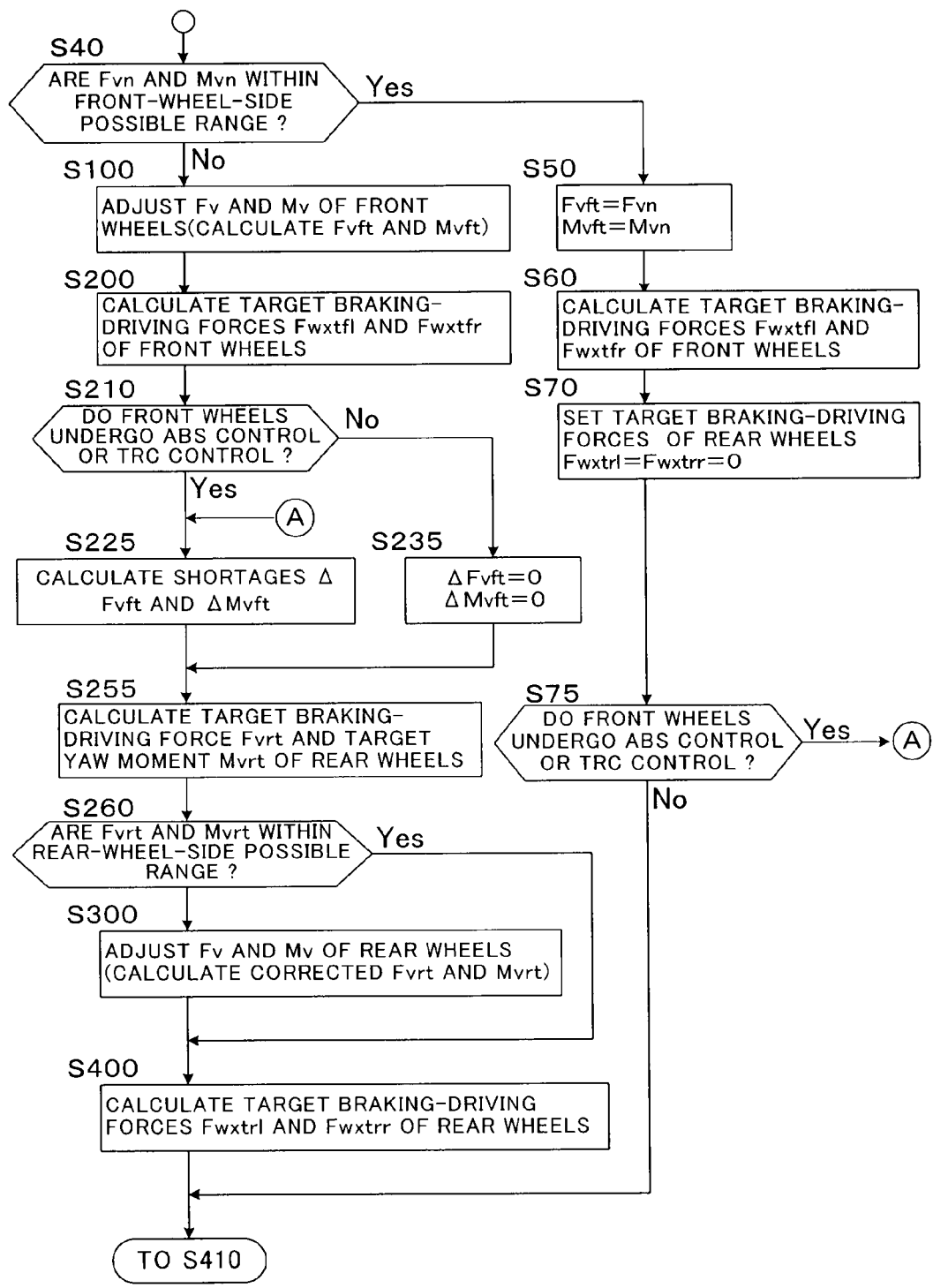
FIG. 7 is a flowchart showing a braking-driving-force control routine performed by the electronic control apparatus for driving force control in a third embodiment.

FIG. 7 is a flowchart showing a main portion of a braking-driving-force control routine in a third embodiment of the braking-driving-force control apparatus for a vehicle according to the present invention which is applied to a wheel-in-motor-type four-wheel-drive vehicle. In FIG. 7, steps identical to those shown in FIG. 4 are denoted by the same step numbers.

Although not shown in the drawings, in the third embodiment as well, the electronic control apparatus for driving force control 16 performs traction control when necessary; and the electronic control apparatus for braking force control 28 performs antiskid control when necessary.

In the third embodiment, steps 10 to 210, steps 260 to 400, and steps 410 and 420 are executed in the same manner as in the second embodiment. However, when an affirmative determination is made in step 210, that is, when the braking-driving force of at least one of the left and right front wheels is restricted because that wheel undergoes the antiskid control or traction control, the control processing proceeds to step 225, and when a negative determination is made, the control processing proceeds to step 235.

In step 225, the shortage $\Delta Fvft$ of the braking-driving force of the front wheels is calculated in the same manner as in step 220 of the above-described second embodiment, and a deviation between the target yaw moment Mvft, which is to be produced by means of the braking-driving forces of the left and right front wheels, and the actual yaw moment Mvf is calculated as a shortage $\Delta Mvft$ of the yaw moment of the front wheels. In step 235, the shortage $\Delta Fvft$ of the braking-driving force of the front wheels and the shortage $\Delta Mvft$ of the yaw moment of the front wheels are set to zero. After completion of step 225 or 235, the control processing proceeds to step 255.

In step 255, the target braking-driving force Fvrt of the vehicle, which is to be produced by means of the braking-driving forces of the left and right rear wheels, is calculated in accordance with the above-described equation 7; i.e., by adding the shortage $\Delta Fvft$ of the braking-driving force of the front wheels to the value obtained by subtracting the target braking-driving force Fvft of the vehicle, which is to be produced by means of the braking-driving forces of the left and right front wheels, from the target braking-driving force Fvn of the entire vehicle. In addition, the target yaw moment Mvrt of the vehicle, which is to be produced by means of the braking-driving forces of the left and right rear wheels, is calculated in accordance with the following equation 8; i.e., by adding the shortage $\Delta Mvft$ of the yaw moment of the front wheels to the value obtained by subtracting the target yaw moment Mvft, which is to be produced by means of the braking-driving forces of the left and right front wheels, from the target yaw moment Mvn of the entire vehicle.

$$Mvrt = Mvn - Mvft + \Delta Mvft \quad (8)$$

In this embodiment as well, after completion of step 70, in step 75, a determination similar to that in the above-described step 210 is performed. That is, a determination is made as to whether or not the braking-driving force of at least one of the left and right front wheels is restricted because that wheel undergoes the antiskid control or traction control. When a negative determination is made, the control processing proceeds to step 410, and when an affirmative determination is made, the control processing proceeds to step 225.

Thus, according to the illustrated third embodiment, addition to the action and effects of the above-described first embodiment, the following action and effects can be attained. That is, even in a case where the front wheels undergo the antiskid control or traction control and the target braking-driving force Fvft and the target moment Mvft of the left and right front wheels cannot be achieved, the shortage $\Delta Fvft$ of the braking-driving force is added to the target braking-driv-ing force Fvrt of the rear wheels, and the shortage $\Delta Mvft$ of the yaw moment is added to the target yaw moment Mvrt of the rear wheels, whereby the target braking-driving force Fvrt and target yaw moment Mvrt of the vehicle, which are to be produced by means of the braking-driving forces of the left and right rear wheels, are adjusted. Therefore, even in a case where the left and right front wheels undergo the antiskid control or traction control, it is possible to reliably reduce the possible of failing to achieve the target braking-driving force Fvn of the entire vehicle due to the shortage $\Delta Fvft$ of the braking-driving force, and the possible of failing to achieve the target yaw moment Mvn of the entire vehicle due to the shortage $\Delta Mvft$ of the yaw moment.

Figure 8A:
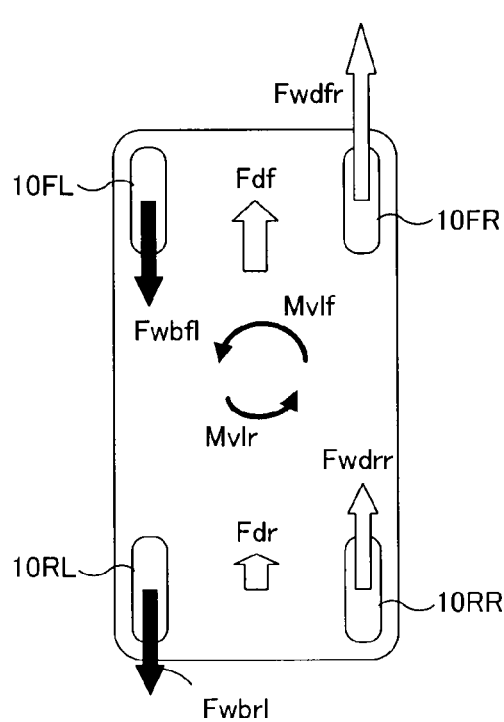
FIG. 8 is a set of illustrations showing example adjustment of a target braking-driving force of the vehicle and a target yaw moment of the vehicle in a case where the right front wheel undergoes traction control in the third embodiment.
Figure 8B:
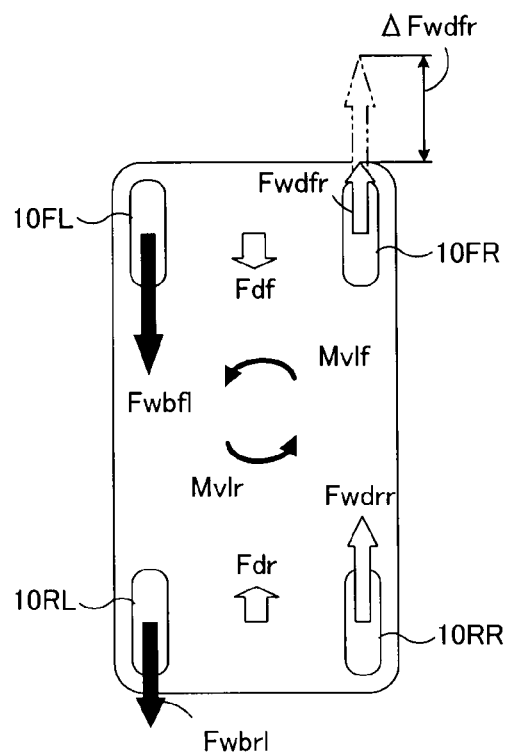

FIG. 8A shows the target braking-driving forces Fwxti of the individual wheels under the assumption that the front wheels do not undergo the antiskid control or the traction control. Here, it is assumed that the driving force of the right front wheel is insufficient by the amount of $\Delta Fwdfr$ and the yaw moment of the right front wheel is insufficient by the amount of $\Delta Mvif$ because the right front wheel undergoes the traction control. In the case of the above-described first embodiment, as shown in FIG. 8(B), the braking-driving force of the left and right front wheels becomes insufficient by the amount of $\Delta Fwdfr$, and the yaw moment Mvlf, which is produced by means of the braking-driving force of the left and right front wheels, also becomes short. As a result, the braking-driving force and yaw moment of the entire vehicle become insufficient.

Figure 8C:
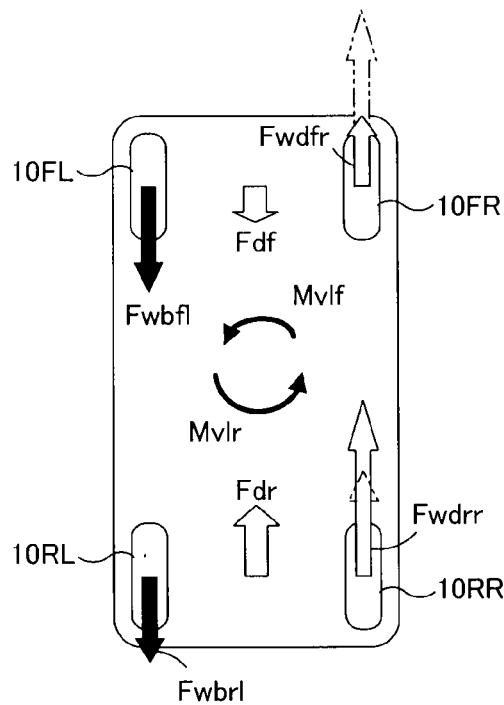

In contrast, according to the illustrated third embodiment, as shown in FIG. 8C, the shortage $\Delta Fwdfr$ of the braking-driving force of the front wheels is supplemented by the braking-driving force of the left and right rear wheels; and the shortage $\Delta Mvlf$ of the yaw moment of the front wheels is supplemented by the yaw moment produced by means of the braking-driving force of the left and right rear wheels. Therefore, even in a case where the front wheels undergo the antiskid control or the traction control, it is possible to achieve the target braking-driving force Fvn of the entire vehicle and the target yaw moment Mvn of the entire vehicle to a possible extent. Thus, the travel performance of the vehicle at the time when the front wheels undergo the antiskid control or the traction control can be improved further, as compared with the case of the above-described second embodiment.

Fourth Embodiment

Figure 9A:
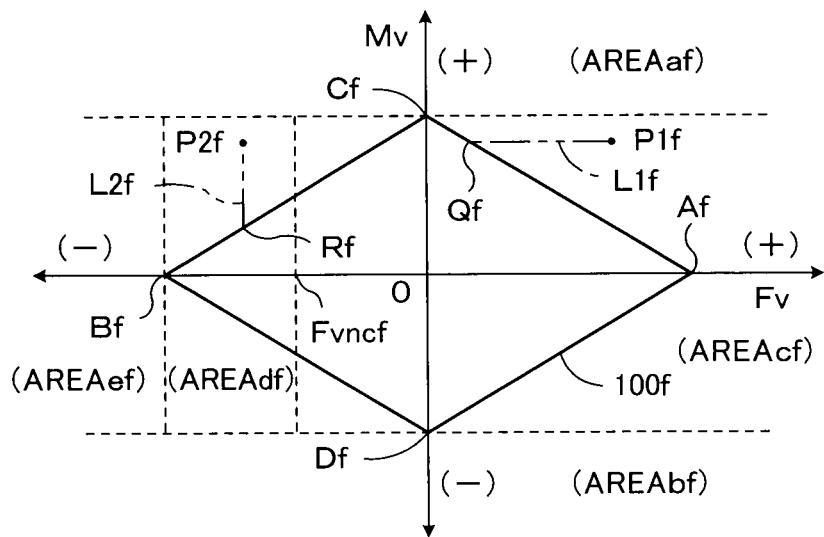
FIG. 9A is an illustration showing a method of calculating a target braking-driving force Fvft of the vehicle and a target yaw moment Mvft of the vehicle to be produced by means of braking-driving forces of the left and right front wheels in a fourth embodiment.
Figure 9B:
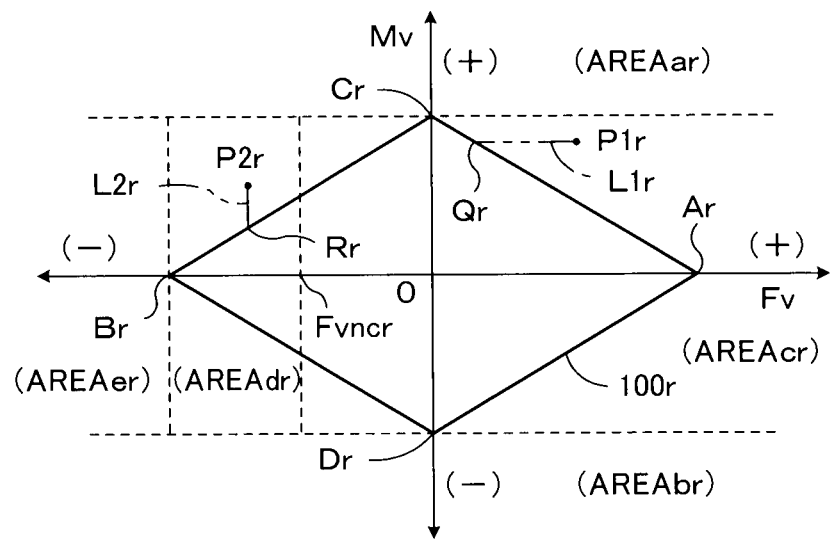
FIG. 9B is an illustration showing a method of calculating a corrected target braking-driving force Fvrt of the vehicle and a corrected target yaw moment Mvrt of the vehicle to be produced by means of braking-driving forces of the left and right rear wheels in the fourth embodiment.

FIGS. 9A and 9B are flowcharts each showing a method of adjusting the target braking-driving force and target yaw moment of the front wheels and adjusting the target braking-driving force and target yaw moment of the rear wheels in a fourth embodiment of the braking-driving-force control apparatus for a vehicle according to the present invention, the fourth embodiment being a modification of the first to third embodiments.

Although not shown in the drawings, steps other than the steps (step 100 and 300) for adjusting the target braking-driving force and the target yaw moment in the fourth embodiment are performed in the same manner as in any of the above-described first through third embodiments. This is the same in fifth through eighth embodiments, which will be described later.

In FIG. 9, areas af, ar, bf, and br are areas in which the magnitude of the yaw moment required for the vehicle is large; and areas cf and cr are areas in which the magnitude of braking force required for the vehicle is not so large. Therefore, in these areas, priority is desirably placed on yaw moment. Further, areas df, dr, ef, and er are areas in which the magnitude of the braking force required for the vehicle is large. Therefore, in these areas, priority is desirably placed on braking-driving force. Notably, reference values Fvncf and Fvncr are negative constants which are larger than Fvbfmax and Fvbrmax, respectively.

The adjustment (step 100) of the target braking-driving force and target yaw moment of the front wheels in the fourth embodiment is performed as follows. When the point representing the target braking-driving force Fvn and target yaw moment Mvn of the entire vehicle is located in the area af, the target braking-driving force Fvft of the vehicle, which is to be produced by means of the braking-driving forces of the left and right front wheels, is set to zero, and the target yaw moment Mvft of the vehicle, which is to be produced by means of the braking-driving forces of the left and right front wheels, is set to the maximum yaw moment Mvlfmax (the values at a point Cf. When the point representing the target braking-driving force Fvn and target yaw moment Mvn of the entire vehicle is located in the area bf, the target braking-driving force Fvft of the vehicle, which is to be produced by means of the braking-driving forces of the left and right front wheels, is set to zero, and the target yaw moment Mvft of the vehicle, which is to be produced by means of the braking-driving forces of the left and right front wheels, is set to the maximum yaw moment Mvrfmax (the values at a point Df).

When the point representing the target braking-driving force Fvn and target yaw moment Mvn of the entire vehicle is located in the area cf, intersection points between the outline of the quadrilateral 100f and a line L1f, which passes through the point (P1f) representing the target braking-driving force Fvn and target yaw moment Mvn of the entire vehicle and is parallel to the horizontal axis, are obtained, and of the intersection points, a point Qf closer to the point P1f is obtained as a target point. When the coordinates of the target point Qf are represented by (Fvqf, Mvqf), the target braking-driving force Fvft of the vehicle, which is to be produced by means of the braking-driving forces of the left and right front wheels, is set to Fvqf, and the target yaw moment Mvft of the vehicle, which is to be produced by means of the braking-driving forces of the left and right front wheels, is set to Mvqf.

When the point representing the target braking-driving force Fvn and target yaw moment Mvn of the entire vehicle is located in the area df, intersection points between the outline of the quadrilateral 100f and a line L2f, which passes through the point (P2f) representing the target braking-driving force Fvn and target yaw moment Mvn of the entire vehicle and is parallel to the vertical axis, are obtained, and of the intersection points, a point Rf closer to the point P2f is obtained as a target point. When the coordinates of the target point Rf are represented by (Fvrf, Mvrf), the target braking-driving force Fvft of the vehicle, which is to be produced by means of the braking-driving forces of the left and right front wheels, is set to Fvrf, and the target yaw moment Mvft of the vehicle, which is to be produced by means of the braking-driving forces of the left and right front wheels, is set to Mvrf.

When the point representing the target braking-driving force Fvn and target yaw moment Mvn of the entire vehicle is located in the area df, the target braking-driving force Fvft of the vehicle, which is to be produced by means of the braking-driving forces of the left and right front wheels, is set to the maximum braking force Fvbfmax, and the target yaw moment Mvft of the vehicle, which is to be produced by means of the braking-driving forces of the left and right front wheels, is set to zero (the values at a point Bf).

Similarly, the adjustment (step 300) of the target braking-driving force and target yaw moment of the rear wheels in the fourth embodiment is performed as follows. When the point representing the target braking-driving force Fvrt and target yaw moment Mvrt of the vehicle, which are to be produced by means of the braking-driving forces of the left and right rear wheels, is located in the area ar, the corrected target braking-driving force Fvrt of the vehicle, which is to be produced by means of the braking-driving forces of the left and right rear wheels, is set to zero, and the corrected target yaw moment Mvrt of the vehicle, which is to be produced by means of the braking-driving forces of the left and right rear wheels, is set to the maximum yaw moment Mvlrmax (the values at a point Cr). When the point representing the target braking-driving force Fvrt and target yaw moment Mvrt of the vehicle, which are to be produced by means of the braking-driving forces of the left and right rear wheels, is located in the area br, the corrected target braking-driving force Fvrt of the vehicle, which is to be produced by means of the braking-driving forces of the left and right rear wheels, is set to zero, and the corrected target yaw moment Mvrt of the vehicle, which is to be produced by means of the braking-driving forces of the left and right rear wheels, is set to the maximum yaw moment Mvrrmax (the values at a point Dr).

When the point representing the target braking-driving force Fvrt and target yaw moment Mvrt of the vehicle, which are to be produced by means of the braking-driving forces of the left and right rear wheels, is located in the area cr, intersection points between the outline of the quadrilateral 100r and a line L1r, which passes through the point (P1r) representing the target braking-driving force Fvrt and target yaw moment Mvrt of the vehicle, which are to be produced by means of the braking-driving forces of the left and right rear wheels, and is parallel to the horizontal axis, are obtained, and of the intersection points, a point Qr closer to the point P1r is obtained as a target point. When the coordinates of the target point Qr are represented by (Fvqr, Mvqr), the corrected target braking-driving force Fvrt and target yaw moment Mvrt of the vehicle, which are to be produced by means of the braking-driving forces of the left and right rear wheels, are set to Fvqr and Mvqr, respectively.

When the point representing the target braking-driving force Fvrt and target yaw moment Mvrt of the vehicle, which are to be produced by means of the braking-driving forces of the left and right rear wheels, is located in the area dr, intersection points between the outline of the quadrilateral 100r and a line L2r, which passes through the point (P2r) representing the target braking-driving force Fvrt and target yaw moment Mvrt of the vehicle, which are to be produced by means of the braking-driving forces of the left and right rear wheels, and is parallel to the vertical axis, are obtained, and of the intersection points, a point Rr closer to the point P2r is obtained as a target point. When the coordinates of the target point Rr are represented by (Fvrr, Mvrr), the corrected target braking-driving force Fvrft of the vehicle, which is to be produced by means of the braking-driving forces of the left and right rear wheels, is set to Fvrr, and the corrected target yaw moment Mvrt of the vehicle, which is to be produced by means of the braking-driving forces of the left and right rear wheels, is set to Mvrr.

When the point representing the target braking-driving force Fvrt and target yaw moment Mvrt of the vehicle, which are to be produced by means of the braking-driving forces of the left and right rear wheels, is located in the area dr, the corrected target braking-driving force Fvrt of the vehicle, which is to be produced by means of the braking-driving forces of the left and right rear wheels, is set to the maximum braking force Fvbrmax, and the corrected target yaw moment Mvrt of the vehicle, which is to be produced by means of the braking-driving forces of the left and right rear wheels, is set to zero (the values at a point Br).

Accordingly, according to the illustrated fourth embodiment, in addition to the actions and effects of the above-described first through third embodiments, the following action and effect can be attained. When a turning demand for the vehicle is high, that demand is respected for. When an acceleration/deceleration demand for the vehicle is high, that demand is respected for. In such a state, while the turning demand or the acceleration/deceleration demand is respected for, the target braking-driving forces and target yaw moments of the left and right front wheels and the left and right rear wheels can be adjusted such that the braking-driving force and yaw moment required for the vehicle can be achieved to a possible extent within the range of the braking-driving forces that the front and rear wheels can generate.

Fifth Embodiment

Figure 10:
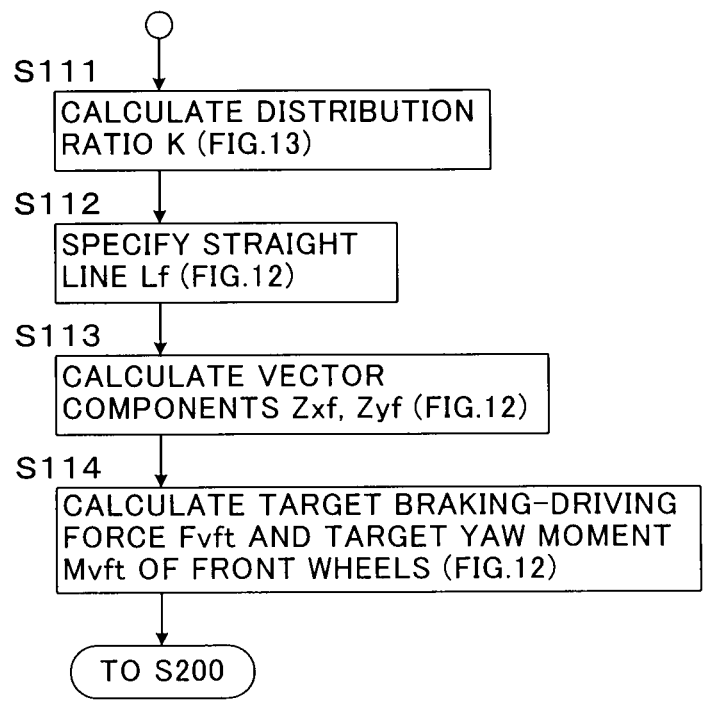
FIG. 10 is a flowchart showing an adjustment routine for adjusting a target braking-driving force of the vehicle and a target yaw moment of the vehicle to be produced by means of braking-driving forces of the left and right front wheels in a fifth embodiment.
Figure 11:
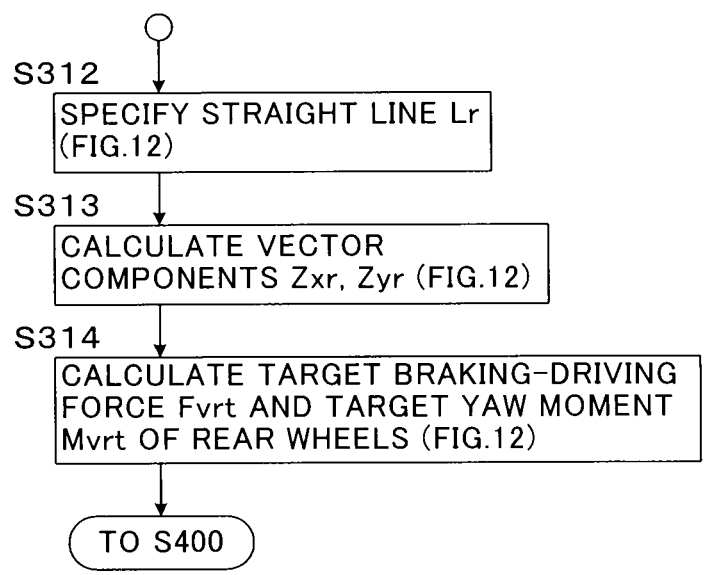
FIG. 11 is a flowchart showing an adjustment routine for adjusting a target braking-driving force of the vehicle and a target yaw moment of the vehicle to be produced by means of braking-driving forces of the left and right rear wheels in the fifth embodiment.

FIG. 10 is a flowchart showing a control routine for adjusting the target braking-driving force and target yaw moment of the front wheels in a fifth embodiment of the braking-driving-force control apparatus for a vehicle according to the present invention, the fifth embodiment being a modification of the first to third embodiments. FIG. 11 is a flowchart showing a control routine for adjusting the target braking-driving force and target yaw moment of the rear wheels in the fifth embodiment.

Figure 13:
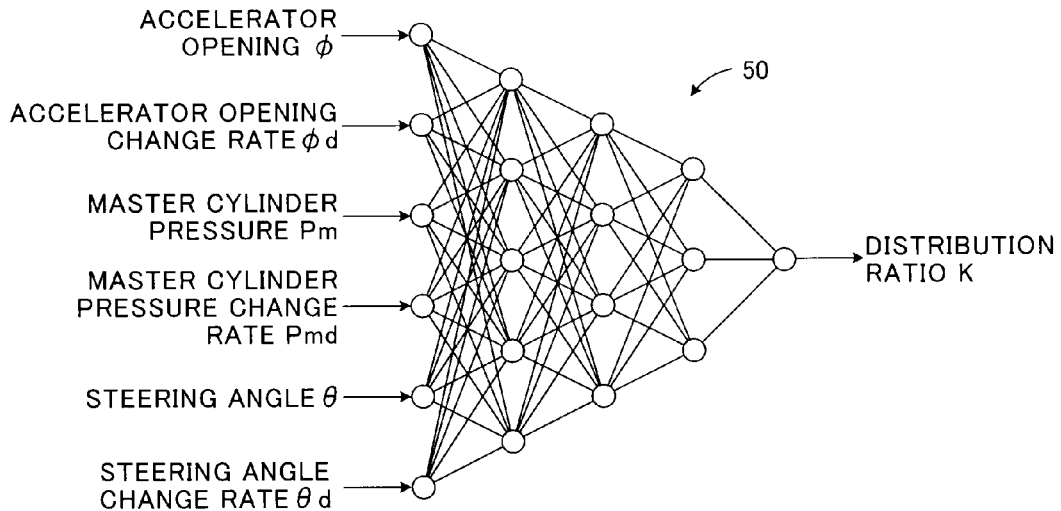
FIG. 13 is a diagram showing a neural network used in the fifth embodiment.

In the fifth embodiment, when a negative determination is made in step 40, the control processing proceeds to step 111. In step 111, a distribution ratio K, which represents the ratio of distribution to yaw moment, is calculated by use of a neural network 50 shown in FIG. 13 such that the greater the value which indicates a driver's acceleration/deceleration operation (accelerator opening φ, accelerator opening change rage φd, master cylinder pressure Pm, master cylinder pressure change rate Pmd), the smaller the distribution ratio K, and that the greater the value which indicates a driver's steering operation (steering angle θ, steering angle change rate θd), the larger the distribution ratio K.

Figure 12A:
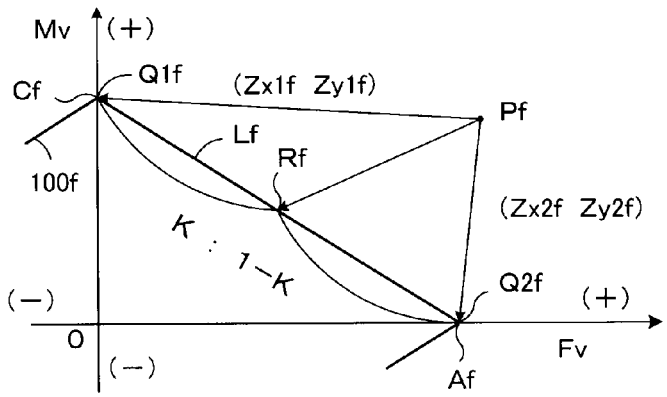
FIG. 12A is an illustration showing a method of calculating a target braking-driving force Fvft of the vehicle and a target yaw moment Mvft of the vehicle to be produced by means of braking-driving forces of the left and right front wheels in the fifth embodiment.

In step 112, as shown in FIG. 12A, of the outline of the quadrilateral 100f, a straight line Lf closest to the point Pf representing the target braking-driving force Fvn and target yaw moment Mvn of the entire vehicle is specified. Notably, when the point Pf representing the target braking-driving force Fvn and target yaw moment Mvn of the vehicle is located in the first quadrant in FIG. 12A, a line segment AC is specified as the straight line Lf. When the point Pf is located in the second quadrant in FIG. 12A, a line segment BC is specified as the straight line Lf. When the point Pf is located in the third quadrant in FIG. 12A, a line segment AD is specified as the straight line Lf. When the point Pf is located in the fourth quadrant in FIG. 12A, a line segment BD is specified as the straight line Lf.

In step 113, the coordinates of the end Q1f of the straight line Lf on the side where the yaw moment is large is represented by (Mvfmax, 0); the end Q2f of the straight line Lf on the side where the yaw moment is small is represented by (0, Fvfmax); and the components (Zx1f Zy1f) of a vector from the point Pf to the end Q1f and the components (Zx2f Zy2f) of a vector from the point Pf to the end Q2f are calculated in accordance with the following equations 9 and 10, respectively. Notably, when the point Pf is located in the first quadrant in FIG. 12A, the ends Q1f and Q2f are the points Cf and Af, respectively; when the point Pf is located in the second quadrant in FIG. 12A, the ends Q1f and Q2f are the points Cf and Bf, respectively; when the point Pf is located in the third quadrant in FIG. 12A, the ends Q1f and Q2f are the points Df and Af, respectively; and when the point Pf is located in the fourth quadrant in FIG. 12A, the ends Q1f and Q2f are the points Df and Bf, respectively.

$$(Zx1fZy1f)=(-FvnMvf\max-Mvn). \quad (9)$$

$$(Zx2fZy2f)=(Fvf\max-Fvn-Mvn). \quad (10)$$

In step 114, the target braking-driving force Fvft of the vehicle and the target yaw moment Mvft of the vehicle, which are to be produced by means of the braking-driving forces of the left and right front wheels, are calculated in accordance with the following equations 11 and 12, as coordinate values of a target point Rf, which is an internally dividing point of the straight line Lf determined on the basis of the distribution ratio K. After that, the control processing proceeds to step 200.

$$Fvft=Fvn+K(Fvf\max-Fvn)+(1-K)(-Mvn) \quad (11)$$

$$Mvft=Mvn+K(-Fvn)+(1-K)(Mvf\max-Mvn) \quad (12)$$

Figure 12B:
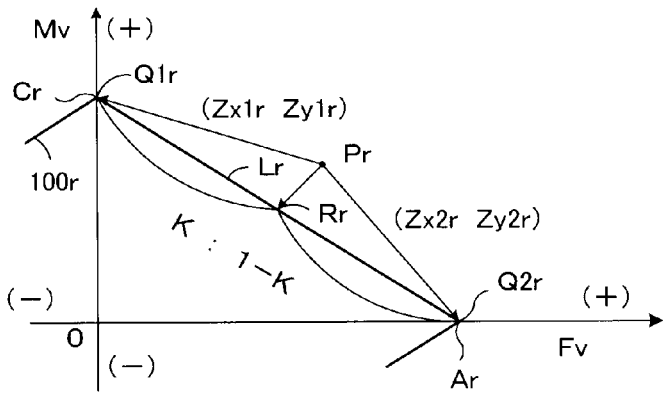
FIG. 12B is an illustration showing a method of calculating a corrected target braking-driving force Fvrt of the vehicle and a corrected target yaw moment Mvrt of the vehicle to be produced by means of braking-driving forces of the left and right rear wheels in the fifth embodiment.

Further, in the fifth embodiment, when a negative determination is made in step 260, the control processing proceeds to step 312. In step 312, as shown in FIG. 12B, of the outline of the quadrilateral 100r, a straight line Lr closest to the point Pr representing the target braking-driving force Fvrt and target yaw moment Mvrt of the vehicle, which are to be produced by means of the braking-driving forces of the left and right rear wheels is specified in a manner similar to that used to specify the straight line Lf.

In step 313, the coordinates of the end Q1r of the straight line Lr on the side where the yaw moment is large is represented by (Mvrmax, 0); the end Q2r of the straight line Lr on the side where the yaw moment is small is represented by (0, Fvrmax); and the components (Zx1r Zy1r) of a vector from the point Pr to the end Q1r and the components (Zx2r Zy2r) of a vector from the point Pr to the end Q2r are calculated in accordance with the following equations 13 and 14, respectively. Notably, when the ends Q1r and Q2r are specified in a manner similar to that used to specify the ends Q1f and Q2f.

$$(Zx1rZy1r)=(-FvnMvr\max-Mvn). \quad (13)$$

$$(Zx2rZy2r)=(Fvr\max-Fvn-Mvn) \quad (14)$$

In step 314, the corrected target braking-driving force Fvrt of the vehicle and the corrected target yaw moment Mvrt of the vehicle, which are to be produced by means of the braking-driving forces of the left and right rear wheels, are calculated in accordance with the following equations 15 and 16, as coordinate values of a target point Rr, which is an internally dividing point of the straight line Lr determined on the basis of the distribution ratio K. After that, the control processing proceeds to step 400.

$$Fvrt=Fvn+K(Fvr\max-Fvn)+(1-K)(-Mvn) \quad (15)$$

$$Mvrt=Mvn+K(-Fvn)+(1-K)(Mvr\max-Mvn) \quad (16)$$

Thus, according to the illustrated fifth embodiment, in a state where the target braking-driving force Fvn and the target yaw moment Mvn cannot be achieved through control of the braking-driving forces of the left and right front wheels, the distribution ratio K is calculated such that the greater the value which indicates a driver's acceleration/deceleration operation, the smaller the distribution ratio K, and the greater the value which indicates a driver's steering operation, the larger the distribution ratio K. Subsequently, of the outline of the quadrilateral 100f, the straight line Lf closest to the point Pf representing the target braking-driving force Fvn of the vehicle and target yaw moment Mvn of the vehicle is specified, and the coordinate values of a target point Rf, which is an internally dividing point of the straight line Lf determined on the basis of the distribution ratio K, are calculated as the target braking-driving force Fvft of the vehicle and the target yaw moment Mvft of the vehicle, which are to be produced by means of the braking-driving forces of the left and right front wheels. Further, in a state where the target braking-driving force Fvrt and the target yaw moment Mvrt cannot be achieved through control of the braking-driving forces of the left and right rear wheels, the target braking-driving force Fvrt and the target yaw moment Mvrt are adjusted in a manner similar to that used for adjusting the target braking-driving force Fvft of the vehicle and the target yaw moment Mvft of the vehicle, which are to be produced by means of the braking-driving forces of the left and right front wheels.

Accordingly, according to the illustrated fifth embodiment, in addition to the actions and effects of the above-described first through third embodiments, the following action and effect can be attained. The target braking-driving forces and target yaw moments of the left and right front wheels and the left and right rear wheels can be adjusted to achieve a braking-driving force and a yaw moment which are suitable for a driver's driving operation and which are close to the braking-driving force and yaw moment required for the vehicle to a possible extent within the range of the braking-driving forces that the front and rear wheels can generate.

Sixth Embodiment

Figure 14:
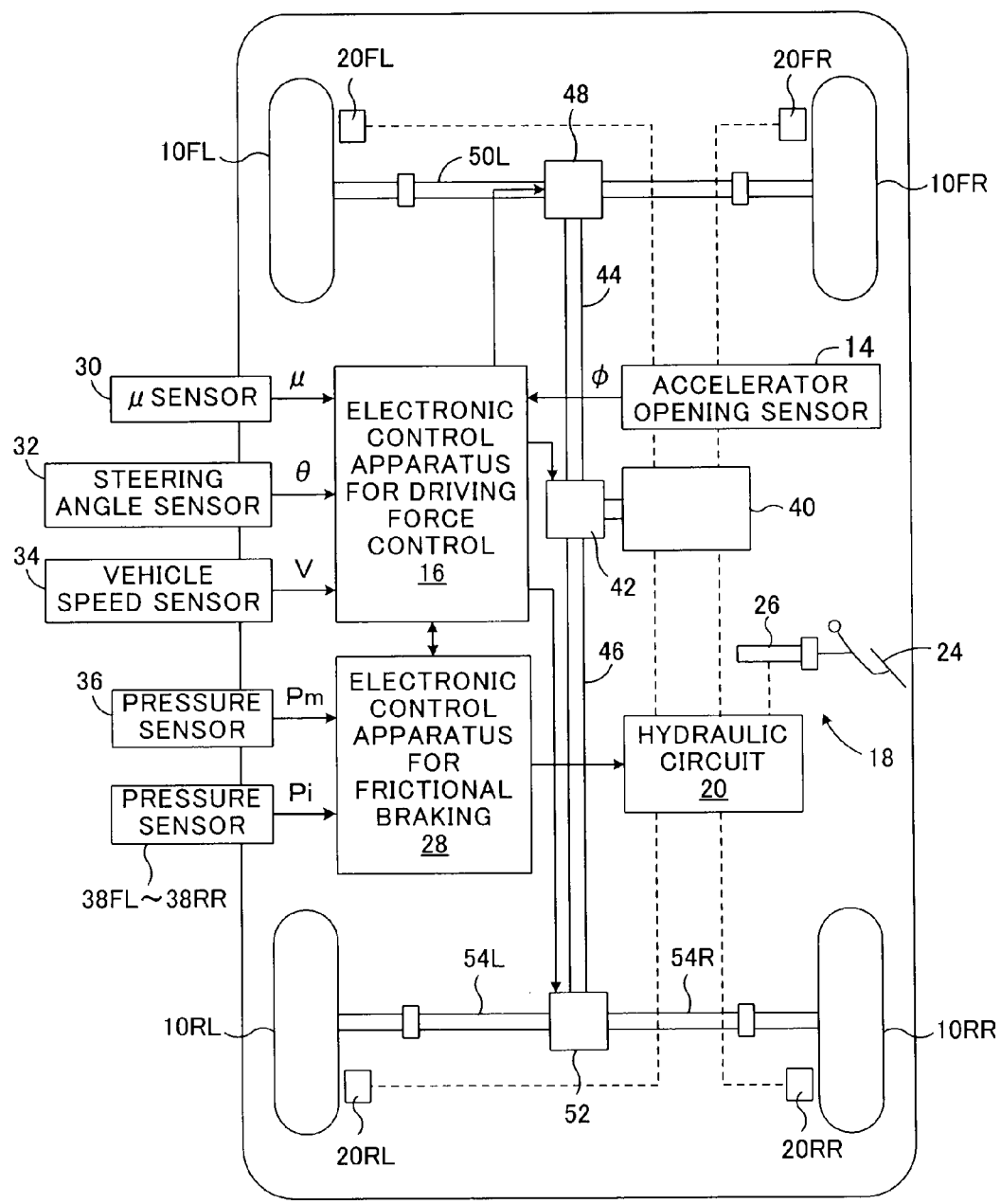
FIG. 14 is a schematic configurational view showing a sixth embodiment of the braking-driving-force control apparatus for a vehicle according to the present invention which is applied to a four-wheel-drive vehicle in which driving force and regenerative braking force of a single motor generator shared by four wheels are distributed to the front and rear wheels and the left and right wheels in a controlled conditions.

FIG. 14 is a schematic configurational view showing a sixth embodiment of a braking-driving-force control apparatus for a vehicle according to the present invention which is applied to a four-wheel-drive vehicle in which driving force and regenerative braking force of a single motor generator shared by the four wheels are distributed between the front and rear wheels and between the left and right wheels in a controlled state. Notably, in FIG. 14, members identical to those shown in FIG. 1 are denoted by the same reference numerals as used in FIG. 1.

In the sixth embodiment, a motor generator 40 is provided as a drive source shared by the left and right front wheels 10FL and 10FR and the left and right rear wheels 10RL and 10RR. Driving force and regenerative braking force of the motor generator 40 are transmitted to a propeller shaft 44 for the front wheels and a propeller shaft 46 for the rear wheels via a center differential 42, which can control the ratio of distribution of driving force and regenerative braking force between the front and rear wheels.

The driving force and regenerative braking force transmitted through the propeller shaft 44 for the front wheels are transmitted to a left front wheel axle 50L and a right front wheel axle 50R via a front wheel differential 48, which can control the ratio of distribution of driving force and regenerative braking force between the left and right front wheels, whereby the left and right front wheels 10FL and 10FR are driven and rotated. Similarly, the driving force and regenerative braking force transmitted through the propeller shaft 46 for the rear wheels are transmitted to a left rear wheel axle 54L and a right rear wheel axle 54R via a rear wheel differential 52, which can control the ratio of distribution of driving force and regenerative braking force between the left and right rear wheels, whereby the left and right rear wheels 10RL and 10RR are driven and rotated.

The driving force of the motor generator 40 is controlled by the electronic control apparatus for driving force control 16 on the basis of the accelerator opening φ detected by the accelerator opening sensor 14, and the regenerative braking force of the motor generator 40 is also controlled by the electronic control apparatus for driving force control 16. Further, the electronic control apparatus for driving force control 16 controls the ratio of distribution of driving force and regenerative braking force between the front and rear wheels by the center differential 42, the ratio of distribution of driving force and regenerative braking force between the left and right wheels by the front wheel differential 48, and the ratio of distribution of driving force and regenerative braking force between the left and right wheels by the rear wheel differential 52.

In the illustrated sixth embodiment, the maximum driving force of the motor generator 40 is assumed to be set such that when the maximum driving force of the motor generator 40 is equally distributed to the left and right front wheels 10FL and 10FR and the left and right rear wheels 10RL and 10RR, the driving forces Fwdi of the individual wheels become smaller than the generatable maximum longitudinal force which is determined by the frictional coefficient μ of an ordinary road surface.

Figure 15A:
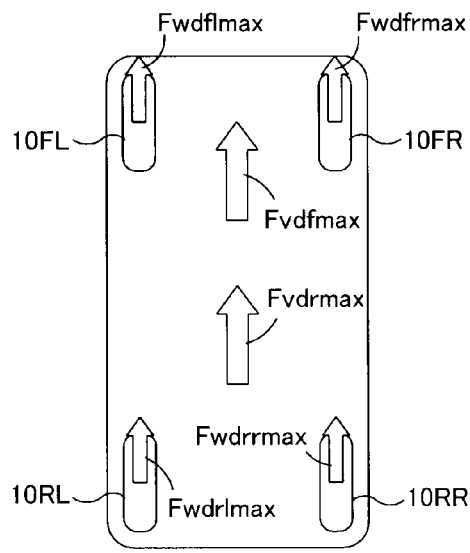
FIG. 15 is a set of illustrations relating to the sixth embodiment and showing the relation between braking-driving forces of individual wheels and braking-driving force and yaw moment of the vehicle for various cases.

As shown in FIG. 15A, the maximum driving forces Fvdfmax and Fvdrmax of the vehicle in a state where the yaw moment attributable to the braking-driving forces of the wheels does not act on the vehicle are achieved when the braking-driving forces Fwxfl and Fwxfr of the left and right front wheels 10FL and 10FR are the maximum driving forces Fwdflmax and Fwdformax attained when the driving force is equally distributed to the left and right wheels, and the braking-driving forces Fwxrl and Fwxrr of the left and right rear wheels 10RL and 10RR are the maximum driving forces Fwdrlmax and Fwdrrmax attained when the driving force is equally distributed to the left and right wheels.

Figure 15B:
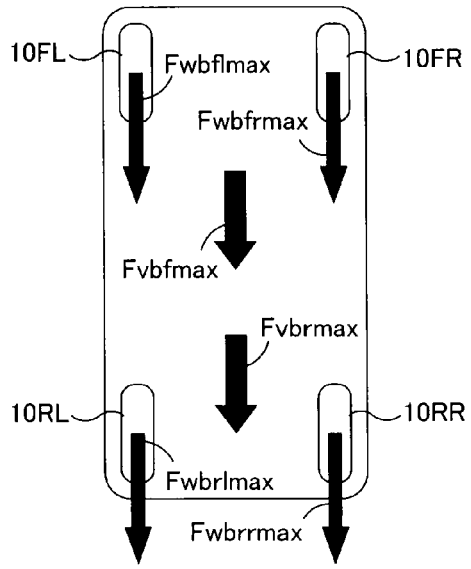

Similarly, as shown in FIG. 15B, the maximum braking forces Fvbfmax and Fvbrmax of the vehicle in a state where the yaw moment attributable to the braking-driving forces of the wheels does not act on the vehicle are achieved when the braking-driving forces Fwxfl and Fwxfr of the left and right front wheels 10FL and 10FR are the maximum braking forces Fwbflmax and Fwbformax attained when the braking force is equally distributed to the left and right wheels, and the braking-driving forces Fwxrl and Fwxrr of the left and right rear wheels 10RL and 10RR are the maximum braking forces Fwbrlmax and Fwbrrmax attained when the braking force is equally distributed to the left and right wheels.

Figure 15C:
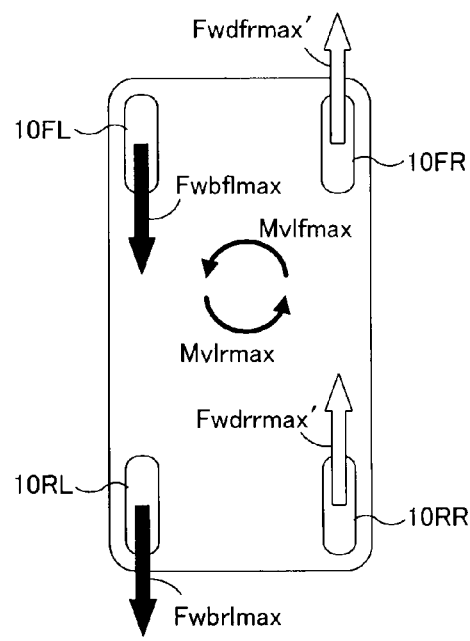

Further, as shown in FIG. 15C, the maximum yaw moments Mvlfmax and Mvlrmax of the vehicle in the left turn direction in a state where the longitudinal force attributable to the braking-driving forces of the wheels does not act on the vehicle are achieved when the driving force for each pair of left and right wheels is distributed to the right wheel so that the braking-driving forces Fwxfr and Fwxrr of the front and rear right wheels 10FR and 10RR are the maximum driving forces Fwdformax' and Fwdrrmax', and their magnitudes are equal to those of the maximum braking forces Fwbflmax and Fwbrlmax of the front and rear left wheels 10FL and 10RL, respectively.

Figure 15D:
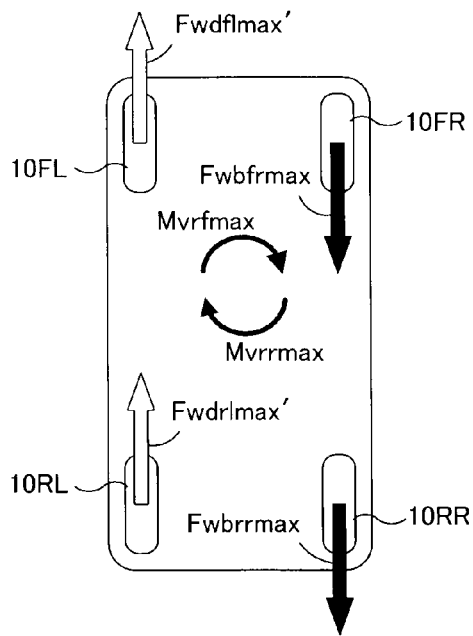

Further, as shown in FIG. 15D, the maximum yaw moments Mvrfmax and Mvrrmax of the vehicle in the right turn direction in a state where the longitudinal force attributable to the braking-driving forces of the wheels does not act on the vehicle are achieved when the driving force for each pair of left and right wheels is distributed to the left wheel so that the braking-driving forces Fwxfl and Fwxrl of the front and rear left wheels 10FL and 10RL are the maximum driving forces Fwdflmax' and Fwdrlmax', and their magnitudes are equal to those of the maximum braking forces Fwbformax and Fwbrrmax of the front and rear right wheels 10FR and 10RR, respectively.

Figure 16A:
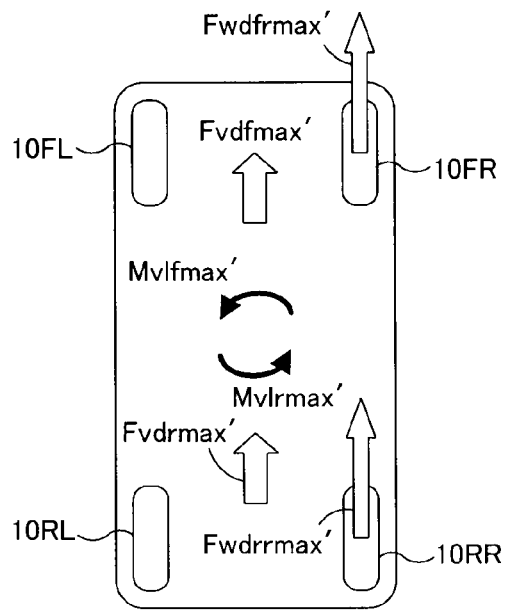
FIG. 16 is a set of illustrations relating to the sixth embodiment and showing the relation between braking-driving forces of individual wheels and braking-driving force and yaw moment of the vehicle for other various cases.
Figure 16B:
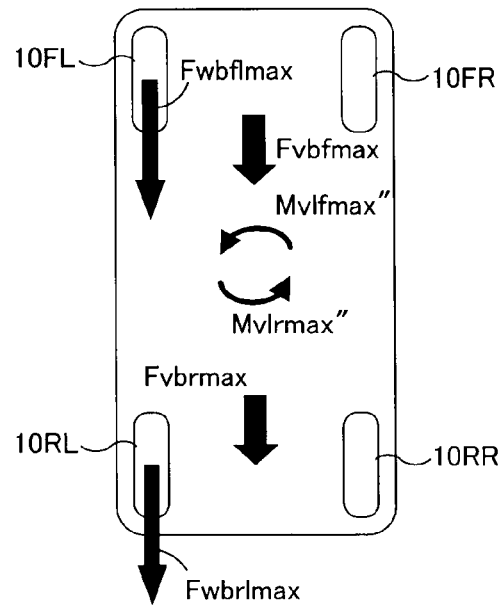
Figure 16C:
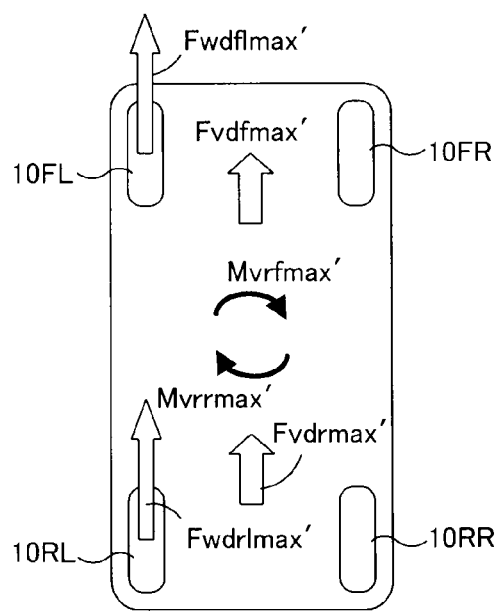
Figure 16D:
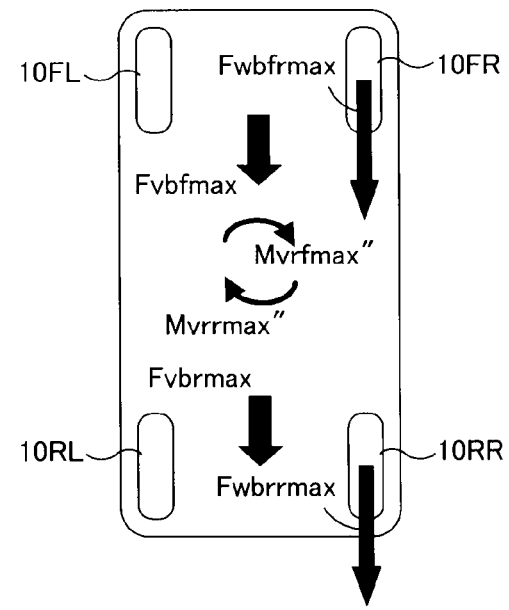

Further, as shown in FIG. 16E, the maximum yaw moments Mvlfmax' and Mvlrmax' of the vehicle in the left turn direction in a state where the braking-driving force of the vehicle is the maximum driving force Fvdmax are achieved when the braking-driving forces Fwxfl and Fwxrl of the front and rear left wheels 10FL and 10RL are both zero, and the braking-driving forces Fwxfr and Fwxrr of the front and rear right wheels 10FR and 10RR are the maximum driving forces Fwdformax' and Fwdrrmax'.

Further, as shown in FIG. 16F, the maximum yaw moments Mvlfmax" and Mvlrmax" of the vehicle in the left turn direction in a state where no driving force acts on any of the wheels are achieved when the braking-driving forces Fwxfr and Fwxrr of the front and rear right wheels 10FR and 10RR are both zero, and the braking-driving forces Fwxfl and Fwxrl of the front and rear left wheels 10FL and 10RL are the maximum braking forces Fwbflmax and Fwbrrmax.

Further, as shown in FIG. 16G, the maximum yaw moments Mvrfmax' and Mvrrmax' of the vehicle in the right turn direction in a state where the braking-driving force of the vehicle is the maximum driving force Fvdmax are achieved when the braking-driving forces Fwxfr and Fwxrr of the front and rear left wheels 10FR and 10RR are both zero, and the braking-driving forces Fwxfl and Fwxrl of the front and rear left wheels 10FL and 10RL are the maximum driving forces Fwdflmax' and Fwdrlmax'.

Further, as shown in FIG. 16H, the maximum yaw moments Mvrfmax" and Mvrrmax" of the vehicle in the right turn direction in a state where no driving force acts on any of the wheels are achieved when the braking-driving forces Fwxfl and Fwxrl of the front and rear left wheels 10FL and 10RL are both zero, and the braking-driving forces Fwxfr and Fwxrr of the front and rear right wheels 10FR and 10RR are the maximum braking forces Fwbformax and Fwbrrmax.

The maximum driving forces Fwdimax of the individual wheels are determined by the maximum output torque of the motor generator 40, the friction coefficient $\mu$ of the road surface, and the respective distribution ratios; and the maximum braking forces Fwbimax of the individual wheels are determined by the friction coefficient $\mu$ of the road surface. Therefore, the maximum driving forces Fvdfmax and Fvdrmax of the vehicle, the maximum braking forces Fvbfmax and Fvbrmax of the vehicle, the maximum yaw moments Mvlfmax and Mvlrmax of the vehicle in the left turn direction, the maximum yaw moments Mvrfmax and Mvrrmax of the vehicle in the right turn direction, etc. are also determined by the maximum output torque of the motor generator 40 and the friction coefficient $\mu$ of the road surface. Accordingly, if the maximum output torque of the motor generator 40 and the friction coefficient $\mu$ of the road surface are found, the maximum driving forces Fwdimax of the individual wheels, etc. can be estimated.

Figure 17A:
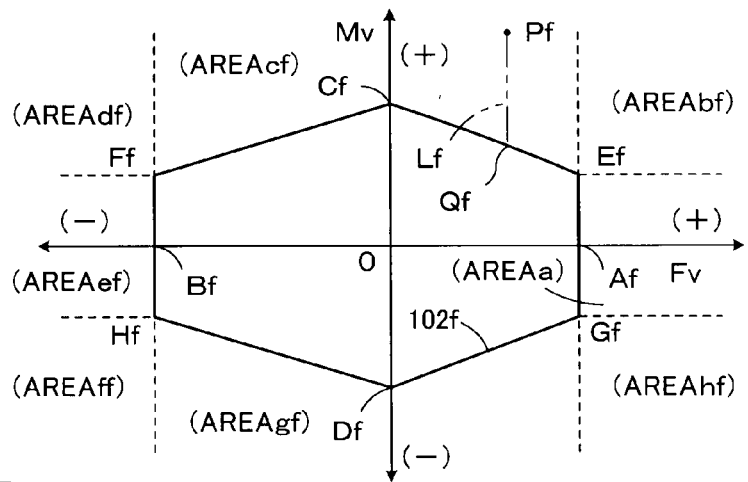
FIG. 17A is an illustration showing a method of calculating a target braking-driving force Fvft of the vehicle and a target yaw moment Mvft of the vehicle to be produced by means of braking-driving forces of the left and right front wheels in the sixth embodiment.

Further, as shown in FIG. 17A, which shows an orthogonal coordinate system in which the horizontal axis represents braking-driving force Fvx of the vehicle and the vertical axis represents yaw moment Mv of the vehicle, a braking-driving force Fvx of the vehicle and a yaw moment Mv of the vehicle, which can be generated through control of the braking-driving forces of the left and right front wheels, assume values within a hexagon 102f defined by the maximum driving force Fvdfmax of the vehicle, the maximum braking force Fvbfmax of the vehicle, the maximum yaw moment Mvlfmax of the vehicle in the left turn direction, the maximum yaw moment Mvrfmax of the vehicle in the right turn direction, and a range within which the yaw moment Mv of the vehicle can vary when the braking-driving force Fvx of the vehicle is the maximum driving force Fvdfmax or the maximum braking force Fvbfmax. Similarly, the braking-driving force Fvx of the vehicle and the yaw moment Mv of the vehicle, which can be generated through control of the braking-driving forces of the left and right rear wheels, assume values within a hexagon 102r shown in FIG. 17B.

Figure 17B:
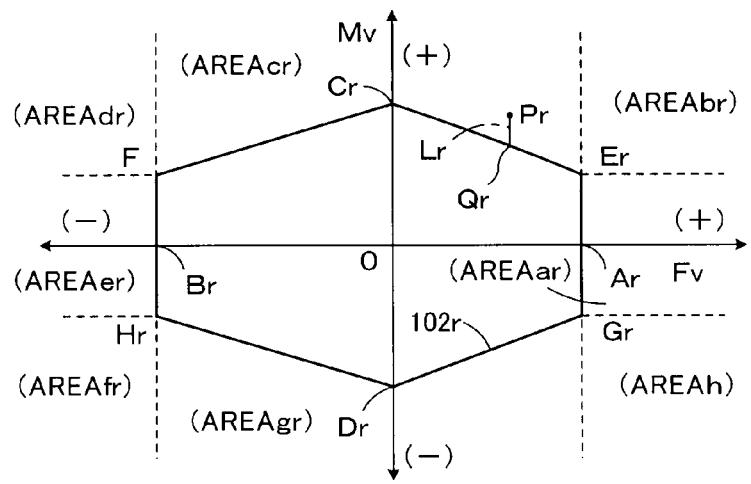
FIG. 17B is an illustration showing a method of calculating a corrected target braking-driving force Fvrt of the vehicle and a corrected target yaw moment Mvrt of the vehicle to be produced by means of braking-driving forces of the left and right rear wheels in the sixth embodiment.
Figure 17C:
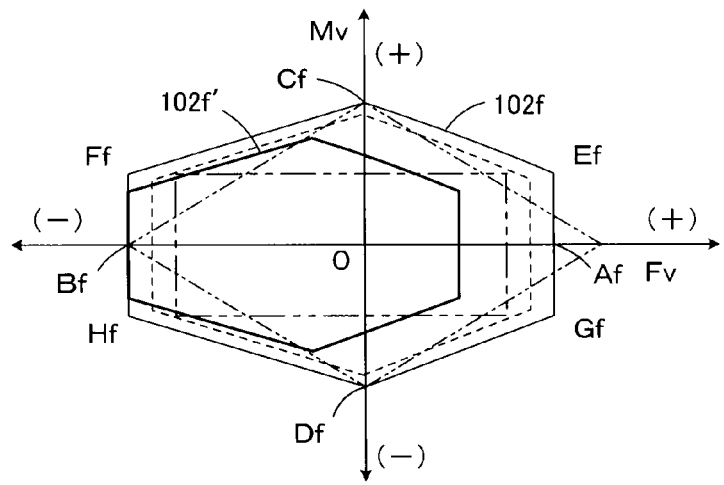
FIG. 17C is a graph showing a range of braking-driving force and yaw moment of the vehicle which can be produced through control of the braking-driving forces of the individual wheels in a case where a common drive source is provided for the left and right front wheels only or for the left and right rear wheels only.

Notably, in FIG. 17, points Af to Hf and points Ar to Hr correspond to the cases of A to H of FIGS. 15 and 16. Further, as shown in FIG. 17C by a broken line for the hexagon 102f, the lower the friction coefficient $\mu$ of the road surface, the smaller the areas of the hexagons 102f and 102r. Further, when the steering angle $\theta$ increase, the lateral forces of the left and right front wheels, which are steerable wheels, increase and the margin of the longitudinal force decreases. Therefore, the greater the steering angle $\theta$, the smaller the areas of the hexagons 102f and 102r.

In a case where the output torque of the motor generator 40 is sufficiently large, the maximum driving forces and maximum braking forces of the individual wheels are determined by the friction coefficient $\mu$ of the road surface. Therefore, when the direction of acceleration of the vehicle and the left turn direction of the vehicle are each considered as a positive direction, the relation between the maximum driving force and the maximum braking force of each wheel, the relation between the maximum driving force of the vehicle and the maximum braking force of the vehicle, and the relation between the maximum yaw moment of the vehicle in the left turn direction and the maximum yaw moment of the vehicle in the right turn direction become the same as those in the above-described first embodiment. Accordingly, the range of driving force and yaw moment of the vehicle which can be achieved by means of the braking-driving forces of the individual wheels becomes a rhomboidal range as in the above-described first embodiment.

Further, in a case where the output torque of the motor generator 40 and the maximum braking forces of the individual wheels are smaller than those in the embodiment, the driving force of the vehicle becomes the maximum even when all of the maximum driving force for the left and right wheels is distributed to the left wheels or right wheels, and the braking force of the vehicle becomes the maximum even when all of the maximum braking force for the left and right wheels is distributed to the left wheels or right wheels. Therefore, as indicated by an imaginary line in FIG. 17C, the range of driving force and yaw moment of the vehicle which can be achieved by means of the braking-driving forces of the individual wheels becomes a rectangular range.

Thus, the coordinates of the points Af to Hf shown in FIG. 17A are (Fvdfmax, 0), (Fvbfmax, 0), (0, Mvlfmax), (0, Mvrfmax), (Fvdfmax, KmMvlfmax), (Fvbfmax, KmMvlfmax), (Fvdfmax, −KmMvlfmax), and (Fvbfmax, −KmMvlfmax), where Km is a coefficient of 0 to 1, inclusive. Further, the coordinates of the points Ar to Hr shown in FIG. 17B are (Fvdrmax, 0), (Fvbrmax, 0), (0, Mvlrmax), (0, Mvrrmax), (Fvdrmax, KmMvlrmax), (Fvbrmax, KmMvlrmax), (Fvdrmax, −KmMvlrmax), and (Fvbrmax, −KmMvlrmax), where Km is a coefficient of 0 to 1, inclusive.

In FIG. 17, areas af, ar, ef, and er are areas in which the magnitude of the braking force required for the vehicle is large and the yaw moment required for the vehicle is relatively small, and therefore, in these areas, priority is desirably placed on braking-driving force. Areas bf, br, df, dr, ff, fr, hf, and hr are areas in which the magnitude of the braking force required for the vehicle and the magnitude of the yaw moment required for the vehicle are large, and therefore, in these areas, both of braking-driving force and yaw moment are important. Areas cf, cr, gf, and gr are areas in which the magnitude of the braking force required for the vehicle is relatively small and the yaw moment required for the vehicle is large, and therefore, in these areas, priority is desirably placed on yaw moment.

The adjustment (step 100) of the target braking-driving force and target yaw moment of the front wheels in the sixth embodiment is performed as follows. In a case where the point representing the target braking-driving force Fvn and target yaw moment Mvn of the entire vehicle is located in the area af or ef, although not shown in FIG. 17A, intersection points between the outline of the quadrilateral 100f and a line Lf, which passes through the point (Pf) representing the target braking-driving force Fvn and target yaw moment Mvn of the entire vehicle and is parallel to the horizontal axis, are obtained, and of the intersection points, a point Qf closer to the point Pf is obtained as a target point. When the coordinates of the target point Qf are represented by (Fvqf, Mvqf), the target braking-driving force Fvft of the vehicle and the target yaw moment Mvft of the vehicle, which are to be produced by means of the braking-driving forces of the left and right front wheels, are set to Fvqf and Mvqf, respectively.

In a case where the point representing the target braking-driving force Fvn and target yaw moment Mvn of the entire vehicle is located in any one of the area bf, df, 1f, and hf, the target braking-driving force Fvft of the vehicle and the target yaw moment Mvft of the vehicle, which are to be produced by means of the braking-driving forces of the left and right front wheels, are set to the coordinate values of points Ef, Ff, Hf, and Gf, respectively.

In a case where the point representing the target braking-driving force Fvn and target yaw moment Mvn of the entire vehicle is located in the area cf or gf, as shown in FIG. 17A, intersection points between the outline of the hexagon 102f and a line Lf, which passes through the point (Pf) representing the target braking-driving force Fvn and target yaw moment Mvn of the entire vehicle and is parallel to the vertical axis, are obtained, and of the intersection points, a point Qf closer to the point Pf is obtained as a target point. When the coordinates of the target point Qf are represented by (Fvqf, Mvqf), the target braking-driving force Fvft of the vehicle and the target yaw moment Mvft of the vehicle, which are to be produced by means of the braking-driving forces of the left and right front wheels, are set to Fvqf and Mvqf, respectively.

Similarly, the adjustment (step 300) of the target braking-driving force and target yaw moment of the rear wheels in the sixth embodiment is performed as follows. In a case where the point representing the target braking-driving force Fvrt and target yaw moment Mvrt of the vehicle, which are to be produced by means of the braking-driving forces of the left and right rear wheels, is located in the area ar or er, although not shown in FIG. 17B, intersection points between the outline of the quadrilateral 100r and a line Lr, which passes through the point (Pr) representing the target braking-driving force Fvrt and target yaw moment Mvrt of the vehicle, which are to be produced by means of the braking-driving forces of the left and right rear wheels, and is parallel to the horizontal axis, are obtained, and of the intersection points, a point Qr closer to the point Pr is obtained as a target point. When the coordinates of the target point Qr are represented by (Fvqr, Mvqr), the corrected target braking-driving force Fvrt and target yaw moment Mvrt of the vehicle, which are to be produced by means of the braking-driving forces of the left and right rear wheels are set to Fvqf and Mvqf, respectively.

In a case where the point representing the target braking-driving force Fvrt and target yaw moment Mvrt of the vehicle, which are to be produced by means of the braking-driving forces of the left and right rear wheels, is located in any one of the area br, dr, fr, and hr, the corrected target braking-driving force Fvrt and target yaw moment Mvrt of the vehicle, which are to be produced by means of the braking-driving forces of the left and right rear wheels, are set to the coordinate values of points Er, Fr, Hr, and Gr, respectively.

Further, in a case where the point representing the target braking-driving force Fvrt and target yaw moment Mvrt of the vehicle, which are to be produced by means of the braking-driving forces of the left and right rear wheels, is located in the area cr or gr, as shown in FIG. 17B, intersection points between the outline of the hexagon 102r and a line Lr, which passes through the point (Pr) representing the target braking-driving force Fvrt and target yaw moment Mvrt of the vehicle, which are to be produced by means of the braking-driving forces of the left and right rear wheels, and is parallel to the vertical axis, are obtained, and of the intersection points, a point Qr closer to the point Pr is obtained as a target point. When the coordinates of the target point Qr are represented by (Fvqr, Mvqr), the corrected target braking-driving force Fvrt and target yaw moment Mvrt of the vehicle, which are to be produced by means of the braking-driving forces of the left and right rear wheels are set to Fvqf and Mvqf, respectively.

Accordingly, according to the illustrated sixth embodiment, in addition to the actions and effects of the above-described first through third embodiments, the following action and effect can be attained. In a state where the target braking-driving force Fvn and the target yaw moment Mvn cannot be achieved through control of the braking-driving forces of the left and right front wheels and the left and right rear wheels, the braking-driving forces of the left and right front wheels and the left and right rear wheels can be controlled on the basis of the relation of the braking-driving force or yaw moment required for the vehicle with respect to the range of the braking-driving force and yaw moment of the vehicle which can be achieved through control of the braking-driving forces of the left and right front wheels and the left and right rear wheels. Thus, the target braking-driving forces and target yaw moments of the front wheels and the rear wheels can be adjusted such that the braking-driving force required for the vehicle can be achieved to a possible extent within the range of braking-driving forces which can be generated by the left and right front wheels and the left and right rear wheels.

In the illustrated sixth embodiment, the drive source is the single motor generator 40 shared by the four wheels. However, the drive source which drives the individual wheels while controlling the distribution of driving force between the left and right wheels may be any drive means known in the art, such as an internal combustion engine or a hybrid system.

In the illustrated sixth embodiment, the single motor generator 40 is provided as a drive source shared by the four wheels. However, there may be provided a drive source shared by the left and right front wheels and a drive source shared by the left and right rear wheels. Alternatively, a common drive source may be provided only for the left and right front wheels or only for the left and right rear wheels. In such a case, the hexagon 102 assumes a shape denoted by 102f' in FIG. 17C, and the braking-driving force of the vehicle at the time when the yaw moment of the vehicle in the left turn direction and the yaw moment of the vehicle in the right turn direction are the maximum values Mvlmax and Mvrmax respectively assumes a negative value; i.e., becomes a braking force. The above-described action and effect can be achieved in the case of such a vehicle.

Seventh Embodiment

Figure 18:
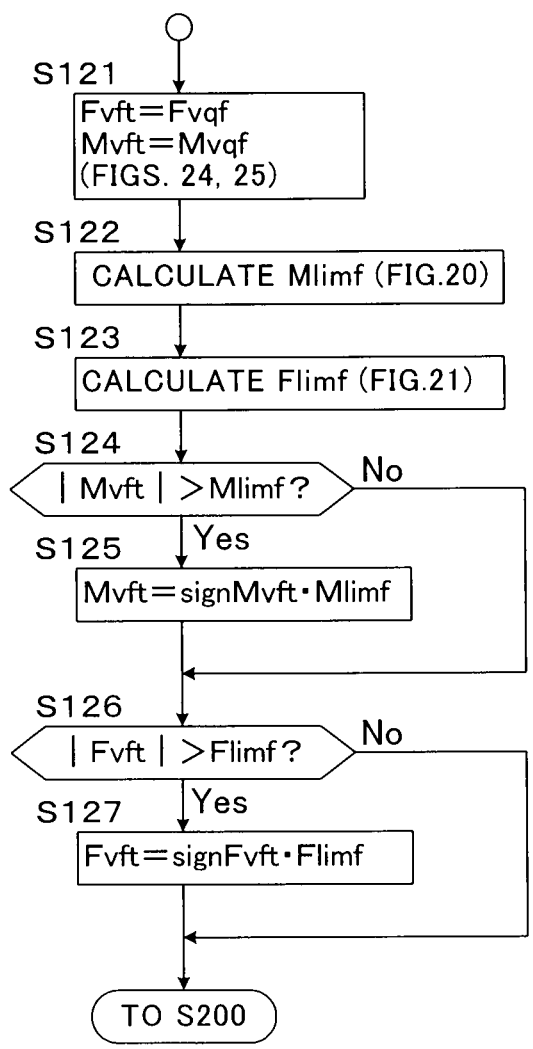
FIG. 18 is a flowchart showing an adjustment routine for adjusting a target braking-driving force of the vehicle and a target yaw moment of the vehicle to be produced by means of braking-driving forces of the left and right front wheels in a seventh embodiment.
Figure 19:
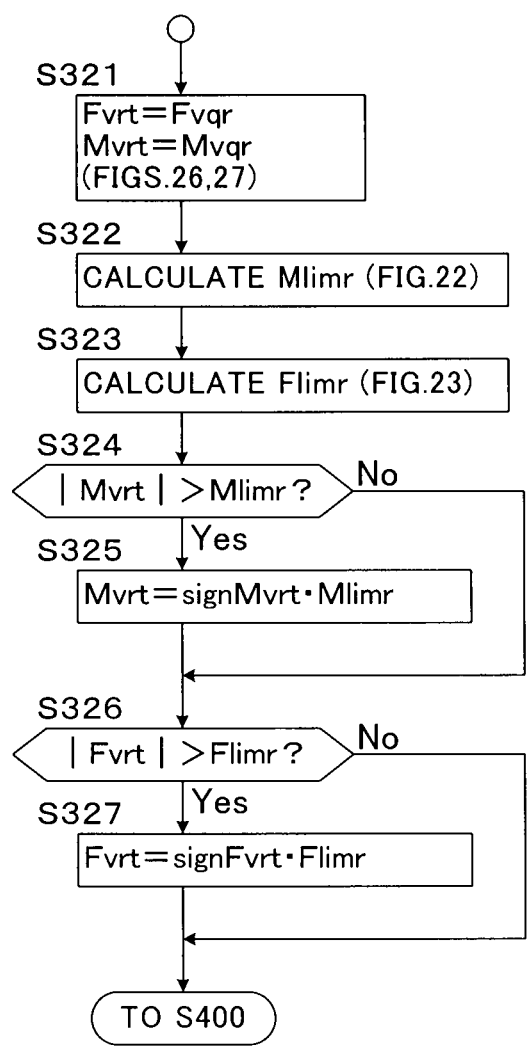
FIG. 19 is a flowchart showing an adjustment routine for adjusting a target braking-driving force of the vehicle and a target yaw moment of the vehicle to be produced by means of braking-driving forces of the left and right rear wheels in the seventh embodiment.

FIG. 18 is a flowchart showing a control routine for adjusting the target braking-driving force and target yaw moment of the front wheels in a seventh embodiment of the braking-driving-force control apparatus for a vehicle according to the present invention, the seventh embodiment being a modification of the first to third embodiments. FIG. 19 is a flowchart showing a control routine for adjusting the target braking-driving force and target yaw moment of the rear wheels in the seventh embodiment.

Figure 24A:
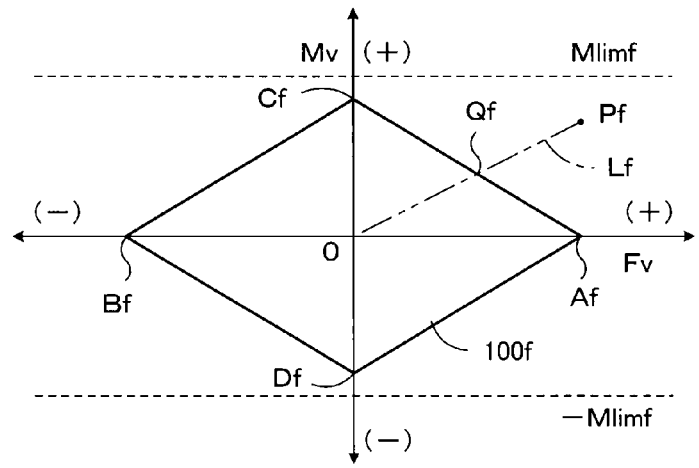
FIGS. 24A and 24B are illustrations showing a method of calculating a target braking-driving force Fvft of the vehicle and a target yaw moment Mvft of the vehicle to be produced by means of braking-driving forces of the left and right front wheels in the seventh embodiment.
Figure 25A:
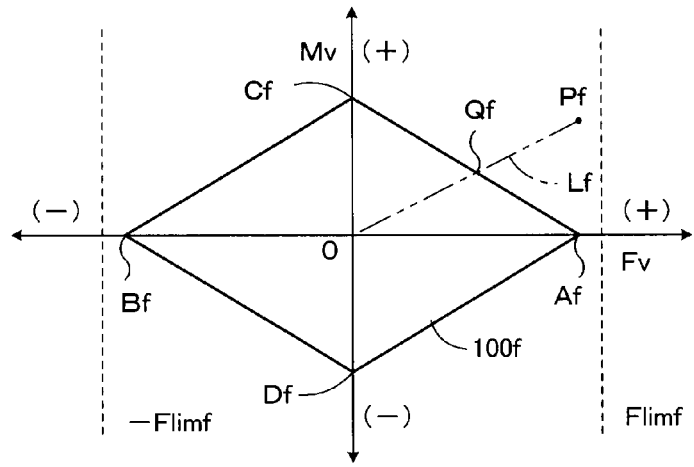
FIGS. 25A and 25B are illustrations showing a method of calculating a target braking-driving force Fvft of the vehicle and a target yaw moment Mvft of the vehicle to be produced by means of braking-driving forces of the left and right front wheels in the seventh embodiment.

In the seventh embodiment, when a negative determination is made in step 40, the control processing proceeds to step 121. In step 121, as shown in FIGS. 24A and 25A, an intersection Qf between the outline of the quadrilateral 100f and a line Lf connecting the origin O and a point Pf representing the target braking-driving force Fvn of the vehicle and the target yaw moment Mvn of the vehicle is obtained as a target point. When the coordinates of the target point Qf are represented by (Fvqf, Mvqf), the target braking-driving force Fvft of the vehicle and the target yaw moment Mvft of the vehicle, which are to be produced by means of the braking-driving forces of the left and right front wheels, are set to Fvqf and Mvqf, respectively. After that, the control processing proceeds to step 122.

Figure 20:
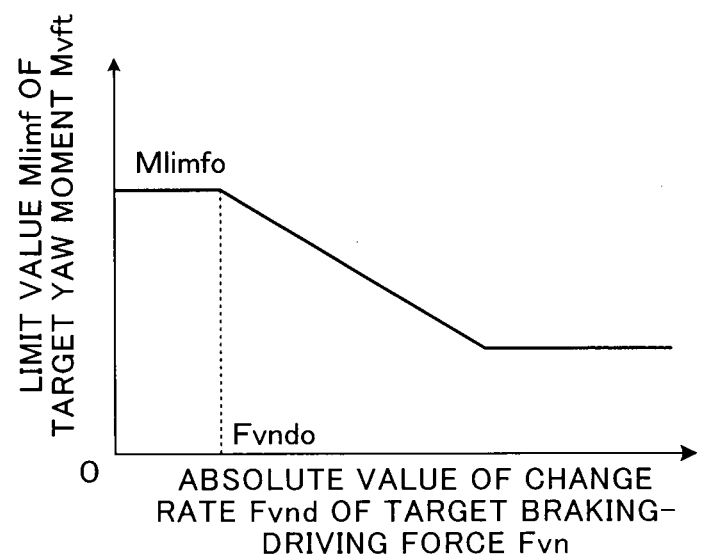
FIG. 20 is a graph showing the relation between the absolute value of change rate Fvnd of a target braking-driving force Fvn and a limit value Mlimf of a target yaw moment Mvft of the vehicle.

In step 122, a change rate Fvnd of the target braking-driving force Fvn is calculated as a time-differentiated value of the target braking-driving force Fvn of the vehicle, and a limit value Mlimf of the target yaw moment Mvft of the vehicle is calculated from the absolute value of the change rate Fvnd of the target braking-driving force Fvn with reference to a map corresponding to a graph shown in FIG. 20. Notably, in FIG. 20, a limit value Mlimfo at the time when the absolute value of the change rate Fvnd of the target braking-driving force Fvn is equal to or less than a restraint reference value Fvndfo is a constant value greater than the magnitudes of the maximum yaw moments Mvlfmax and Mvrfmax.

Figure 21:
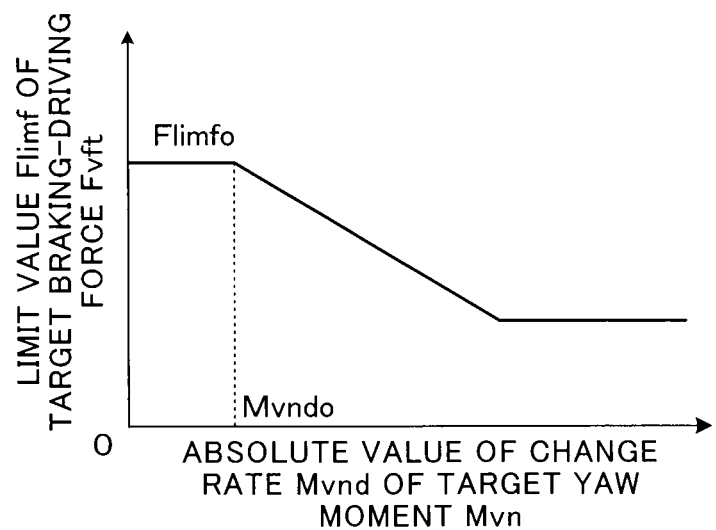
FIG. 21 is a graph showing the relation between the absolute value of change rate Mvnd of a target yaw moment Mvn and a limit value Flimf of a target braking-driving force Fvft of the vehicle.
Figure 22:
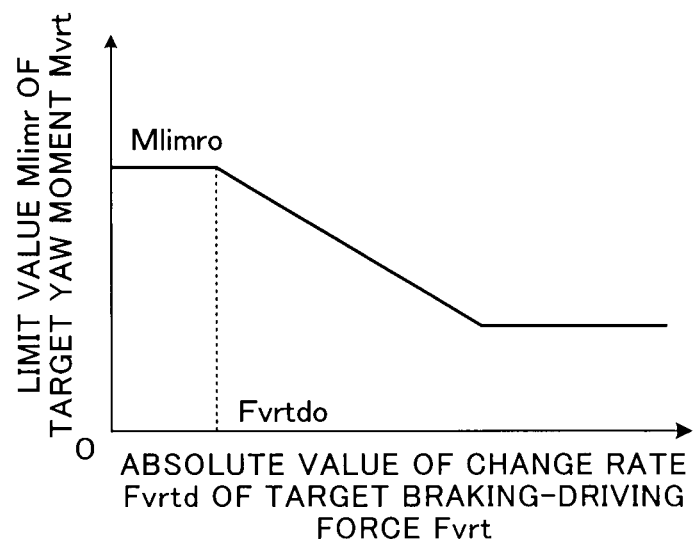
FIG. 22 is a graph showing the relation between the absolute value of change rate Fvrtd of a target braking-driving force Fvrt and a limit value Mlimr of a target yaw moment Mvrt of the vehicle.
Figure 23:
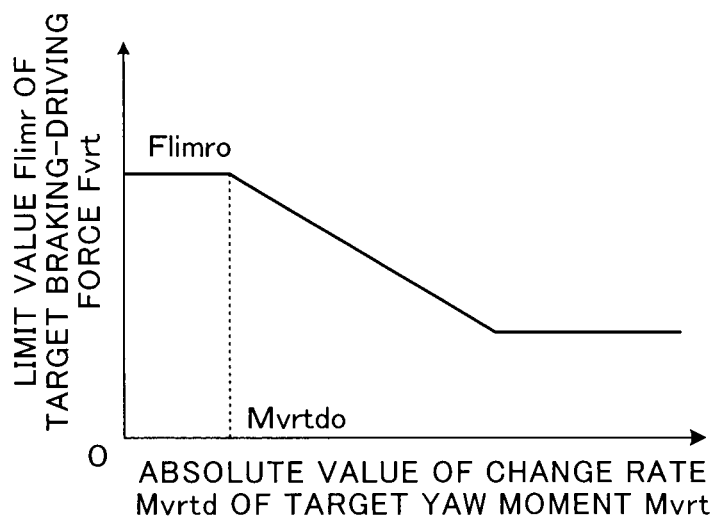
FIG. 23 is a graph showing the relation between the absolute value of change rate Mvrtd of a target yaw moment Mvrt and a limit value Flimr of a target braking-driving force Fvrt of the vehicle.

In step 123, a change rate Mvnd of the target yaw moment Mvn is calculated as a time-differentiated value of the target yaw moment Mvn of the vehicle, and a limit value Flimf of the target braking-driving force Fvft of the vehicle is calculated from the absolute value of the change rate Mvnd of the target yaw moment Mvn with reference to a map corresponding to a graph shown in FIG. 21. Notably, in FIG. 21, a limit value Flimfo at the time when the absolute value of the change rate Mvnd of the target yaw moment Mvn is equal to or less than a restraint reference value Mvndo is a constant value greater than the magnitudes of the maximum braking-driving forces Fvdfmax and Mvbfmax.

In step 124, a determination is made as to whether or not the absolute value of the target yaw moment Mvft of the vehicle, which is to be produced by means of the braking-driving forces of the left and right front wheels, exceeds the limit value Mlimf. When a negative determination is made, the control processing proceeds to step 126. When an affirmative determination is made, the control processing proceeds to step 125, in which the target yaw moment Mvft of the vehicle is corrected to signMvft·Mlimf, where signMvft represents the sign of the target yaw moment Mvft of the vehicle, which is to be produced by means of the braking-driving forces of the left and right front wheels. After that, the control processing proceeds to step 126.

Figure 24B:
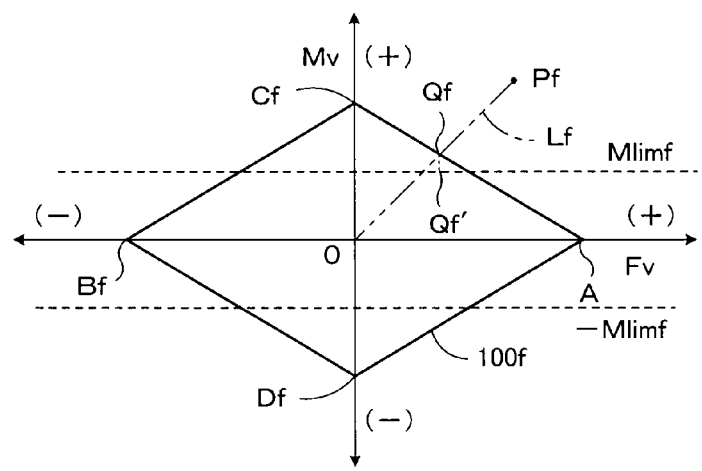

For example, in a state shown in FIG. 24B, although the target braking-driving force Fvft of the vehicle is maintained at the coordinate value Fvqf of the target point Qf, the target yaw moment Mvft of the vehicle, which is to be produced by means of the braking-driving forces of the left and right front wheels, is corrected to Mlimf. Accordingly, the target braking-driving force Fvft and target yaw moment Mvft of the vehicle, which are to be produced by means of the braking-driving forces of the left and right front wheels, are set to the coordinate values of an intersection Qf" between a straight line representing the limit value Mlimf and a perpendicular extending from the target point Qf to the straight line.

In step 126, a determination is made as to whether or not the absolute value of the target braking-driving force Fvft of the vehicle, which is to be produced by means of the braking-driving forces of the left and right front wheels, exceeds the limit value Flimf. When a negative determination is made, the control processing proceeds to step 200. When an affirmative determination is made, the control processing proceeds to step 127, in which the target braking-driving force Fvft of the vehicle is corrected to signFvft·Flimf, where signFvft represents the sign of the target braking-driving force Fvft of the vehicle, which is to be produced by means of the braking-driving forces of the left and right front wheels. After that, the control processing proceeds to step 200.

Figure 25B:
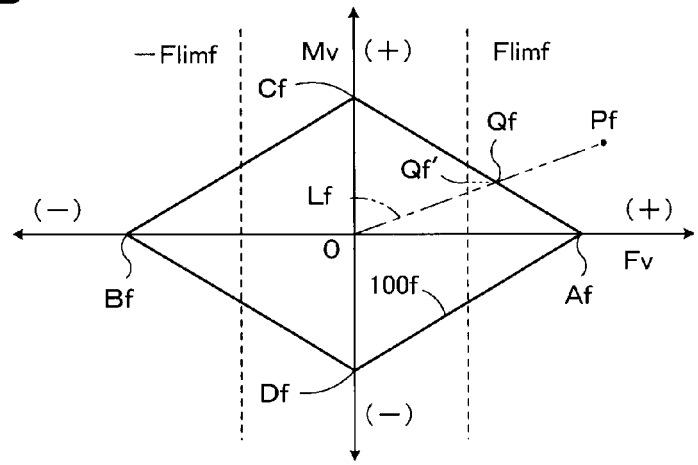

For example, in a state shown in FIG. 25B, although the target yaw moment Mvft of the vehicle, which is to be produced by means of the braking-driving forces of the left and right front wheels, is maintained at the coordinate value Mvqf of the target point Qf, the target braking-driving force Fvft of the vehicle, which is to be produced by means of the braking-driving forces of the left and right front wheels, is corrected to Flimf. Accordingly, the target braking-driving force Fvft and target yaw moment Mvft of the vehicle, which are to be produced by means of the braking-driving forces of the left and right front wheels, are set to the coordinate values of an intersection Qf" between a straight line representing the limit value Flimf and a perpendicular extending from the target point Qf to the straight line.

As shown in FIGS. 19, 22, 23, 26, and 27, the target braking-driving force Fvrt and target yaw moment Mvrt of the vehicle, which are to be produced by means of the braking-driving forces of the left and right rear wheels, are also adjusted in accordance with steps 321 to 327 of FIG. 19 corresponding to the above-described steps 121 to 127, as in the case of the target braking-driving force Fvft and target yaw moment Mvft of the vehicle, which are to be produced by means of the braking-driving forces of the left and right front wheels. Thus, the corrected target braking-driving force Fvrt and target yaw moment Mvrt of the vehicle, which are to be produced by means of the braking-driving forces of the left and right rear wheels, are calculated.

Accordingly, according to the illustrated seventh embodiment, in addition to the actions and effects of the above-described first through third embodiments, the following action and effect can be attained. The target braking-driving forces and target yaw moments of the front wheels and the rear wheels can be adjusted such that the braking-driving force and yaw moment required for the vehicle can be achieved to a possible extent within the range of braking-driving forces which can be generated by the left and right front wheels and the left and right rear wheels. Further, even when the target braking-driving force Fvn or the target yaw moment Mvn changes suddenly due to a driver's abrupt acceleration/deceleration operation or a driver's abrupt steering operation, the target yaw moments Mvft and Mvrt of the vehicle and the target braking-driving forces Fvft and Fvrt of the vehicle are prevented from changing abruptly. Accordingly, the present embodiment can reduce the possibility that the travel stability of the vehicle lowers or an occupant of the vehicle feels an unnatural sensation due to an abrupt increase or decrease in the yaw moment or braking-driving force of the vehicle.

Figure 24C:
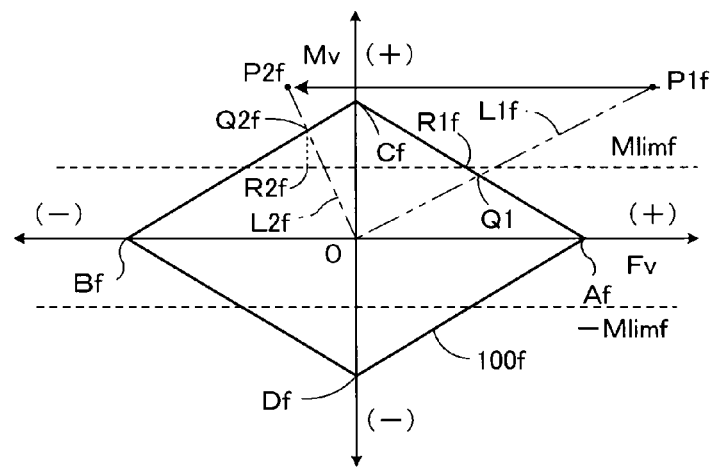
FIG. 24C is an illustration showing an operation of the seventh embodiment in a case where a point showing a target braking-driving force Fvn and a target yaw moment Mvn of the entire vehicle moves from P1$f$ to P2$f$.

Here, there is considered a case where, as shown in FIG. 24C, the target braking-driving force Fvn changes abruptly at a constant change rate due to a driver's abrupt acceleration/deceleration operation, and the point representing the target braking-driving force Fvn and the target yaw moment Mvn of the vehicle moves from P1f to P2f. When the changes of the target braking-driving forces Fvft and target yaw moments Mvft of the vehicle, which are to be produced by means of the braking-driving forces of the left and right front wheels, are not restricted, the point representing the target braking-driving forces Fvft and target yaw moments Mvft of the vehicle moves from Q1f to Cf and then to Q2f along the outline of the quadrilateral 100f, whereby the yaw moment of the vehicle increases and decreases abruptly.

In contrast, according to the illustrated seventh embodiment, the target yaw moment Mvft is restricted not to exceed the limit value Mlimf. Therefore, even in a case where the target braking-driving force Fvn changes abruptly due to a driver's abrupt acceleration/deceleration operation and the point representing the target braking-driving force Fvn and the target yaw moment Mvn of the vehicle moves from P1f to P2f, the point representing the target braking-driving forces Fvft and target yaw moments Mvft of the vehicle moves from Q1f to R1f and then to R2f, whereby the yaw moment of the vehicle can be reliably prevented from increasing and decreasing abruptly.

Figure 25C:
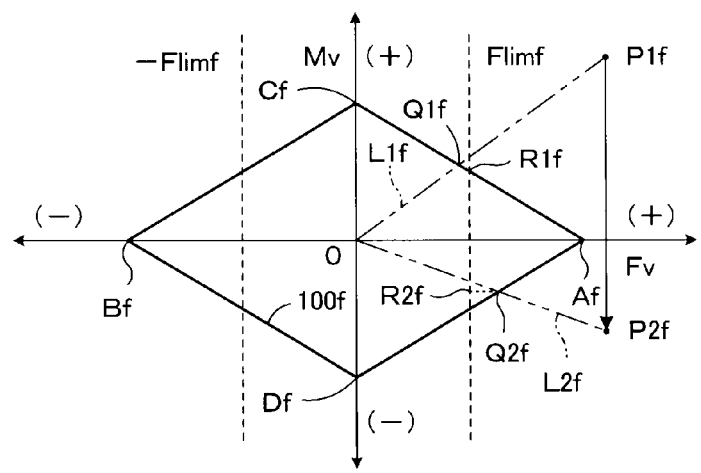
FIG. 25C is an illustration showing an operation of the seventh embodiment in a case where a point showing a target braking-driving force Fvn and a target yaw moment Mvn of the entire vehicle moves from P1$f$ to P2$f$.
Figure 26A:
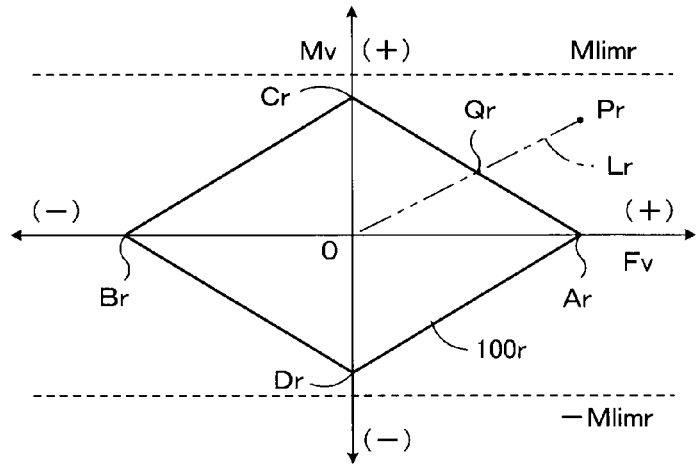
FIGS. 26A and 26B are illustrations showing a method of calculating a corrected target braking-driving force Fvrt of the vehicle and a corrected target yaw moment Mvrt of the vehicle to be produced by means of braking-driving forces of the left and right rear wheels in the seventh embodiment.
Figure 26B:
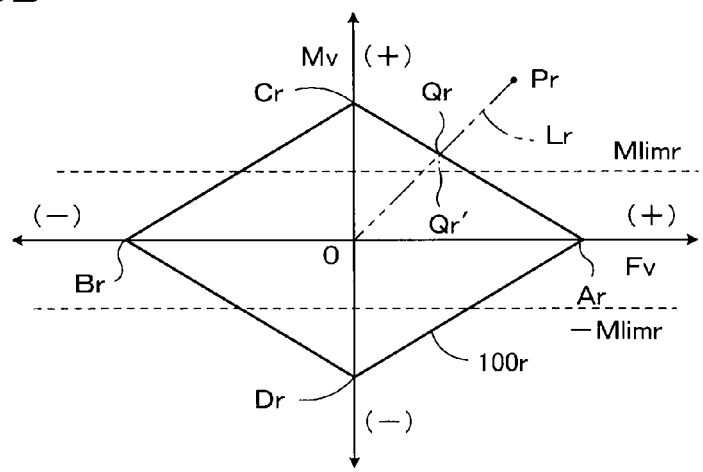
Figure 26C:
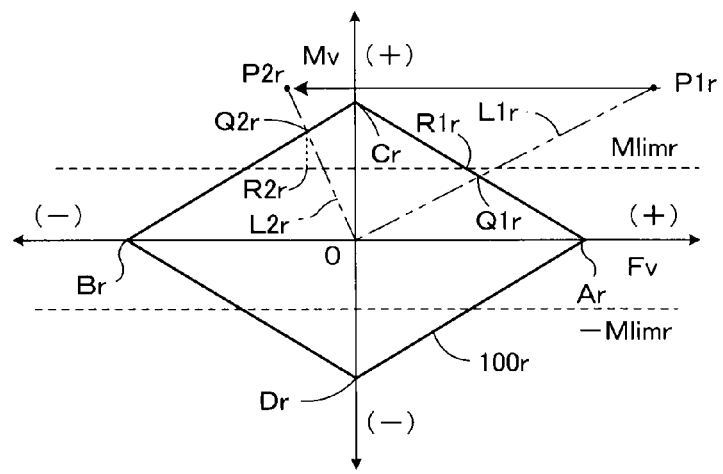
FIG. 26C is an illustration showing an operation of the seventh embodiment in a case where a point showing a target braking-driving force Fvrt and a target yaw moment Mvrt of the vehicle moves from P1$r$ to P2$fr$.
Figure 27A:
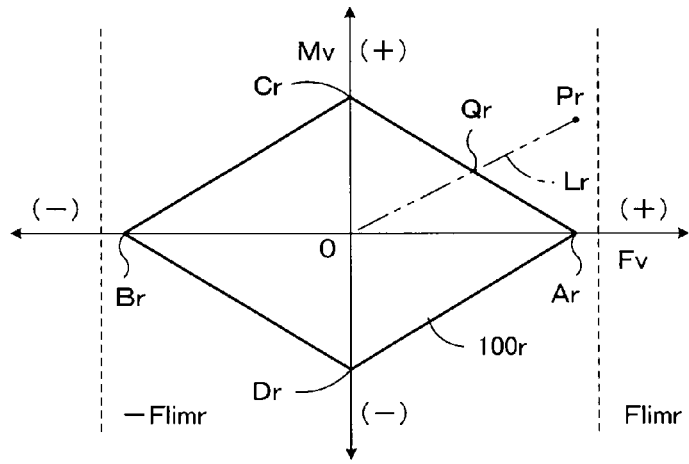
FIGS. 27A and 27B are illustrations showing a method of calculating a corrected target braking-driving force Fvrt of the vehicle and a corrected target yaw moment Mvrt of the vehicle to be produced by means of braking-driving forces of the left and right rear wheels in the seventh embodiment.
Figure 27B:
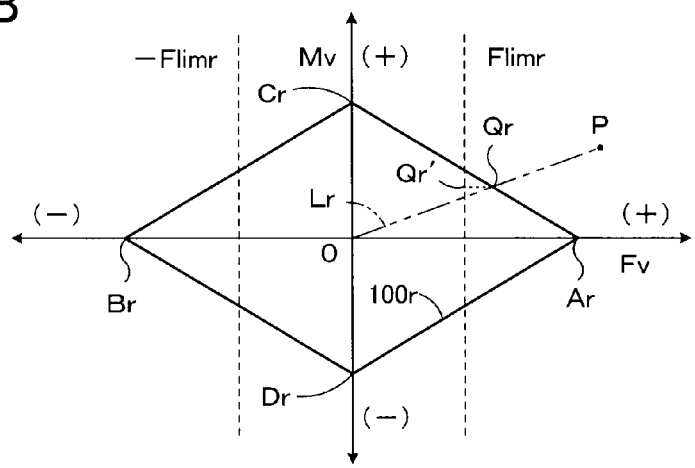
Figure 27C:
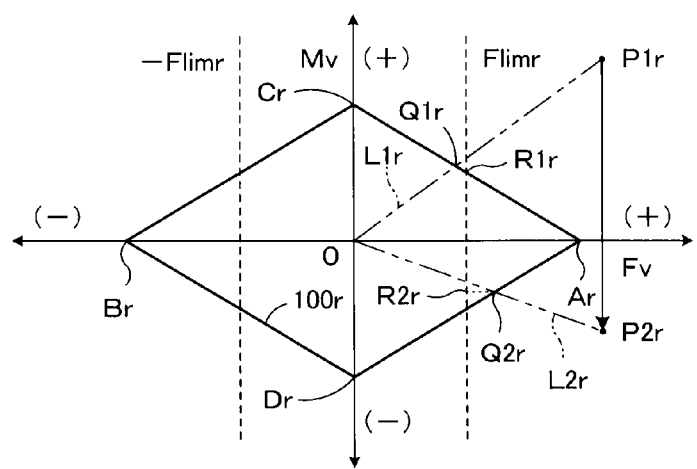
FIG. 27C is an illustration showing an operation of the seventh embodiment in a case where a point showing a target braking-driving force Fvrt and a target yaw moment Mvrt of the vehicle moves from P1$r$ to P2$r$.

Similarly, there is considered a case where, as shown in FIG. 25C, the target yaw moment Mvn changes abruptly due to a driver's abrupt steering operation, and the point representing the target braking-driving force Fvn and the target yaw moment Mvn of the vehicle moves from P1f to P2f. When the changes of the target braking-driving forces Fvft and target yaw moments Mvft of the vehicle, which are to be produced by means of the braking-driving forces of the front wheels, are not restricted, the point representing the target braking-driving forces Fvft and target yaw moments Mvft of the vehicle moves from Q1f to Af and then to Q2f along the outline of the quadrilateral 100f, whereby the braking-driving force of the vehicle increases and decreases abruptly.

In contrast, according to the illustrated seventh embodiment, the target braking-driving force Fvft is restricted not to exceed the limit value Flimf. Therefore, even in a case where the target yaw moment Mvn changes abruptly due to a driver's abrupt steering operation and the point representing the target braking-driving force Fvn and the target yaw moment Mvn of the vehicle moves from P1f to P2f, the point representing the target braking-driving forces Fvft and target yaw moments Mvft of the vehicle moves from Q1f to R1f and then to R2f, whereby the braking-driving force of the vehicle can be reliably prevented from increasing and decreasing abruptly.

In particular, according to the illustrated seventh embodiment, the limit value Mlimf is variably set in accordance with the change rate Fvnd of the target braking-driving force Fvn such that the larger the absolute value of the change rate Fvnd of the target braking-driving force Fvn, the smaller the limit value Mlimf, as shown in FIG. 20; and the limit value Flimf is variably set in accordance with the change rate Mvnd of the target yaw moment Mvn such that the larger the absolute value of the change rate Mvnd of the target yaw moment Mvn, the smaller the limit value Flimf, as shown in FIG. 21. Further, the limit values Mlimr and Flimr are also variably set in the same manner. Thus, as the possibility that the yaw moment or braking-driving force of the vehicle increases or decreases abruptly increases, the strictness of restriction on the target yaw moments Mvft and Mvrt and the braking-driving forces Fvft and Fvrt is increased. Accordingly, in a state in which an acceleration/deceleration operation or steering operation by the driver is mild, the yaw moment and braking-driving force required for the vehicle can be imparted to the vehicle without fail; and in a state in which the acceleration/deceleration operation or steering operation by the driver is abrupt, an abrupt change of the yaw moment or braking-driving force of the vehicle can be prevented without fail. Further, the degree of change in the yaw moment or braking-driving force of the vehicle at the time when the speed of the acceleration/deceleration operation or steering operation by the driver changes abruptly can be reduced without fail, as compared with a case where the respective limit values are constant.

Eighth Embodiment

Figure 28:
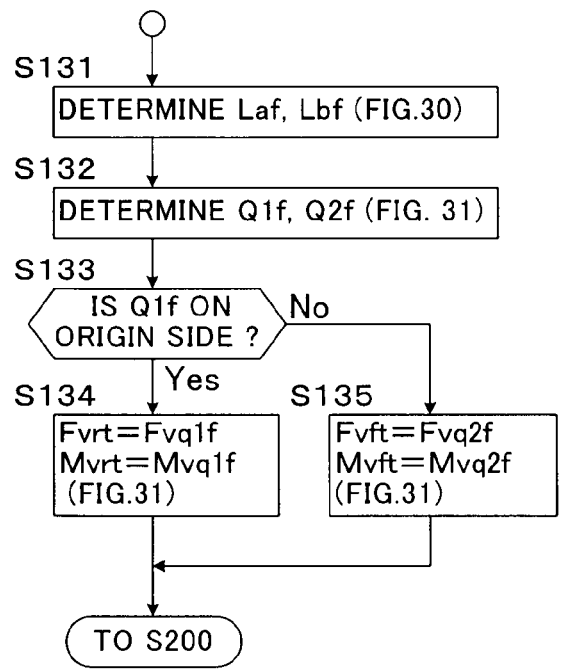
FIG. 28 is a flowchart showing an adjustment routine for adjusting a target braking-driving force of the vehicle and a target yaw moment of the vehicle to be produced by means of braking-driving forces of the left and right front wheels in an eighth embodiment.
Figure 29:
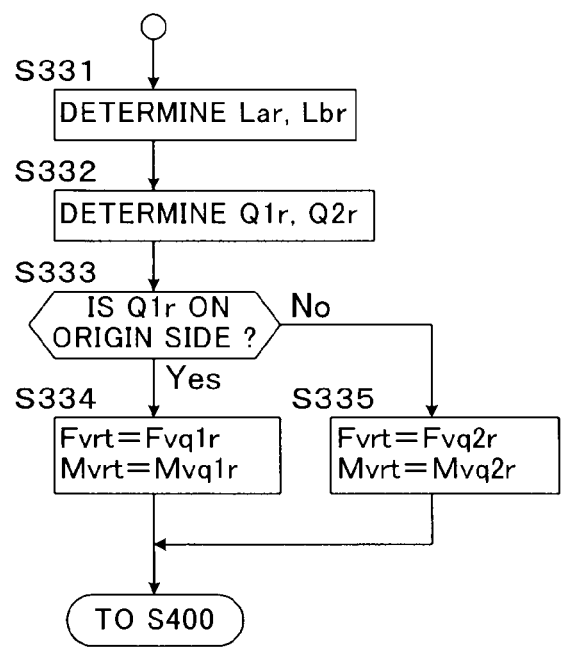
FIG. 29 is a flowchart showing an adjustment routine for adjusting a target braking-driving force of the vehicle and a target yaw moment of the vehicle to be produced by means of braking-driving forces of the left and right rear wheels in the eighth embodiment.

FIG. 28 is a flowchart showing a control routine for adjusting the target braking-driving force and target yaw moment of the front wheels in an eighth embodiment of the braking-driving-force control apparatus for a vehicle according to the present invention, the eighth embodiment being a modification of the first to third embodiments. FIG. 29 is a flowchart showing a control routine for adjusting the target braking-driving force and target yaw moment of the rear wheels in the eighth embodiment.

Figure 30A:
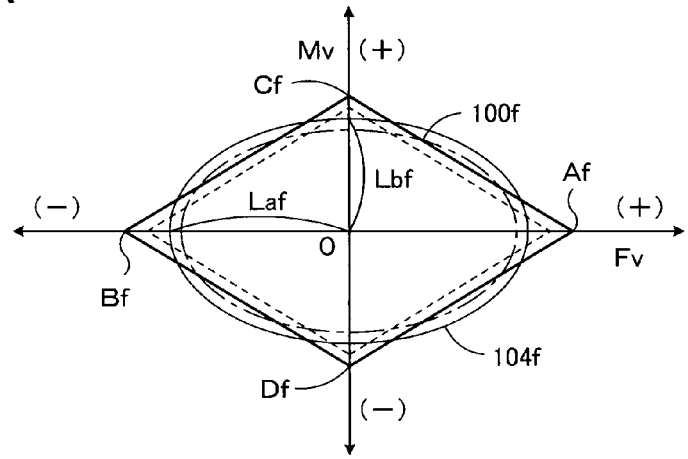
FIG. 30A is a graph showing a range of braking-driving force and yaw moment of a vehicle which can be produced through control of braking-driving forces of left and right front wheels in the eighth embodiment.
Figure 30B:
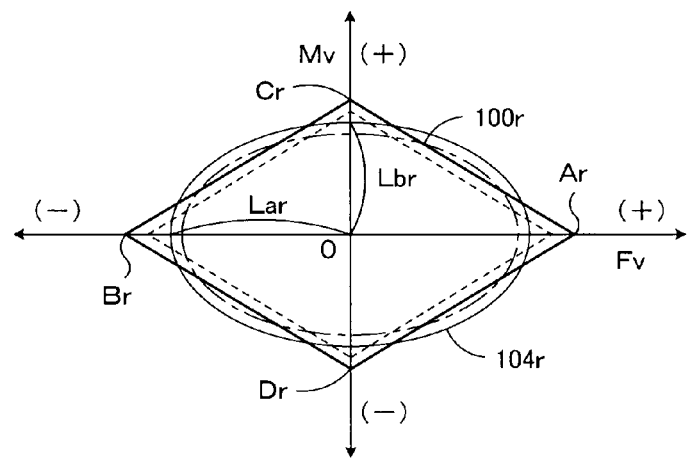
FIG. 30B is a graph showing a range of braking-driving force and yaw moment of the vehicle which can be produced through control of braking-driving forces of left and right rear wheels in the eighth embodiment.
Figure 30C:
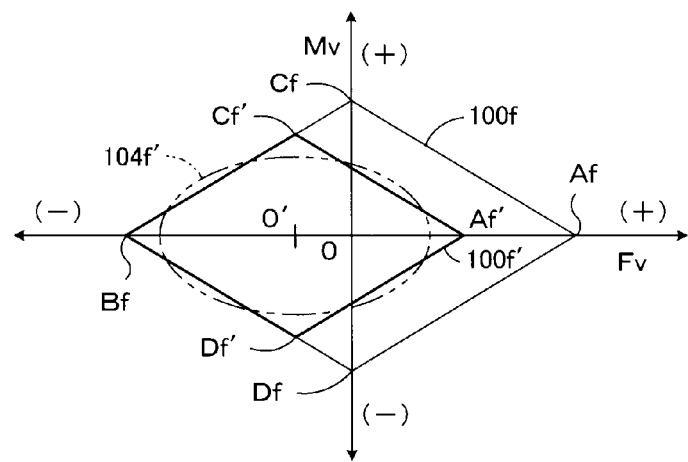
FIG. 30C is a graph showing a range of braking-driving force and yaw moment of the vehicle which can be produced through control of braking-driving forces of individual wheels in a case where only the front wheels or the rear wheels are driven.

In the eighth embodiment, as shown in FIG. 30, the electronic control apparatus for driving force control 16 sets an ellipse 104f whose center coincides with the origin O of the orthogonal coordinate system and whose major radius Laf (radius along the major axis) and minor radius Lbf (radius along the minor axis) coincide with the horizontal axis and vertical axis of the orthogonal coordinate system. The major radius Laf and the minor radius Lbf are set to values not greater than Fvdfmax and Mvlfmax, respectively, in accordance with the friction coefficient of the road surface such that when the friction coefficient of the road surface is small, the major radius Laf and the minor radius Lbf assume smaller values as compared with a case where the friction coefficient of the road surface is large. Further, the major radius Laf is variably set in accordance with the change rate of the target yaw moment Mvn such that the greater the magnitude of the change rate of the target yaw moment Mvn, the smaller the major radius Laf; and the minor radius Lbf is variably set in accordance with the change rate of the target braking-driving force Fvn such that the greater the magnitude of the change rate of the target braking-driving force Fvn, the smaller the minor radius Lbf.

The relation between the lengths of the two diagonal lines of a quadrilateral 100f, and the correspondence between the radiuses of the ellipse 104f along the horizontal and vertical axes and the major radius Laf and the minor radius Lbf change depending on the graduations of the horizontal and vertical axes. Therefore, the shapes of the quadrilateral 100f and the ellipse 104f change depending on the graduations of the horizontal and vertical axes.

In a case where the target braking-driving force Fvn of the vehicle and the target yaw moment Mvn of the vehicle assume values within the range of the quadrilateral 100f and the range of the ellipse 104f, the electronic control apparatus for driving force control 16 sets the target braking-driving force Fvft of the vehicle and the target yaw moment Mvft of the vehicle, which are to be produced by means of the braking-driving forces of the left and right front wheels, to the target braking-driving force Fvn and the target yaw moment Mvn, respectively.

In contrast, in a case where the target braking-driving force Fvn of the vehicle and the target yaw moment Mvn of the vehicle assume values outside the range of the quadrilateral 100f or the range of the ellipse 104f, the electronic control apparatus for driving force control 16 calculates the target braking-driving force Fvft of the vehicle and the target yaw moment Mvft of the vehicle, which are to be produced by means of the braking-driving forces of the left and right front wheels, such that the ratio between the target braking-driving force Fvft of the vehicle and the target yaw moment Mvft of the vehicle, which are to be produced by means of the braking-driving forces of the left and right front wheels, coincides with the ratio between the target braking-driving force Fvn and the target yaw moment Mvn, and the magnitudes of the target braking-driving force Fvft and target yaw moment Mvft of the vehicle, which are to be produced by means of the braking-driving forces of the left and right front wheels, become the maximum within the range of the quadrilateral $100f$ and the range of the ellipse $104f$.

In the eighth embodiment, when a negative determination is made in step 40, the control processing proceeds to step 131. In step 131, the major radius Laf and minor radius Lbf of the ellipse $104f$ shown in FIG. 30 are determined from the friction coefficient μ of the road surface, the magnitude of the change rate of the target yaw moment Mvn, and the magnitude of the change rate of the target braking-driving force Fvn, by use of an unillustrated map or function.

Figure 31A:
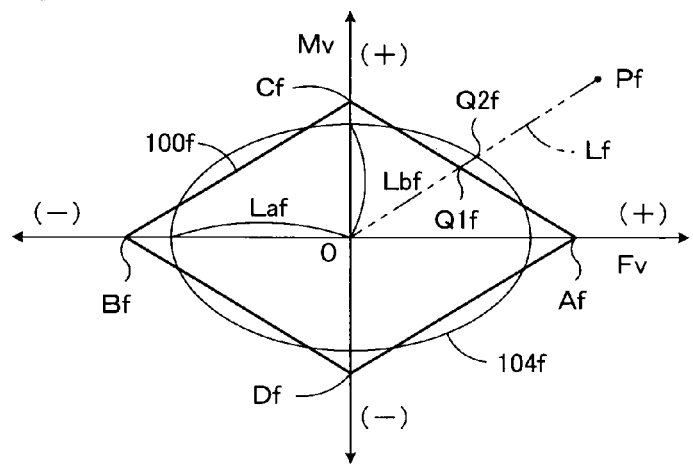
FIG. 31A is an illustration showing a method of calculating a target braking-driving force Fvft of the vehicle and a target yaw moment Mvft of the vehicle to be produced by means of braking-driving forces of the left and right front wheels in the eighth embodiment.
Figure 31B:
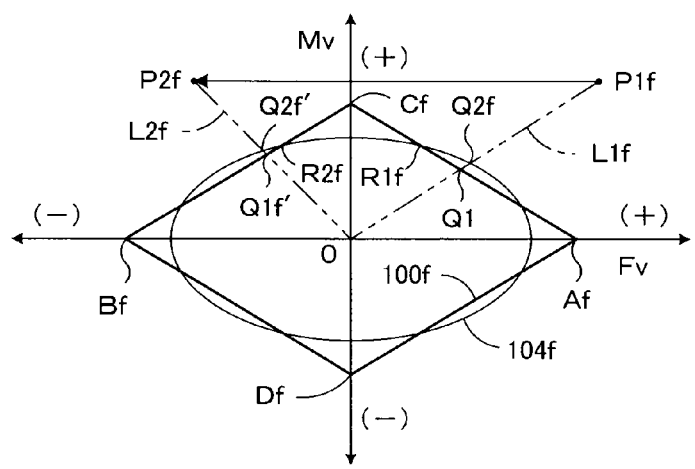
FIG. 31B is an illustration showing an operation of the eighth embodiment in a case where a point showing a target braking-driving force Fvn and a target yaw moment Mvn of the entire vehicle moves from P1ƒ to P2ƒ.

In step 132, as shown in FIGS. 31A and 31B, an intersection $Q1f$ between the outline of the quadrilateral $100f$ and a line segment Lf connecting the origin O and a point Pf representing the target braking-driving force Fvn of the vehicle and the target yaw moment Mvn of the vehicle is obtained as a first target point; and an intersection $Q2f$ between the ellipse $104f$ and the line segment Lf connecting the origin O and the point Pf representing the target braking-driving force Fvn of the vehicle and the target yaw moment Mvn of the vehicle is obtained as a second target point.

In step 133, a determination is made as to whether or not, of the first and second target points $Q1f$ and $Q2f$, the first target point $Q1f$ is closer to the origin O. When an affirmative determination is made, in step 134, the target braking-driving force Fvft of the vehicle and the target yaw moment Mvft of the vehicle, which are to be produced by means of the braking-driving forces of the left and right front wheels, are set to Fvq1f and Mvq1f, respectively, where Fvq1f and Mvq1f represent the coordinate values of the first target point $Q1f$. After that, the control processing proceeds to step 200. When a negative determination is made, in step 135, the target braking-driving force Fvft of the vehicle and the target yaw moment Mvft of the vehicle, which are to be produced by means of the braking-driving forces of the left and right front wheels, are set to $Fvq2f$ and $Mvq2f$, respectively, where $Fvq2f$ and $Mvq2f$ represent the coordinate values of the second target point $Q2f$. After that, the control processing proceeds to step 200.

As shown in FIG. 29, the target braking-driving force Fvrt and target yaw moment Mvrt of the vehicle, which are to be produced by means of the braking-driving forces of the left and right rear wheels, are also adjusted in accordance with steps 331 to 335 of FIG. 29 corresponding to the above-described steps 131 to 135, as in the case of the target braking-driving force Fvft and target yaw moment Mvft of the vehicle, which are to be produced by means of the braking-driving forces of the left and right front wheels. Thus, the corrected target braking-driving force Fvrt and target yaw moment Mvrt of the vehicle, which are to be produced by means of the braking-driving forces of the left and right rear wheels, are calculated. Notably, in this case, there is set an ellipse whose major radius Lar and minor radius Lbr are variably set to values equal to or less than Fvdrmax and Mvlrmax, respectively, in accordance with the friction coefficient of the road surface.

Accordingly, according to the illustrated eighth embodiment, in addition to the actions and effects of the above-described first through third embodiments, the following action and effect can be attained. The target braking-driving forces and target yaw moments of the front wheels and the rear wheels can be adjusted such that the braking-driving force and yaw moment required for the vehicle can be achieved to a possible extent within the range of the braking-driving forces which can be generate by the left and right front wheels and the left and right rear wheels. Further, as in the case of the above-described seventh embodiment, even when the target braking-driving force Fvn or the target yaw moment Mvn changes suddenly due to a driver's abrupt acceleration/deceleration operation or a driver's abrupt steering operation, the target yaw moments Mvft and Mvrt of the vehicle and the target braking-driving forces Fvft and Fvrt of the vehicle are prevented from changing abruptly. Accordingly, the present embodiment can effectively reduce the possibility that the travel stability of the vehicle lowers or an occupant of the vehicle feels an unnatural sensation due to an abrupt increase or decrease in the yaw moment or braking-driving force of the vehicle.

Here, there is considered a case where, as shown in FIG. 31B, the target braking-driving force Fvn changes abruptly at a constant change rate due to a driver's abrupt acceleration/deceleration operation, and the point representing the target braking-driving force Fvn and the target yaw moment Mvn of the vehicle moves from $P1f$ to $P2f$. When the changes of the target braking-driving forces Fvft and target yaw moments Mvft of the vehicle, which are to be produced by means of the braking-driving forces of the front wheels, are not restricted by the ellipse $104f$, the point representing the target braking-driving forces Fvft and target yaw moments Mvft of the vehicle moves from $Q1f$ to Cf and then to $Q1f''$ along the outline of the quadrilateral $100f$, whereby the yaw moment of the vehicle increases and decreases abruptly.

In contrast, according to the illustrated eighth embodiment, the minor radius Lbf of the ellipse $104f$ is made smaller than the standard value, and the target yaw moment Mvft is restricted not to exceed the quadrilateral $100f$ and the ellipse $104f$. Therefore, even in a case where the target braking-driving force Fvn changes abruptly due to a driver's abrupt acceleration/deceleration operation and the point representing the target braking-driving force Fvn and the target yaw moment Mvn of the vehicle moves from $P1f$ to $P2f$, the point representing the target braking-driving forces Fvft and target yaw moments Mvft of the vehicle moves from $Q1f$ to $R1f$, to $R2f$, and then to $Q1f''$, whereby the yaw moment of the vehicle can be reliably prevented from increasing and decreasing abruptly.

Figure 31C:
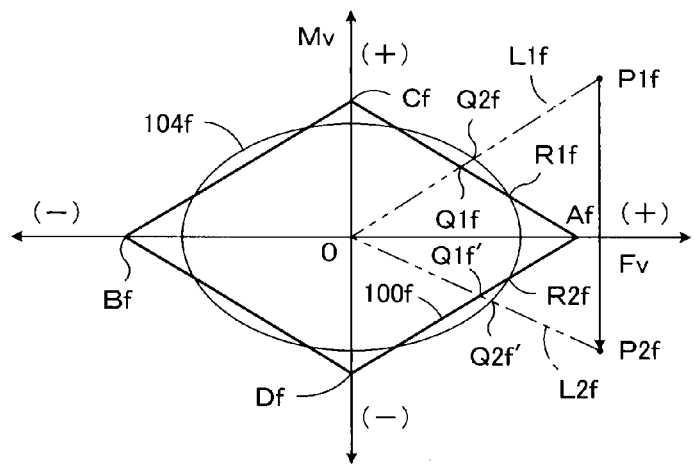
FIG. 31C is an illustration showing an operation of the eighth embodiment in a case where a point representing the target braking-driving force Fvn and the target yaw moment Mvn of the entire vehicle moves from P1ƒ to P2ƒ.

Similarly, there is considered a case where, as shown in FIG. 31C, the target yaw moment Mvn changes abruptly due to a driver's abrupt steering operation, and the point representing the target braking-driving force Fvn and the target yaw moment Mvn of the vehicle moves from $P1f$ to $P2f$. When the changes of the target braking-driving forces Fvft and target yaw moments Mvft of the vehicle, which are to be produced by means of the braking-driving forces of the front wheels, are not restricted by the ellipse $104f$, the point representing the target braking-driving forces Fvft and target yaw moments Mvft of the vehicle moves from $Q1f$ to Af and then to $Q1f'''$ along the outline of the quadrilateral $100f$, whereby the braking-driving force of the vehicle increases and decreases abruptly.

In contrast, according to the illustrated eighth embodiment, the major radius Laf of the ellipse $104f$ is made smaller than the standard value, and the target braking-driving force Fvft is restricted not to exceed the quadrilateral $100f$ and the ellipse $104f$. Therefore, even in a case where the target yaw moment Mvn changes abruptly due to a driver's abrupt steering operation and the point representing the target braking-driving force Fvn and the target yaw moment Mvn of the vehicle moves from $P1f$ to $P2f$, the point representing the target braking-driving forces Fvft and target yaw moments Mvft of the vehicle moves from Q1f to R1f, to R2f, and then to Q1f, whereby the braking-driving force of the vehicle can be reliably prevented from increasing and decreasing abruptly.

Ninth Embodiment

Figure 32:
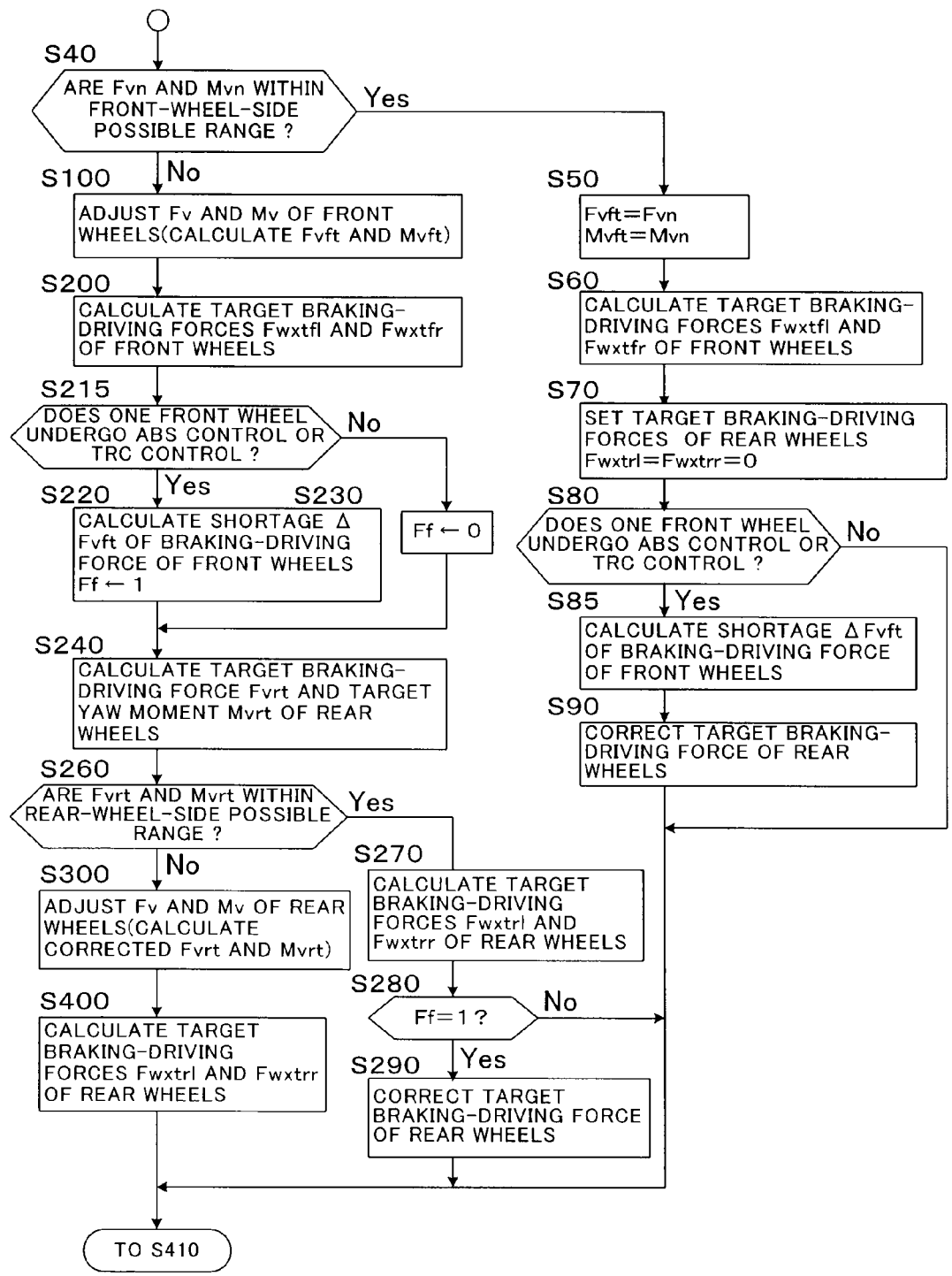
FIG. 32 is a flowchart showing a braking-driving-force control routine performed by an electronic control apparatus for driving force control in a ninth embodiment.

FIG. 32 is a flowchart showing a main portion of a braking-driving-force control routine in a ninth embodiment of the braking-driving-force control apparatus for a vehicle according to the present invention which is applied to a wheel-in-motor-type four-wheel-drive vehicle. In FIG. 32, steps identical to those shown in FIG. 4 are denoted by the same step numbers.

In this ninth embodiment as well, the electronic control apparatus for driving force control 16 performs traction control when necessary; and the electronic control apparatus for braking force control 28 performs antiskid control when necessary, as in the above-described second and third embodiments.

In the ninth embodiment, steps 10 to 200, steps 240 to 400, and steps 410 and 420 are executed in the same manner as in the first embodiment. After completion of step 200, in step 215, a determination is made as to whether or not the braking-driving force of one of the left and right front wheels is restricted because that wheel undergoes the antiskid control or traction control. When a negative determination is made, a flag Ff is reset to 0 in step 230. When an affirmative determination is made, in step 220, the shortage ΔFvft of the braking-driving force of the front wheels is calculated in the same manner as in the above-described second and third embodiment, and then the flag Ff is set to 1.

Further, when an affirmative determination is made in step 260, that is, it is determined that the target braking-driving force Fvrt of the vehicle and the target yaw moment Mvrt of the vehicle, which are to be produced by means of the braking-driving forces of the left and right rear wheels, fall within the range of the above-described quadrilateral 100r, and the target braking-driving force Fvrt of the vehicle and the target yaw moment Mvrt of the vehicle can be achieved through control of the braking-driving forces of the left and right rear wheels, the control processing proceeds to step 270.

In step 270, in the same manner as in the above-described step 400, the target braking-driving forces Fwxtrl and Fwxtrr of the left and right rear wheels are calculated from the corrected target braking-driving force Fvrt and target yaw moment Mvrt of the vehicle in accordance with the above-described equations 5 and 6. In step 280, a determination is made as to whether or not the flag Ff is 1. When a negative determination is made, the control processing proceeds to step 410, and when an affirmative determination is made, the control processing proceeds to step 290. In step 290, the target braking-driving force Fwxtrl or Fwxtrr of the rear wheel located on the same side, with respect to the lateral direction of the vehicle, as the front wheel for which the antiskid control or traction control is being performed is corrected by adding thereto the shortage ΔFvft of the braking-driving force of the front wheels.

Further, in the ninth embodiment, after completion of step 70, in step 80, a determination similar to that in the above-described step 215 is performed. That is, a determination is made as to whether or not the braking-driving force of one of the left and right front wheels is restricted because that wheel undergoes the antiskid control or traction control. When a negative determination is made, the control processing proceeds to step 410, and when an affirmative determination is made, the control processing proceeds to step 85. In step 85, the shortage ΔFvft of the braking-driving force of the front wheels is calculated in the same manner as in the above-described step 220.

In step 90, the target braking-driving force Fwxtrl or Fwxtrr of the rear wheel located on the same side, with respect to the lateral direction of the vehicle, as the front wheel for which the antiskid control or traction control is being performed is corrected by setting the target braking-driving force Fwxtrl or Fwxtrr to the value of the shortage ΔFvft of the braking-driving force of the front wheels.

Thus, according to the illustrated ninth embodiment, addition to the action and effects of the above-described first embodiment, the following action and effects can be attained. That is, even in a case where the target braking-driving force Fvft and the target yaw moment Mvft of the left and right front wheels cannot be achieved because at least one of the left and right front wheels undergo the antiskid control or traction control, the shortage ΔFvft of the braking-driving force of the front wheels is added to the target braking-driving force Fwxtrl or Fwxtrr of the rear wheel on the same side, with respect to the lateral direction of the vehicle, as the front wheel for which the antiskid control or traction control is being performed, whereby the shortages of the braking-driving force and the yaw moment are supplemented by the braking-driving force and yaw moment of the rear wheels. Therefore, there can be achieved a braking-driving force which corresponds to the sum of the target braking-driving force Fvft of the left and right front wheels and the target braking-driving force Fvrt of the left and right rear wheels, and a yaw moment which corresponds to the sum of the target yaw moment Mvft and the target yaw moment Mvrt of the left and right rear wheels.

In particular, according to the illustrated ninth embodiment, in a state where a negative determination is made in step 40; i.e., when it is determined that the target braking-driving force Fvn and the target yaw moment Mvn cannot be achieved through control of the braking-driving forces of the left and right front wheels, the shortage ΔFvft of the braking-driving force of the front wheels is added to the target braking-driving force Fwxtrl or Fwxtrr of the rear wheel. However, such addition of the shortage ΔFvft is performed only when an affirmative determination is made in step 260; that is, only when it is determined that the target braking-driving force Fvrt of the vehicle and the target yaw moment Mvrt of the vehicle, which are to be produced by means of the braking-driving forces of the left and right rear wheels, are located within the quadrilateral 100r, and the target braking-driving force Fvrt of the vehicle and the target yaw moment Mvrt of the vehicle can be achieved through control of the braking-driving forces of the left and right rear wheels. Therefore, the present embodiment can reliably reduce the possibility that the braking-driving force of a wheel to which the shortage ΔFvft of the braking-driving force of the front wheels is added becomes excessively large.

In order to effectively preventing the braking-driving force of the wheel to which the shortage ΔFvft of the braking-driving force of the front wheels is added from becoming excessively large, the present embodiment may be modified such that in step 290, the braking-driving force which that wheel can generate is estimated, a deviation between that braking-driving force and the target braking-driving force Fwxtrl or Fwxtrr before correction through addition is calculated as a margin ΔFwxtr of the braking-driving force, and the amount of addition correction of the braking-driving forces is restricted to the margin ΔFwxtr or less.

In the above, specific embodiments of the present invention have been described in detail; however, it is apparent for a person skilled in the art that the present invention is not limited to the above-described embodiments, and other various embodiments may be possible within the scope of the present invention.

For example, the above-described embodiments are configured such that the motor generators 12FL to 12RR or the motor generator 40 generates regenerative braking force when necessary. However, the embodiments may be modified such that even when the drive source(s) is a motor generator, the drive source(s) does not generate regenerative braking force, and braking force is generated by means of frictional braking only.

Further, in the above-described embodiments, adjustment of the target braking-driving force and target yaw moment of the vehicle is first performed for the front wheels, and then performed for the rear wheels. However, in particular, in a case where the target braking-driving force of the entire vehicle is a driving force or in a case where neither traction control nor antiskid control is performed for the front wheels, but traction control or antiskid control is performed for the rear wheels, the embodiments may be modified such that adjustment of the target braking-driving force and yaw moment of the vehicle is first performed for the rear wheels, and then performed for the front wheels.

Further, in the above-described embodiments, adjustment of the target braking-driving force and target yaw moment of the vehicle for the front wheels and that for the rear wheels are performed in the same manner. However, the embodiments may be modified such that adjustment of the target braking-driving force and target yaw moment of the vehicle for the front wheels and that for the rear wheels are performed in different manners.

In the first through fifth embodiments and the seventh through the ninth embodiments, the individual wheels are driven by corresponding motor generators each serving as a drive source. However, the configuration for driving the individual wheels in these embodiments may be replaced with the configuration for driving the individual wheels in the above-described sixth embodiment.

In the above-described embodiments, the target braking-driving force Fvn and the target yaw moment Mvn, which are required for the vehicle and are to be produced through control of the braking-driving forces of the individual wheels, are calculated on the basis of the amount of a driver's acceleration/deceleration operation and the amount of a driver's steering operation. However, the embodiments may be modified such that when the behavior of the vehicle is instable, the target braking-driving force Fvn and the target yaw moment Mvn are calculated in consideration of not only the amount of a driver's acceleration/deceleration operation and the amount of a driver's steering operation, but also a target longitudinal acceleration and a target yaw rate, which are necessary to stabilize the behavior of the vehicle.

The invention claimed is:

1. A braking-driving-force control apparatus for a vehicle, comprising:
   braking-driving force imparting means for imparting braking-driving forces to individual wheels;
   means for detecting an amount of driving operation by an occupant;
   means for calculating a target braking-driving force of an entire vehicle and a target yaw moment of the entire vehicle based on at least the amount of the driving operation; and
   control means for controlling the braking-driving forces of the individual wheels by controlling the braking-driving force imparting means such that a braking-driving force of the entire vehicle and a yaw moment of the entire vehicle approach the target braking-driving force of the entire vehicle and the target yaw moment of the entire vehicle,
   wherein one of a wheel group including front wheels and a wheel group including rear wheels is defined as a first wheel group, and the other wheel group is defined as a second wheel group,
   wherein the control means includes
      first adjustment means, which is operable when the target braking-driving force of the entire vehicle or the target yaw moment of the entire vehicle is outside an achievable range of a braking-driving force of the first wheel group, for adjusting respective values of a target braking-driving force of the vehicle and a target yaw moment of the vehicle which are to be produced by the braking-driving force of the first wheel group to be inside the achievable range of the braking-driving force of the first wheel group,
      means for calculating respective values of a target braking-driving force of the vehicle and a target yaw moment of the vehicle which are to be produced by means of a braking-driving force of the second wheel group based on
         the target braking-driving force of the entire vehicle and the target yaw moment of the entire vehicle, and
         the target braking-driving force of the vehicle and the target yaw moment of the vehicle which are to be produced by the braking-driving force of the first wheel group, and
      second adjustment means, which is operable when the target braking-driving force of the vehicle and the target yaw moment of the vehicle which are to be produced by the braking-driving force of the second wheel group are outside an achievable range of the braking-driving force of the second wheel group, for adjusting the respective values of the target braking-driving force of the vehicle and the target yaw moment of the vehicle which are to be produced by the braking-driving force of the second wheel group to be inside the achievable range of the braking-driving force of the second wheel group,
   wherein at least one of the first and second adjustment means corrects the target braking-driving force or the target yaw moment to a value which is within achievable ranges of the braking-driving force and yaw moment of the vehicle via the braking-driving forces of the wheels, the value being within an ellipse defined in an orthogonal coordinate system having two axes that correspond to the braking-driving force and yaw moment of the vehicle, respectively, a center of the ellipse being located on the axis corresponding to the braking-driving force, and directions of major and minor radii of the ellipse coinciding with the axes of the orthogonal coordinate system, respectively.

2. A braking-driving-force control apparatus for a vehicle, comprising:
   braking-driving force imparting means for imparting braking-driving forces to individual wheels;
   means for detecting an amount of driving operation by an occupant;
   means for calculating a target braking-driving force of an entire vehicle and a target yaw moment of the entire vehicle based on at least the amount of the driving operation; and control means for controlling the braking-driving forces of the individual wheels by controlling the braking-driving force imparting means such that a braking-driving force of the entire vehicle and a yaw moment of the entire vehicle approach the target braking-driving force of the entire vehicle and the target yaw moment of the entire vehicle, wherein one of a wheel group including front wheels and a wheel group including rear wheels is defined as a first wheel group, and the other wheel group is defined as a second wheel group, wherein the control means includes first adjustment means, which is operable when the target braking-driving force of the entire vehicle or the target yaw moment of the entire vehicle is outside an achievable range of a braking-driving force of the first wheel group, for adjusting respective values of a target braking-driving force of the vehicle and a target yaw moment of the vehicle which are to be produced by the braking-driving force of the first wheel group to be inside the achievable range of the braking-driving force of the first wheel group, means for calculating respective values of a target braking-driving force of the vehicle and a target yaw moment of the vehicle which are to be produced by means of a braking-driving force of the second wheel group based on the target braking-driving force of the entire vehicle and the target yaw moment of the entire vehicle, and the target braking-driving force of the vehicle and the target yaw moment of the vehicle which are to be produced by the braking-driving force of the first wheel group, and second adjustment means, which is operable when the target braking-driving force of the vehicle and the target yaw moment of the vehicle which are to be produced by the braking-driving force of the second wheel group are outside an achievable range of the braking-driving force of the second wheel group, for adjusting the respective values of the target braking-driving force of the vehicle and the target yaw moment of the vehicle which are to be produced by the braking-driving force of the second wheel group to be inside the achievable range of the braking-driving force of the second wheel group, wherein an ellipse in an orthogonal coordinate system defines values within achievable ranges of the braking-driving force and yaw moment of the vehicle via the braking-driving forces of the wheels, and wherein a major radius and a minor radius of the ellipse are determined in part from a friction coefficient of a road surface on which the vehicle drives.

* * * * *